US011938068B2

(12) United States Patent
Wallace et al.

(10) Patent No.: US 11,938,068 B2
(45) Date of Patent: Mar. 26, 2024

(54) PATIENT TRANSPORT APPARATUS DRIVE SYSTEMS

(71) Applicant: Stryker Corporation, Kalamazoo, MI (US)

(72) Inventors: John Wallace, Kalamazoo, MI (US); Daniel V. Brosnan, Kalamazoo, MI (US); Scott Michael Batzer, Plainwell, MI (US)

(73) Assignee: Stryker Corporation, Kalamazoo, MI (US)

( * ) Notice: Subject to any disclaimer, the term of this patent is extended or adjusted under 35 U.S.C. 154(b) by 599 days.

(21) Appl. No.: 17/132,029

(22) Filed: Dec. 23, 2020

(65) Prior Publication Data

US 2021/0196539 A1 Jul. 1, 2021

Related U.S. Application Data

(60) Provisional application No. 62/954,958, filed on Dec. 30, 2019.

(51) Int. Cl.

*A61G 5/10* (2006.01)
*A61G 5/04* (2013.01)
*A61G 5/06* (2006.01)

(52) U.S. Cl.

CPC ............. *A61G 5/1032* (2013.01); *A61G 5/04* (2013.01); *A61G 5/061* (2013.01); *A61G 5/1024* (2013.01)

(58) Field of Classification Search

CPC ........ A61G 5/1032; A61G 5/04; A61G 5/061; A61G 5/1024

See application file for complete search history.

(56) References Cited

U.S. PATENT DOCUMENTS

| | | | |
|---|---|---|---|
| 2,319,008 | A | 5/1943 | McCormack |
| 2,931,449 | A | 4/1960 | King |

(Continued)

FOREIGN PATENT DOCUMENTS

| | | | |
|---|---|---|---|
| AU | 1742699 | A | 5/1999 |
| CA | 2122515 | A1 | 10/1995 |

(Continued)

OTHER PUBLICATIONS

English language abstract and machine-assisted English translation for WO 2018/047450 A1 extracted from espacenet.com database on Feb. 15, 2021, 11 pages.

(Continued)

*Primary Examiner* — Tony H Winner

(74) *Attorney, Agent, or Firm* — Howard & Howard Attorneys PLLC

(57) ABSTRACT

A patient transport apparatus operable by a user for transporting a patient along stairs. A seat section is coupled to a support structure. A track having a belt is attached to the support structure and is arranged for selective operation between: a retracted position, and a deployed position to engage stairs. A drive system with a motor is disposed in rotational communication with the belt to control movement along stairs in the deployed position. A user interface us arranged for engagement to selectively adjust operation of the drive system between: an active state for controlling movement of the belt with the motor, and an inactive state. A braking controller is configured to sense movement of the belt in the inactive state, and to control the motor to limit movement of the belt in the inactive state to effect corresponding limited movement of the patient transport apparatus along stairs.

17 Claims, 50 Drawing Sheets

(56) References Cited

U.S. PATENT DOCUMENTS

| | | | |
|---|---|---|---|
| 3,111,331 | A | 11/1963 | Locke |
| 3,127,188 | A | 3/1964 | Greub |
| 3,146,841 | A | 9/1964 | Locke |
| 3,191,196 | A | 6/1965 | Holm |
| 3,191,953 | A | 6/1965 | Aysta |
| 3,195,910 | A | 7/1965 | Steiner |
| 3,198,534 | A | 8/1965 | Robinson |
| 3,231,290 | A | 1/1966 | Weyer |
| 3,276,531 | A | 10/1966 | Hale |
| 3,529,688 | A | 9/1970 | Bruce |
| 4,044,850 | A | 8/1977 | Winsor |
| 4,136,888 | A | 1/1979 | Bowie, Jr. et al. |
| 4,401,178 | A | 8/1983 | Studer |
| 4,411,330 | A | 10/1983 | Blokland |
| 4,432,425 | A | 2/1984 | Nitzberg |
| 4,556,229 | A | 12/1985 | Bihler et al. |
| 4,566,706 | A | 1/1986 | Bihler et al. |
| 4,566,707 | A | 1/1986 | Nitzberg |
| 4,627,508 | A | 12/1986 | Auer |
| 4,771,839 | A | 9/1988 | Misawa |
| 4,962,941 | A | 10/1990 | Rembos |
| 5,036,929 | A | 8/1991 | Trougouboff |
| 5,123,495 | A | 6/1992 | Littlejohn et al. |
| 5,158,309 | A | 10/1992 | Quigg |
| 5,197,558 | A | 3/1993 | Misawa |
| 5,248,007 | A | 9/1993 | Watkins et al. |
| 5,335,741 | A | 8/1994 | Rabinovitz et al. |
| 5,338,048 | A | 8/1994 | Medina |
| 5,423,563 | A | 6/1995 | Wild |
| 5,515,561 | A | 5/1996 | Suggitt et al. |
| 5,641,030 | A | 6/1997 | Toselli |
| 5,868,403 | A | 2/1999 | Culp et al. |
| 6,341,784 | B1 | 1/2002 | Carstens |
| 6,484,829 | B1 | 11/2002 | Cox |
| 6,594,837 | B2 | 7/2003 | Khait |
| 6,644,426 | B1 | 11/2003 | Larue |
| 6,644,675 | B2 | 11/2003 | Ellis et al. |
| 6,648,343 | B2 | 11/2003 | Way et al. |
| 6,805,209 | B2 | 10/2004 | Hedeen |
| 6,857,490 | B2 | 2/2005 | Quigg |
| 7,383,611 | B2 | 6/2008 | Foster |
| 7,398,571 | B2 | 7/2008 | Souke et al. |
| 7,472,438 | B2 | 1/2009 | Karmer, Jr. et al. |
| 7,520,347 | B2 | 4/2009 | Chambliss et al. |
| 7,581,265 | B1 | 9/2009 | Bourgraf et al. |
| 7,940,187 | B2 | 5/2011 | Newham |
| 7,950,673 | B2 | 5/2011 | Reed et al. |
| 8,056,950 | B2 | 11/2011 | Souke et al. |
| 8,061,460 | B2 | 11/2011 | Scheck |
| 8,104,121 | B2 | 1/2012 | Bourgraf et al. |
| 8,307,473 | B1 | 11/2012 | Lambarth et al. |
| 8,371,403 | B2 | 2/2013 | Underwood |
| 8,640,798 | B2 | 2/2014 | Walkingshaw et al. |
| 8,720,616 | B2 | 5/2014 | Kofoed et al. |
| 8,856,982 | B1 | 10/2014 | Kalivas |
| 8,910,329 | B2 | 12/2014 | Turner et al. |
| 8,959,681 | B2 | 2/2015 | Richards |
| 9,004,204 | B2 | 4/2015 | Walkingshaw et al. |
| 9,486,373 | B2 | 11/2016 | Lambarth et al. |
| 9,510,981 | B2 | 12/2016 | Lambarth et al. |
| 9,593,833 | B2 | 3/2017 | McMannon et al. |
| 10,744,049 | B2 | 8/2020 | Naber et al. |
| 10,758,437 | B2 | 9/2020 | Lucas et al. |
| 10,857,047 | B2 | 12/2020 | Furman et al. |
| 2003/0132585 | A1 | 7/2003 | Way et al. |
| 2003/0141677 | A1 | 7/2003 | Medina |
| 2003/0183428 | A1 | 10/2003 | Hedeen |
| 2006/0037789 | A1 | 2/2006 | Kritman et al. |
| 2006/0038360 | A1 | 2/2006 | Negishi |
| 2006/0076739 | A1 | 4/2006 | Kikusato |
| 2006/0124366 | A1 | 6/2006 | Le Masne De Chermont |
| 2007/0095581 | A1 | 5/2007 | Chambliss et al. |
| 2008/0067762 | A1 | 3/2008 | Rembos et al. |
| 2008/0272629 | A1 | 11/2008 | Walkingshaw et al. |
| 2009/0230638 | A1 | 9/2009 | Reed et al. |
| 2010/0104818 | A1 | 4/2010 | Uto |
| 2010/0117312 | A1 | 5/2010 | Walkingshaw et al. |
| 2011/0080016 | A1 | 4/2011 | Lambarth et al. |
| 2011/0087113 | A1 | 4/2011 | Mack et al. |
| 2011/0175302 | A1 | 7/2011 | Sherman et al. |
| 2011/0263950 | A1 | 10/2011 | Larson et al. |
| 2012/0139197 | A1 | 6/2012 | Livingston |
| 2012/0283929 | A1 | 11/2012 | Wakita et al. |
| 2013/0026737 | A1 | 1/2013 | Pizzi Spadoni |
| 2013/0081885 | A1 | 4/2013 | Connor |
| 2013/0085632 | A1 | 4/2013 | De Laurentis et al. |
| 2013/0175770 | A1 | 7/2013 | Morrish et al. |
| 2013/0274973 | A1 | 10/2013 | Kamara et al. |
| 2014/0007346 | A1 | 1/2014 | Lachenbruch |
| 2014/0021006 | A1 | 1/2014 | Kamara et al. |
| 2014/0084553 | A1 | 3/2014 | Carletti |
| 2014/0090171 | A1 | 4/2014 | Hyde et al. |
| 2014/0299391 | A1 | 10/2014 | Carletti |
| 2014/0310876 | A1 | 10/2014 | Roussy et al. |
| 2015/0096815 | A1 | 4/2015 | Ottenweller et al. |
| 2015/0137988 | A1 | 5/2015 | Gravenstein et al. |
| 2015/0216474 | A1 | 8/2015 | Riley et al. |
| 2015/0251713 | A1 | 9/2015 | Couture et al. |
| 2015/0374564 | A1* | 12/2015 | Sutton .................... A61G 5/128 280/657 |
| 2016/0140307 | A1 | 5/2016 | Brosnan et al. |
| 2016/0176453 | A1 | 6/2016 | Rudakevych |
| 2017/0035628 | A1 | 2/2017 | Naber et al. |
| 2017/0079859 | A1 | 3/2017 | Lambarth et al. |
| 2017/0143566 | A1 | 5/2017 | Elku et al. |
| 2017/0172827 | A1 | 6/2017 | Schaaf et al. |
| 2017/0281440 | A1 | 10/2017 | Puvogel et al. |
| 2018/0021191 | A1 | 1/2018 | Lambarth et al. |
| 2018/0028377 | A1 | 2/2018 | Stryker et al. |
| 2018/0028383 | A1 | 2/2018 | Stryker et al. |
| 2018/0177652 | A1 | 6/2018 | Furman et al. |
| 2018/0185212 | A1 | 7/2018 | Lucas et al. |
| 2018/0185213 | A1 | 7/2018 | Naber et al. |
| 2019/0046373 | A1* | 2/2019 | Coulter .................. A61G 5/041 |
| 2019/0209404 | A1 | 7/2019 | Kuhnl-Kinel |
| 2019/0307261 | A1 | 10/2019 | Gervais |
| 2019/0350782 | A1 | 11/2019 | Wang |
| 2020/0345566 | A1 | 11/2020 | Naber et al. |
| 2020/0345567 | A1 | 11/2020 | Lucas et al. |
| 2021/0045946 | A1 | 2/2021 | Furman et al. |

FOREIGN PATENT DOCUMENTS

| | | | |
|---|---|---|---|
| CA | 2122686 | A1 | 11/1995 |
| CA | 2746194 | C | 10/2014 |
| CN | 1152863 | A | 6/1997 |
| CN | 104887425 | A | 9/2015 |
| CN | 204915772 | U | 12/2015 |
| EP | 1789278 | A2 | 5/2007 |
| EP | 1965679 | A2 | 9/2008 |
| EP | 1214035 | B1 | 3/2010 |
| EP | 2105117 | B1 | 12/2011 |
| EP | 2595707 | A1 | 5/2013 |
| EP | 2910226 | A1 | 8/2015 |
| GB | 1486991 | A | 9/1977 |
| GB | 2429192 | A | 2/2007 |
| GB | 2499241 | A | 8/2013 |
| JP | 4896358 | B2 | 3/2012 |
| JP | 5055523 | B2 | 10/2012 |
| JP | 5878877 | B2 | 3/2016 |
| TW | 201019894 | A | 6/2010 |
| WO | 9834577 | A1 | 8/1998 |
| WO | 0119313 | A1 | 3/2001 |
| WO | 2004022371 | A2 | 3/2004 |
| WO | 2006023447 | A2 | 3/2006 |
| WO | 2007022037 | A1 | 2/2007 |
| WO | 2007075701 | A2 | 7/2007 |
| WO | 2008127944 | A1 | 10/2008 |
| WO | 2011101422 | A1 | 8/2011 |
| WO | 2011113070 | A1 | 9/2011 |
| WO | 2015032003 | A1 | 3/2015 |

(56) References Cited

FOREIGN PATENT DOCUMENTS

| | | |
|---|---|---|
| WO | 2016108582 A1 | 7/2016 |
| WO | 2018047450 A1 | 3/2018 |

OTHER PUBLICATIONS

Addady, Michael, "This Wheelchair is Like a Segway Crossed with a Tank, and it Can Climb Stairs", Oct. 19, 2015, article and video downloaded from http://fortune.com/2015/10/19/Wheelchair-climb-stairs/, 2 pages.
Amazon.com, "LINE2 Design Battery Powered Track Stair Chair 70019-Y-BAT Heavy Duty Emergency Lightweight Portable Folding Evacuation Chair", 2019, https://www.amazon.com/LINE2design-70019-Y-BAT-Emergency-Lightweigh-t-Evacuation/dp/B07MDHF4CP, 8pages.
Bouckley, Hanna, "The Wheelchair That Can Travel Up Stairs", 2016, downloaded from http://home.bt.com/tech-gadgets/tech-news/the-wheelchair-that-can-travel-up-stairs-11364035427656, 2 pages.
English language abstract and machine-assisted English translation for CN 104887425 extracted from espacenet.com database on Jun. 20, 2018, 10 pages.
English language abstract and machine-assisted English translation for CN 204915772 extracted from espacenet.com database on Jun. 6, 2018, 14 pages.
English language abstract and machine-assisted English translation for TW 201019894 extracted from espacenet.com database on Jun. 20, 2018, 12 pages.
English language abstract and machine-assisted English translation for WO 2016108582 extracted from espacenet. com database on Jun. 20, 2018, 23 pages.
English language abstract for CN 1152863 extracted from espacenet. com database on Jun. 20, 2018, 2 pages.
English language abstract for JP 4896358 extracted from espacenet. com database on Jun. 20, 2018, 1 page.
English language abstract for JP 5055523 extracted from espacenet. com database on Jun. 20, 2018, 1 page.
English language abstract for JP 5878877 extracted from espacenet. com database on Jun. 6, 2018, 2 pages.
Gomes, Carlos, "Using LabVIEW and MyRIO, We Created a Wheelchair That Can Improve the Lives of Disabled People and Give Them the Mobility Everyone Deserves", 2016, Case Study and Video downloaded from http://sine.ni.com/cs/app/doc/p/id/cs-16829, 2pages.
Mobile Stairlift, "Mobile Stairlift & Accessories Webpage", 2019, https://www.mobilestairlift.com/products/mobile-stairlift-battery-powered-portable, 4 pages.
Mobile Stairlift, "Mobile Stairlift Motorized Chair Lift—Battery Powered Webpage", 2019, https://www.mobilestairlift.com/collections/mobile-stairlift-accessories, 5 pages.
Promeba, S.L., "Promeba Emergency & Rescue-Chair PS-250/Power Track PA-260/Support PA-270 Catalog",http:// promeba.com/wp-content/uploads/2017/05/Cataleg_Promeba_PS-250_v01_-BR.pdf, Jan. 2017, 16 pages.
Robo Rats, "Robo-Rats Locomotion: Differential Drive", Apr. 4, 2001, downloaded from https://groups.csail.mit.edu/drl/courses/cs54-2001s/diffdrive.html, 2 pages.
The Gadget Flow, "Scewo Stair Climbing Wheelchair", 2017, downloaded from https://thegadgetflow.com/portfolio/scewo-stair-climbing-wheelchair/, 3 pages.
Topchair France, "Photo of Stair-Climbing Wheelchair" 2015, downloaded from http://www.topchair.fr/wp-content/uploads/2015/07/Topchair-S-fauteuil-electrique-escalier-e1453809380620.jpg, 1 page.
Topchair, "Topchair-S Stair-Climbing Wheelchair User Guide", May 2014, 54 pages.
Youtube, "How to Use the Mobile Stairlift Dolly—An Introductory Guide Video", Apr. 10, 2018, https://www.youtube.com/watch?v=BQt3-q73Zyg, 2 pages.
Youtube, "Introducing the Mobile Stairlift-Portable Stair Climbing Wheelchair Video", Apr. 10, 2018, https://www.youtube.com/watch?v=QhBhuuoeyd4, 3 pages.
Youtube, "ST003A Plus New Type Mobility Stair Climber Chair for Lifting Elderly Video", Apr. 5, 2018, https://www.youtube.com/watch?v =_ItZ1Nbpf-0, 2 pages.

* cited by examiner

PATIENT TRANSPORT APPARATUS DRIVE SYSTEMS

CROSS-REFERENCE TO RELATED APPLICATION

This application claims priority to and all the benefits of U.S. Provisional Patent Application No. 62/954,958, filed on Dec. 30, 2019.

BACKGROUND

In many instances, patients with limited mobility may have difficulty traversing stairs without assistance. In certain emergency situations, traversing stairs may be the only viable option for exiting a building. In order for a caregiver to transport a patient along stairs in a safe and controlled manner, a stair chair or evacuation chair may be utilized. Stair chairs are adapted to transport seated patients either up or down stairs, with two caregivers typically supporting, stabilizing, or otherwise carrying the stair chair with the patient supported thereon.

Certain types of conventional stair chairs utilize powered tracks to facilitate traversing stairs, whereby one of the caregivers manipulates controls for the powered tracks while also supporting the stair chair. Here, motors are typically used to generate torque used to move the tracks. However, these types of powered stair chairs can sometimes be difficult to control in a consistent and predictable fashion under various operating conditions. Furthermore, conventional powered stair chairs tend to be heavy, and can be hard for certain caregivers to maneuver.

A patient transport apparatus designed to overcome one or more of the aforementioned challenges is desired.

BRIEF DESCRIPTION OF THE DRAWINGS

Other advantages of the present invention will be readily appreciated as the same becomes better understood by reference to the following detailed description when considered in connection with the accompanying drawings.

DETAILED DESCRIPTION OF THE EMBODIMENTS

Figure 1:
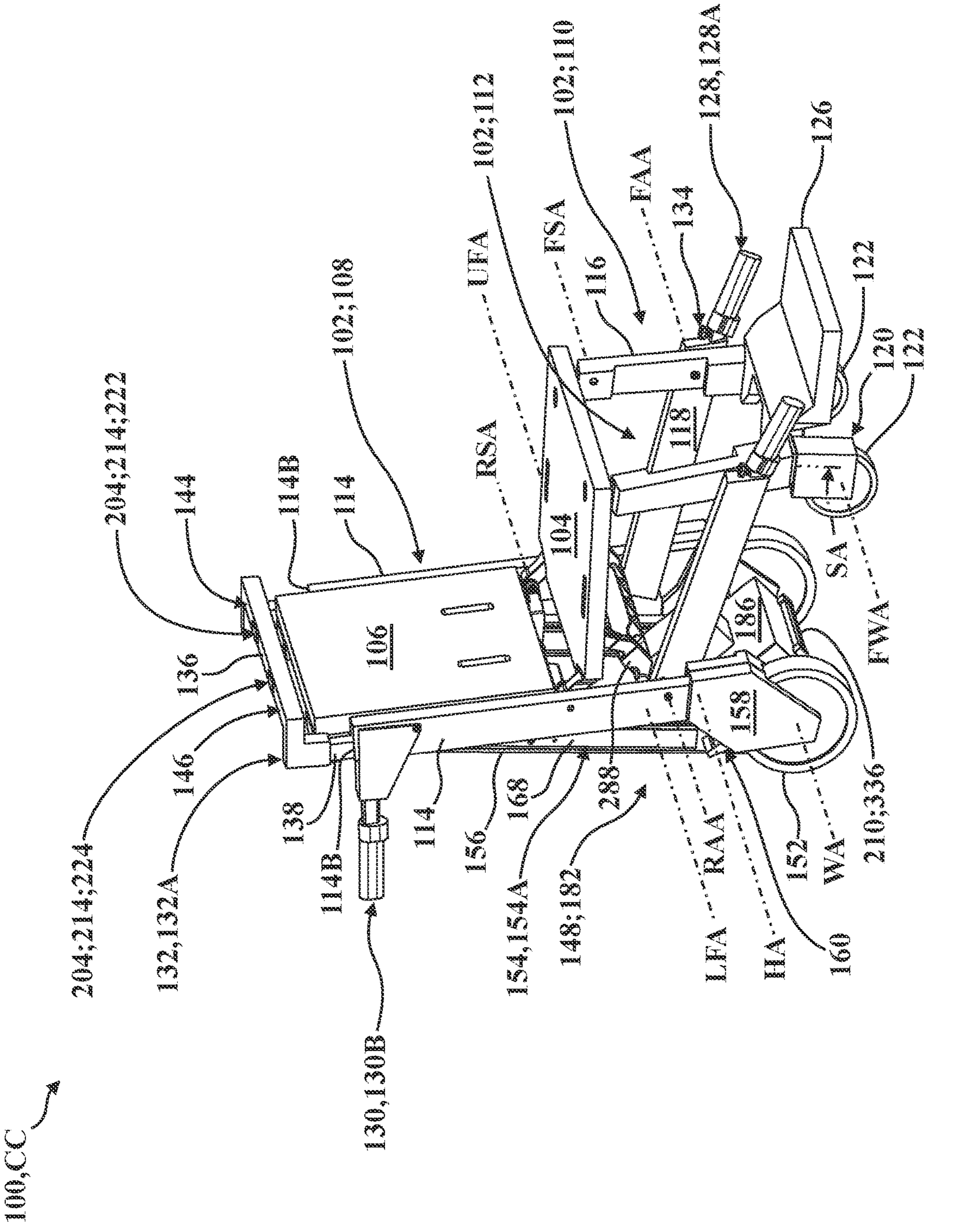
FIG. 1 is a front perspective view of a patient transport apparatus according to the present disclosure, shown arranged in a chair configuration for supporting a patient for transport along a floor surface, and shown having a track assembly disposed in a retracted position, and a handle assembly disposed in a collapsed position.

Referring now to the drawings, wherein like numerals indicate like parts throughout the several views, the present disclosure is generally directed toward a patient transport apparatus 100 configured to allow one or more caregivers to transport a patient. To this end, the patient transport apparatus 100 is realized as a "stair chair" which can be operated in a chair configuration CC (see FIGS. 1 and 6A) to transport the patient across ground or floor surfaces FS (e.g., pavement, hallways, and the like), as well as in a stair configuration SC (see FIGS. 2 and 6B) to transport the patient along stairs ST. As will be appreciated from the subsequent description below, the patient transport apparatus 100 of the present disclosure is also configured to be operable in a stowed configuration WC (see FIG. 5) when not being utilized to transport patients (e.g., for storage in an ambulance).

As is best shown in FIG. 1, the patient transport apparatus 100 comprises a support structure 102 to which a seat section 104 and a back section 106 are operatively attached. The seat section 104 and the back section 106 are each shaped and arranged to provide support to the patient during transport. The support structure 102 generally includes a rear support assembly 108, a front support assembly 110, and an intermediate support assembly 112 that is. The back section 106 is coupled to the rear support assembly 108 for concurrent movement. To this end, the rear support assembly 108 comprises rear uprights 114 which extend generally vertically and are secured to the back section 106 such as with fasteners (not shown in detail). The rear uprights 114 are spaced generally laterally from each other in the illustrated embodiments, and are formed from separate components which cooperate to generally define the rear support assembly 108. However, those having ordinary skill in the art will appreciate that other configurations are contemplated, and the rear support assembly 108 could comprise or otherwise be defined by any suitable number of components. The front support assembly 110 comprises front struts 116 which, like the rear uprights 114, are spaced laterally from each other and extend generally vertically. The intermediate support assembly 112 comprises intermediate arms 118 which are also spaced laterally from each other. Here too, it will be appreciated that other configurations are contemplated, and the front support assembly 110 and/or the intermediate support assembly 112 could comprise or otherwise be defined by any suitable number of components.

The intermediate support assembly 112 and the seat section 104 are each pivotably coupled to the rear support assembly 108. More specifically, the seat section 104 is arranged so as to pivot about a rear seat axis RSA which extends through the rear uprights 114 (compare FIGS. 5-6A; pivoting about rear seat axis RSA not shown in detail), and the intermediate arms 118 of the intermediate support assembly 112 are arranged so as to pivot about a rear arm axis RAA which is spaced from the rear seat axis RSA and also extends through the rear uprights 114 (compare FIGS. 5-6A; pivoting about rear arm axis RAA not shown in detail). Furthermore, the intermediate support assembly 112 and the seat section 104 are also each pivotably coupled to the front support assembly 110. Here, the seat section 104 pivots about a front seat axis FSA which extends through the front struts 116 (compare FIGS. 5-6A; pivoting about front seat axis FSA not shown in detail), and the intermediate arms 118 pivot about a front arm axis FAA which is spaced from the front seat axis FSA and extends through the front struts 116 (compare FIGS. 5-6A; pivoting about front arm axis FAA not shown in detail). The intermediate support assembly 112 is disposed generally vertically below the seat section 104 such that the rear support assembly 108, the front support assembly 110, the intermediate support assembly 112, and the seat section 104 generally define a four-bar linkage which helps facilitate movement between the stowed configuration WC (see FIG. 5) and the chair configuration CC (see FIG. 6A). While the seat section 104 is generally configured to remain stationary relative to the support structure 102 when operating in the chair configuration CC or in the stair configuration CC according to the illustrated embodiments, it is contemplated that the seat section 104 could comprise multiple components which cooperate to facilitate "sliding" movement relative to the seat section 104 under certain operating conditions, such as to position the patient's center of gravity advantageously for transport. Other configurations are contemplated.

Figure 2:
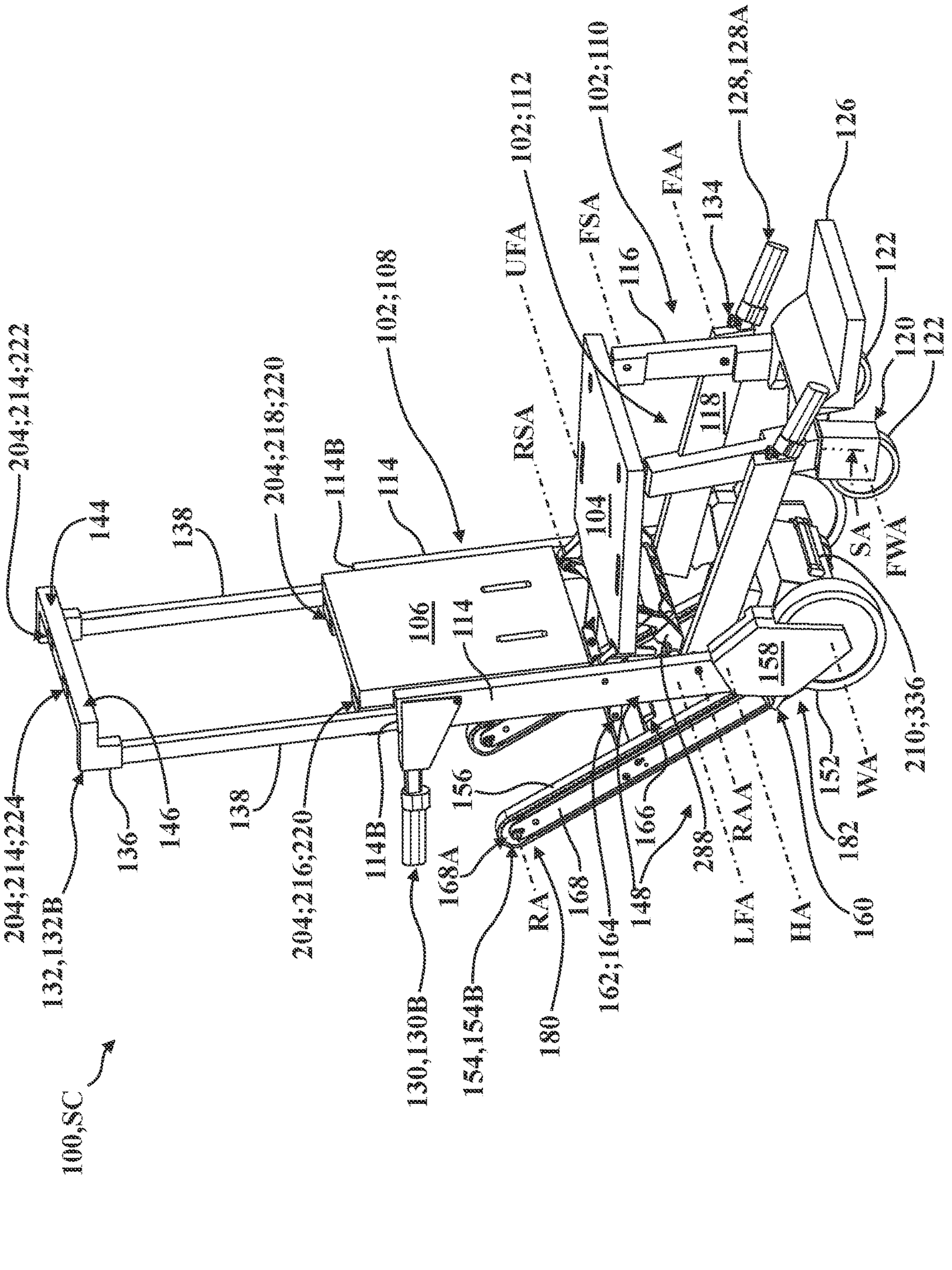
FIG. 2 is another front perspective view of the patient transport apparatus of FIG. 1, shown arranged in a stair configuration for supporting the patient for transport along stairs, and shown with the track assembly disposed in a deployed position, and with the handle assembly disposed in an extended position.
Figure 3:
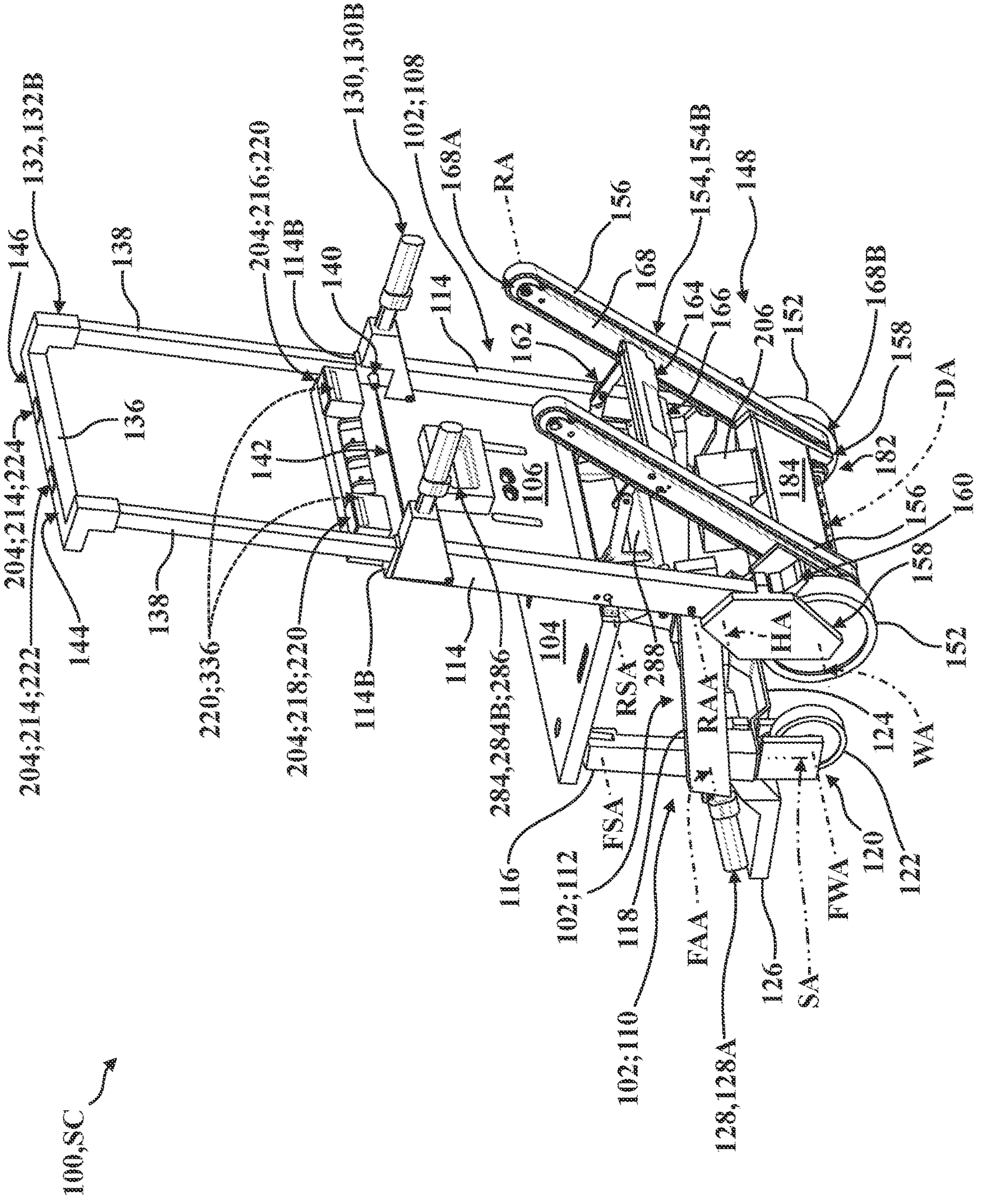
FIG. 3 is a rear perspective view of the patient transport apparatus of FIGS. 1-2, shown arranged in the stair configuration as depicted in FIG. 2, and shown having an extension lock mechanism, a folding lock mechanism, and a deployment lock mechanism.
Figure 5:
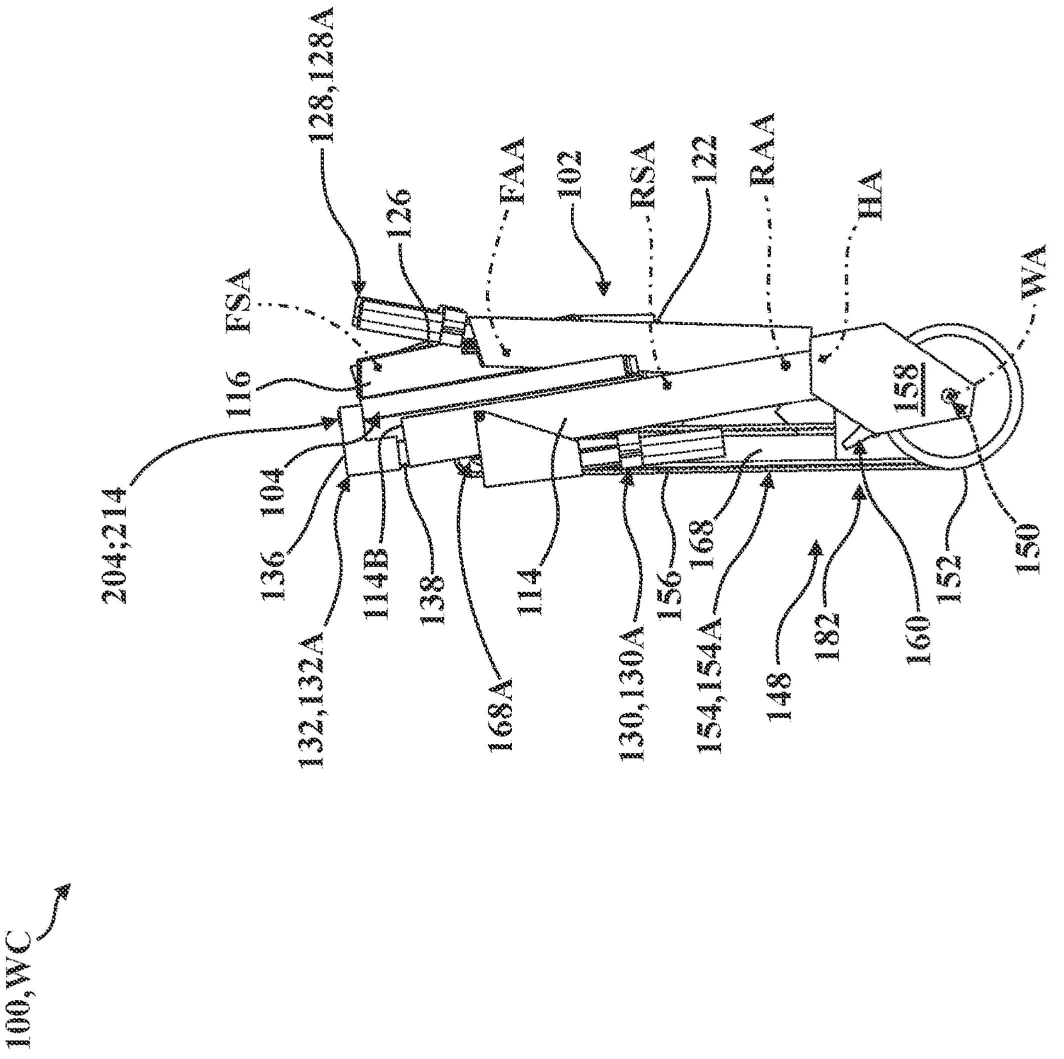
FIG. 5 is a right-side plan view of the patient transport apparatus of FIGS. 1-4, shown arranged in a stowed configuration maintained by the folding lock mechanism.
Figure 6A:
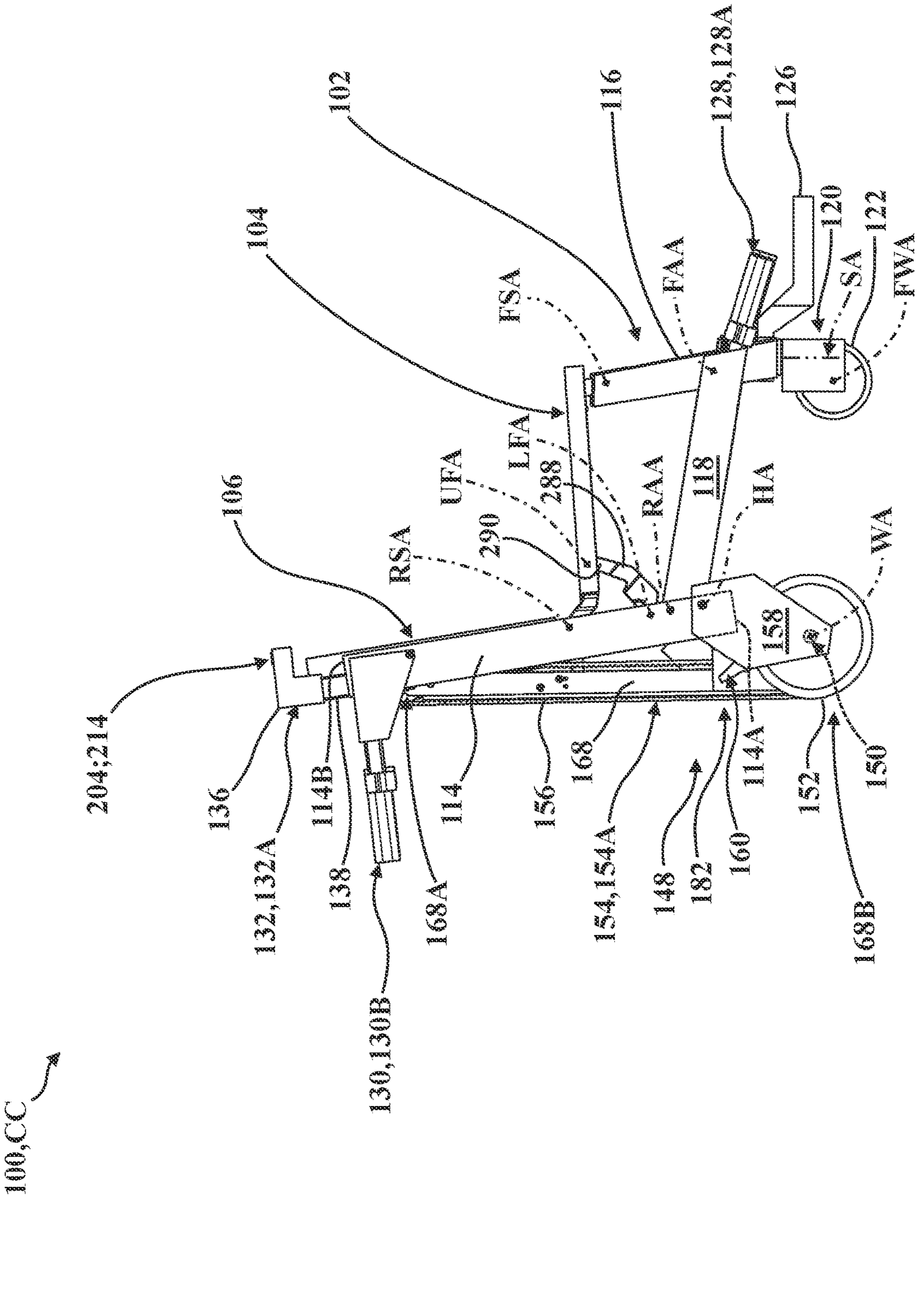
FIG. 6A is another right-side plan view of the patient transport apparatus of FIG. 5, shown arranged in the chair configuration as depicted in FIG. 1.

Referring now to FIGS. 1-3, the front support assembly 110 includes a pair of caster assemblies 120 which each comprise a front wheel 122 arranged to rotate about a respective front wheel axis FWA and to pivot about a respective swivel axis SA (compare FIGS. 5-6A; pivoting about swivel axis SA not shown in detail). The caster assemblies 120 are generally arranged on opposing lateral sides of the front support assembly 110 and are operatively attached to the front struts 116. A lateral brace 124 (see FIG. 3) extends laterally between the front struts 116 to, among other things, afford rigidity to the support structure 102. Here, a foot rest 126 is pivotably coupled to each of the front struts 116 adjacent to the caster assemblies 120 (pivoting not shown in detail) to provide support to the patient's feet during transport. For each of the pivotable connections disclosed herein, it will be appreciated that one or more fasteners, bushings, bearings, washers, spacers, and the like may be provided to facilitate smooth pivoting motion between various components.

The representative embodiments of the patient transport apparatus 100 illustrated throughout the drawings comprise different handles arranged for engagement by caregivers during patient transport. More specifically, the patient transport apparatus 100 comprises front handle assemblies 128, pivoting handle assemblies 130, and an upper handle assembly 132 (hereinafter referred to as "handle assembly 132), each of which will be described in greater detail below. The front handle assemblies 128 are supported within the respective intermediate arms 118 for movement between a collapsed position 128A (see FIG. 12A) and an extended position 128B (see FIG. 12B). To this end, the front handle assemblies 128 may be slidably supported by bushings, bearings, and the like (not shown) coupled to the intermediate arms 118, and may be lockable in and/or between the collapsed position 128A and the extended position 128B via respective front handle locks 134 (see FIG. 1). Here, a caregiver may engage the front handle locks 134 (not shown in detail) to facilitate moving the front handle assemblies 128 between the collapsed position 128A and the extended position 128B. The front handle assemblies 128 are generally arranged so as to be engaged by a caregiver during patient transport up or down stairs ST when in the extended position 128B. It will be appreciated that the front handle assemblies 128 could be of various types, styles, and/or configurations suitable to be engaged by caregivers to support the patient transport apparatus 100 for movement. While the illustrated front handle assemblies 128 are arranged for telescoping movement, other configurations are contemplated. By way of non-limiting example, the front handle assemblies 128 could be pivotably coupled to the support structure 102 or other parts of the patient transport apparatus 100. In some embodiments, the front handle assemblies 128 could be configured similar to as is disclosed in U.S. Pat. No. 6,648,343, the disclosure of which is hereby incorporated by reference in its entirety.

The pivoting handle assemblies 130 are coupled to the respective rear uprights 114 of the rear support assembly 108, and are movable relative to the rear uprights 114 between a stowed position 130A (see FIG. 5) and an engagement position 130B (see FIG. 6A). Like the front handle assemblies 128, the pivoting handle assemblies 130 are generally arranged for engagement by a caregiver during patient transport, and may advantageously be utilized in the engagement position 130B when the patient transport apparatus 100 operates in the chair configuration CC to transport the patient along floor surfaces FS. In some embodiments, the pivoting handle assemblies 130 could be configured similar to as is disclosed in U.S. Pat. No. 6,648,343, previously referenced. Other configurations are contemplated.

Figure 12A:
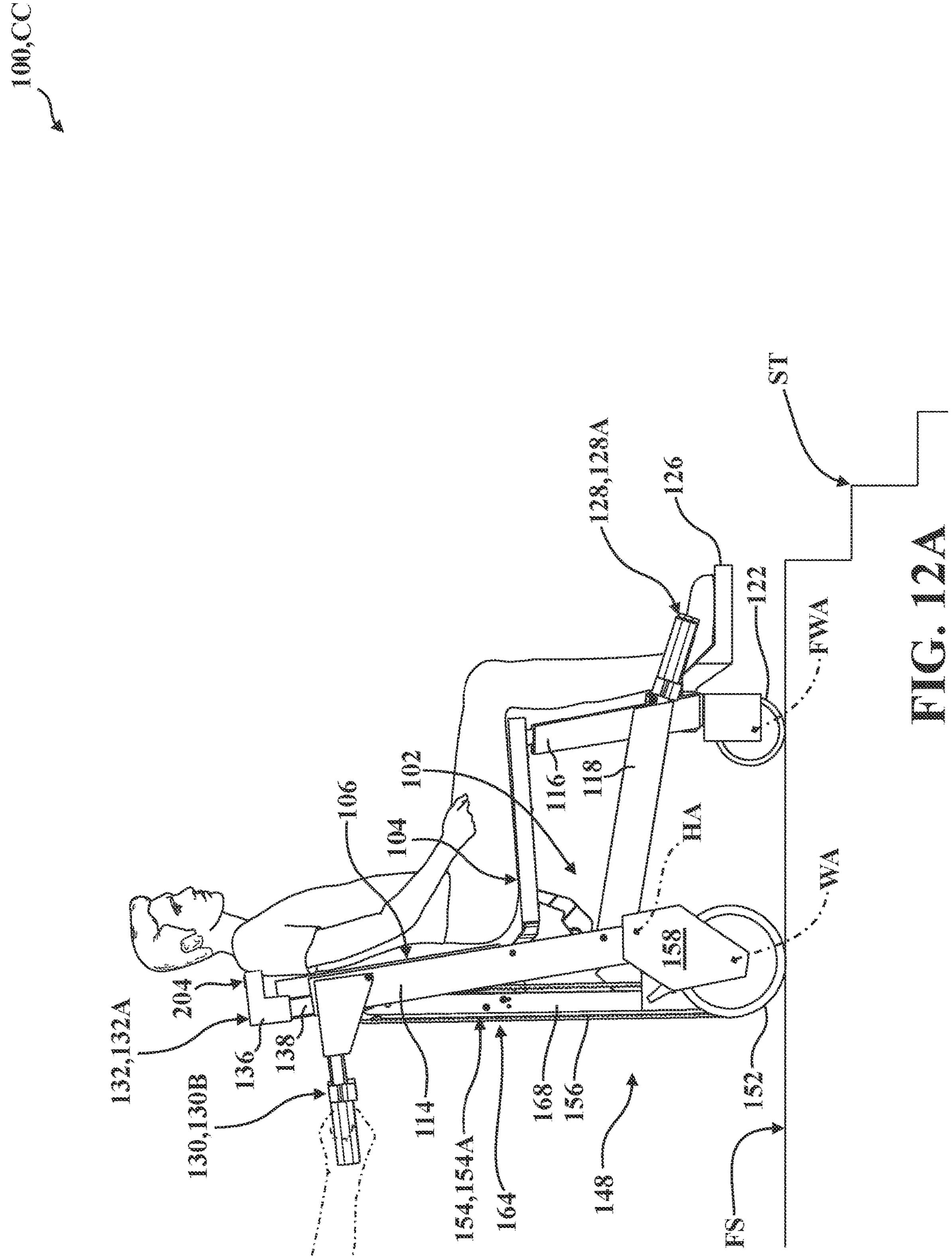
FIG. 12A is a right-side plan view of the patient transport apparatus of FIGS. 1-11D, shown supporting a patient in the chair configuration on a floor surface adjacent to stairs, and shown with a first caregiver engaging a pivoting handle assembly.
Figure 12B:
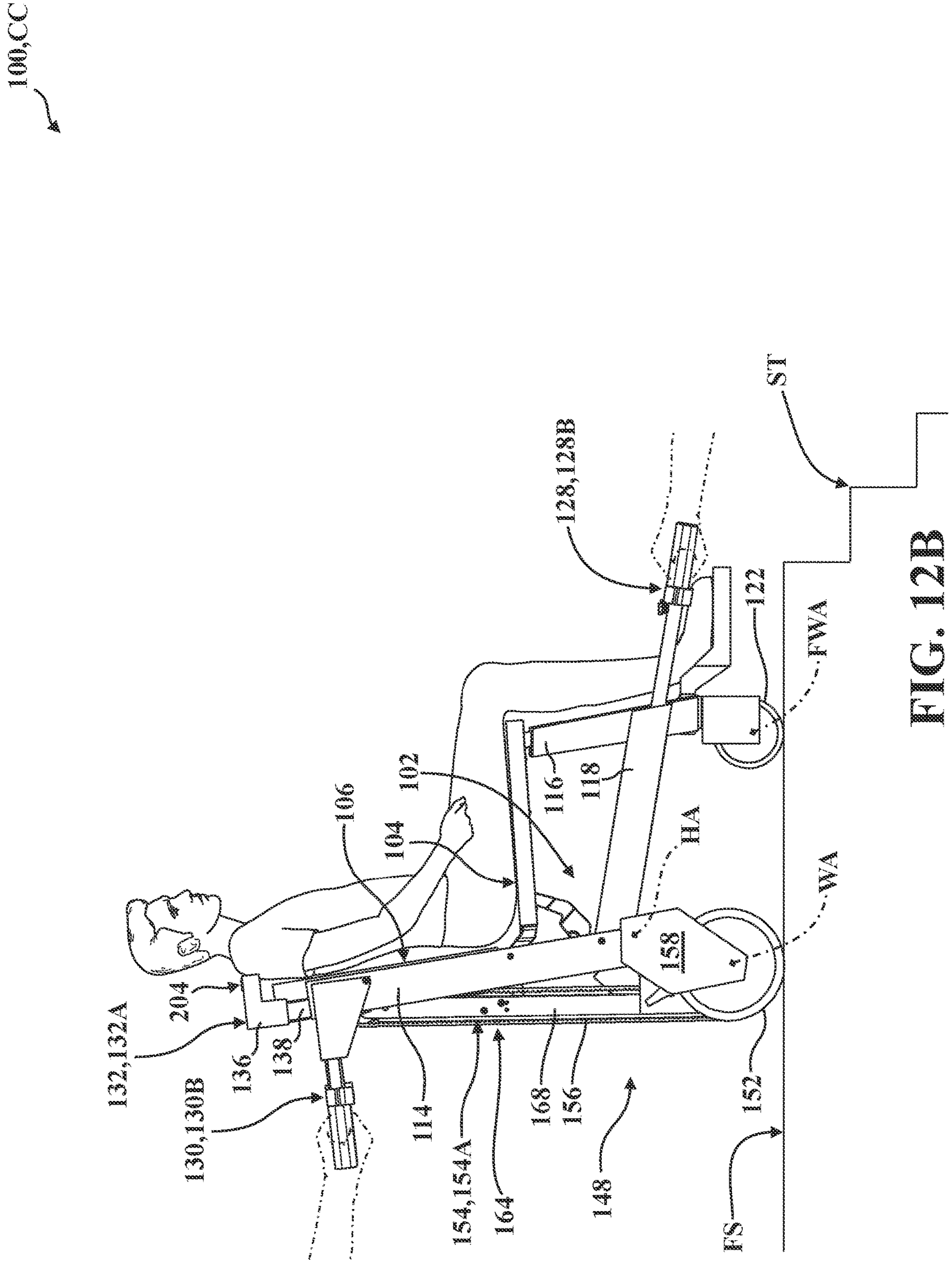
FIG. 12B is another right-side plan view of the patient transport apparatus of FIG. 12A, shown with a second caregiver engaging a front handle assembly in an extended position.
Figure 12C:
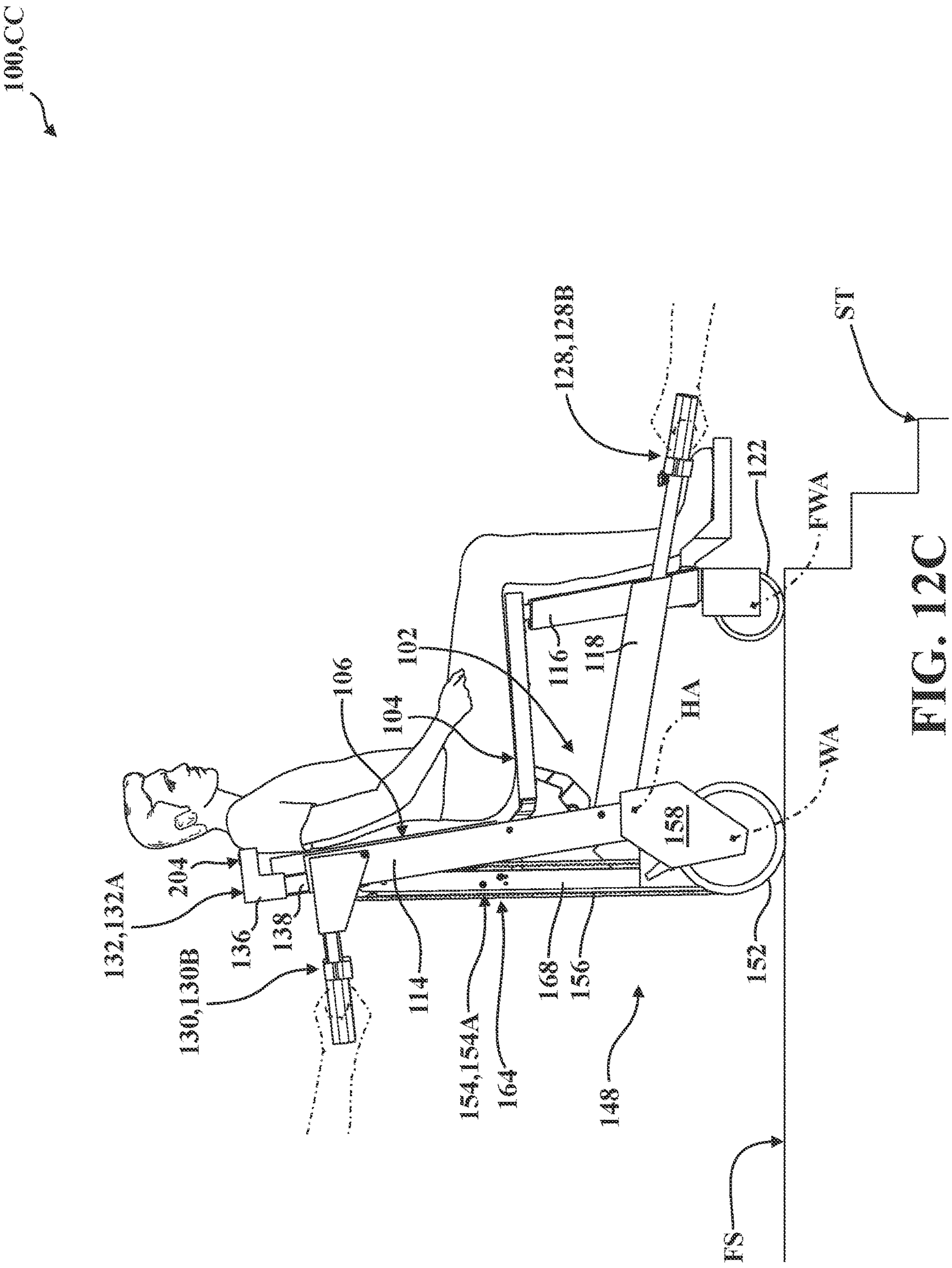
FIG. 12C is another right-side plan view of the patient transport apparatus of FIG. 12B, shown having moved closer to the stairs.
Figure 12D:
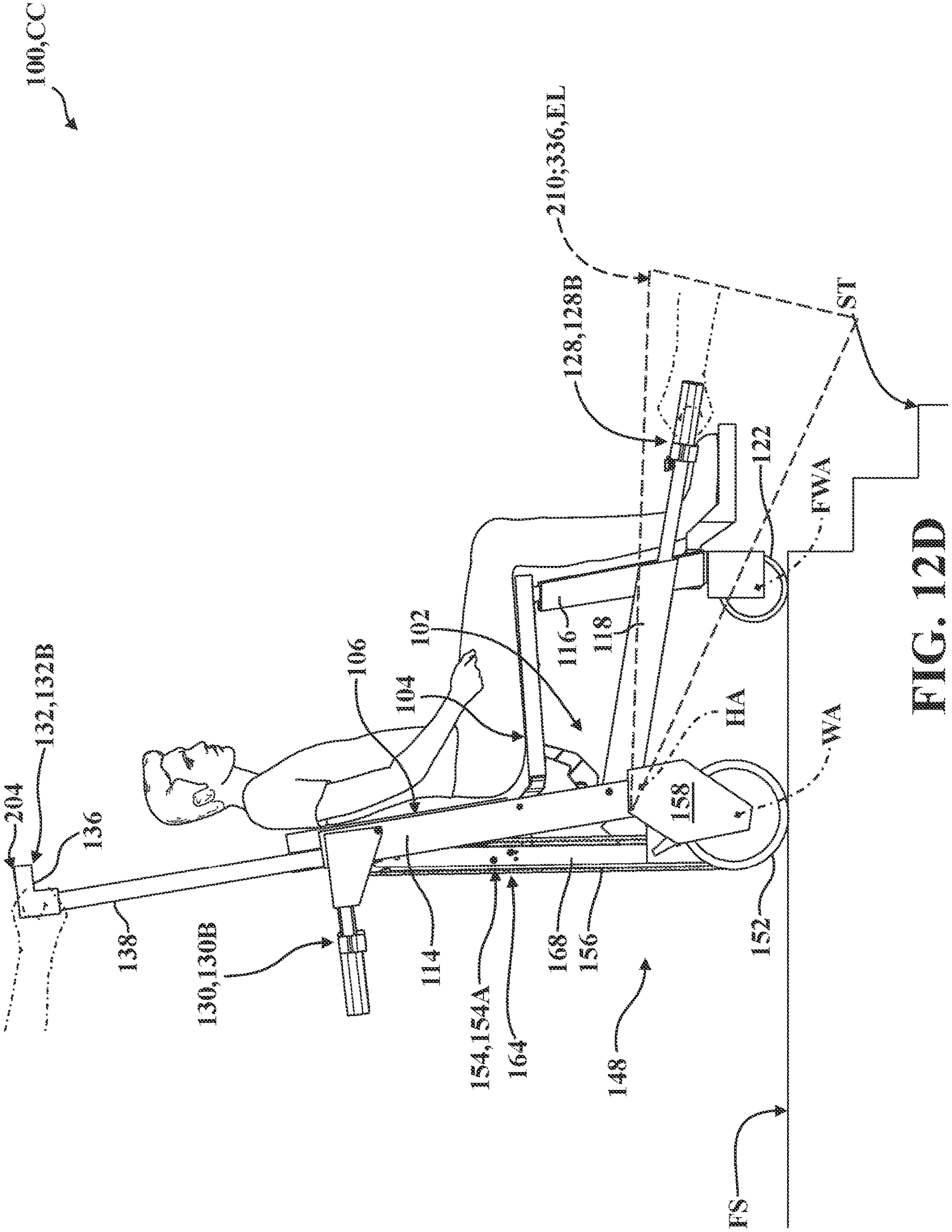
FIG. 12D is another right-side plan view of the patient transport apparatus of FIG. 12C, shown with the first caregiver engaging the handle assembly in the extended position.

The handle assembly 132 is also coupled to the rear support assembly 108, and generally comprises an upper grip 136 operatively attached to extension posts 138 which are supported within the respective rear uprights 114 for movement between a collapsed position 132A (see FIGS. 1 and 12C) and an extended position 132B (see FIGS. 2 and 12D). To this end, the extension posts 138 of the handle assembly 132 may be slidably supported by bushings, bearings, and the like (not shown) coupled to the rear uprights 114, and may be lockable in and/or between the collapsed position 132A and the extended position 132B via an extension lock mechanism 140 with an extension lock release 142 arranged for engagement by the caregiver. As is best shown in FIG. 3, the extension lock release 142 may be realized as a flexible connector which extends generally laterally between the rear uprights 114, and supports a cable connected to extension lock mechanisms 140 which releasably engage the extension posts 138 to maintain the handle assembly 132 in the extended position 132B and the collapsed position 132A (not shown in detail). Here, it will be appreciated that the extension lock mechanism 140 and/or the extension lock release 142 could be of a number of different styles, types, configurations, and the like sufficient to facilitate selectively locking the handle assembly 132 in the extended position 132B. In some embodiments, the handle assembly 132, the extension lock mechanism 140, and/or the extension lock release 142 could be configured similar to as is disclosed in U.S. Pat. No. 6,648,343, previously referenced. Other configurations are contemplated.

Figure 12E:
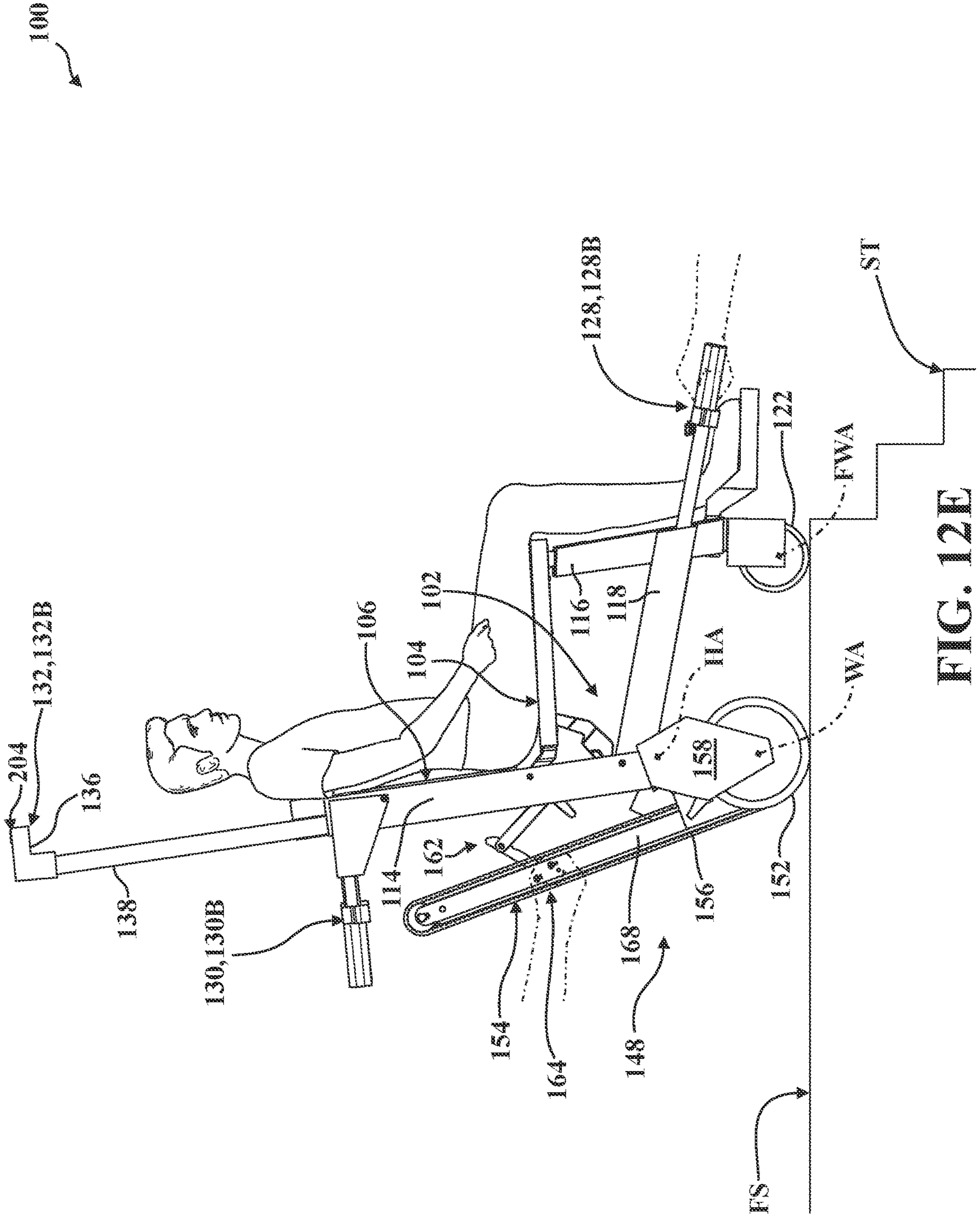
FIG. 12E is another right-side plan view of the patient transport apparatus of FIG. 12D, shown with the first caregiver having engaged the deployment lock mechanism to move the track assembly out of the retracted position.
Figure 12F:
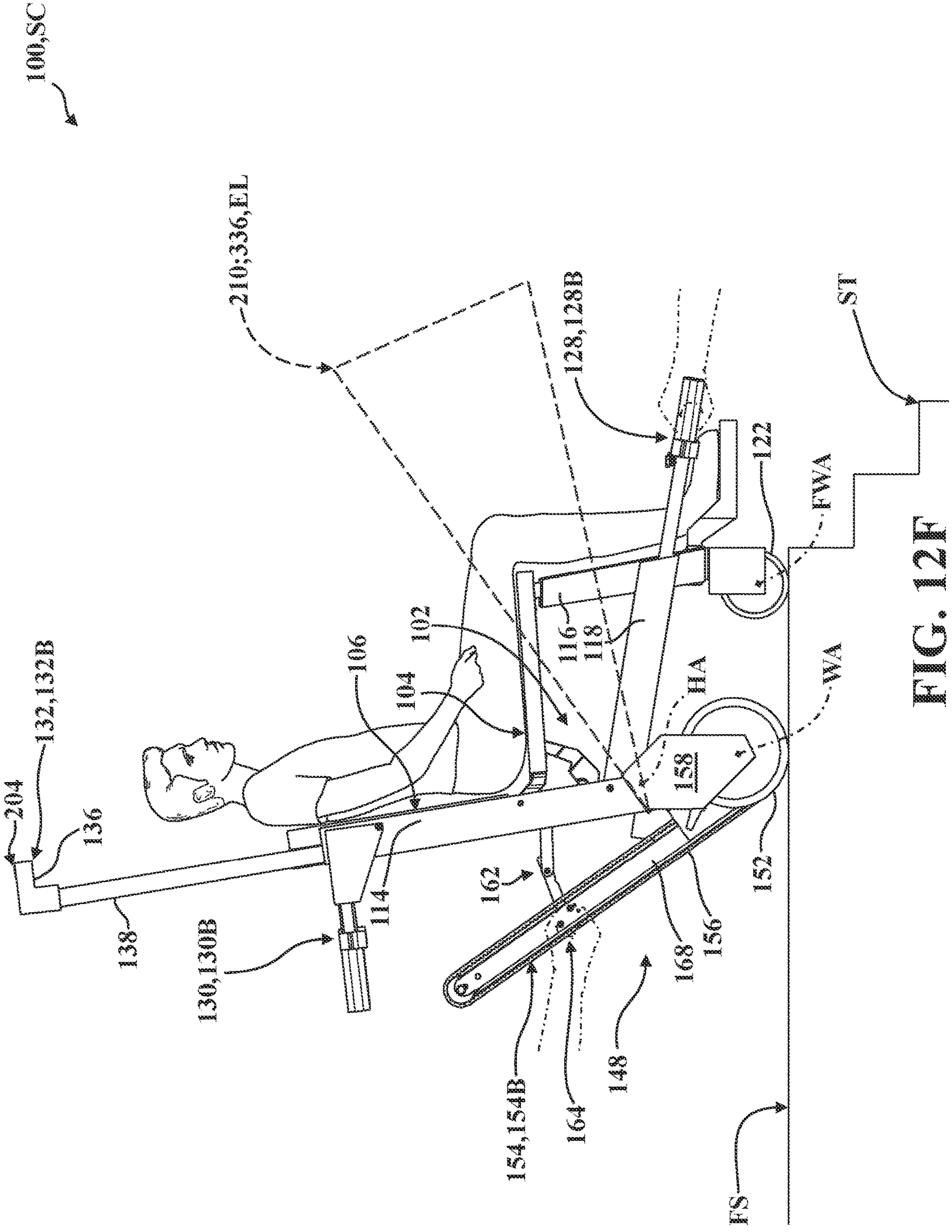
FIG. 12F is another right-side plan view of the patient transport apparatus of FIG. 12E, shown supporting the patient in the stair configuration with the track assembly in the deployed position.
Figure 12G:
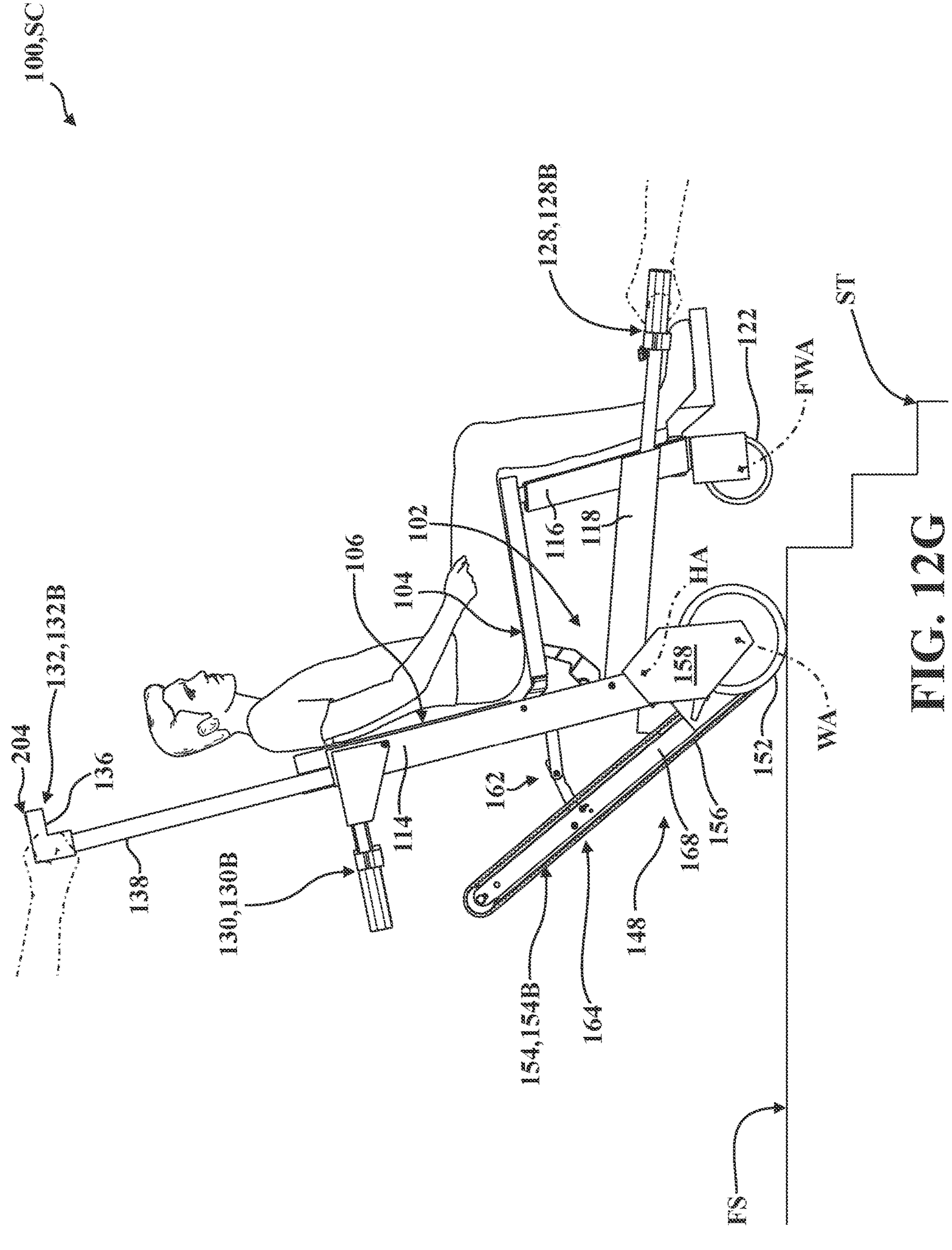
FIG. 12G is another right-side plan view of the patient transport apparatus of FIG. 12F, shown having moved towards the stairs for descent while supported by the first and second caregivers.
Figure 12H:
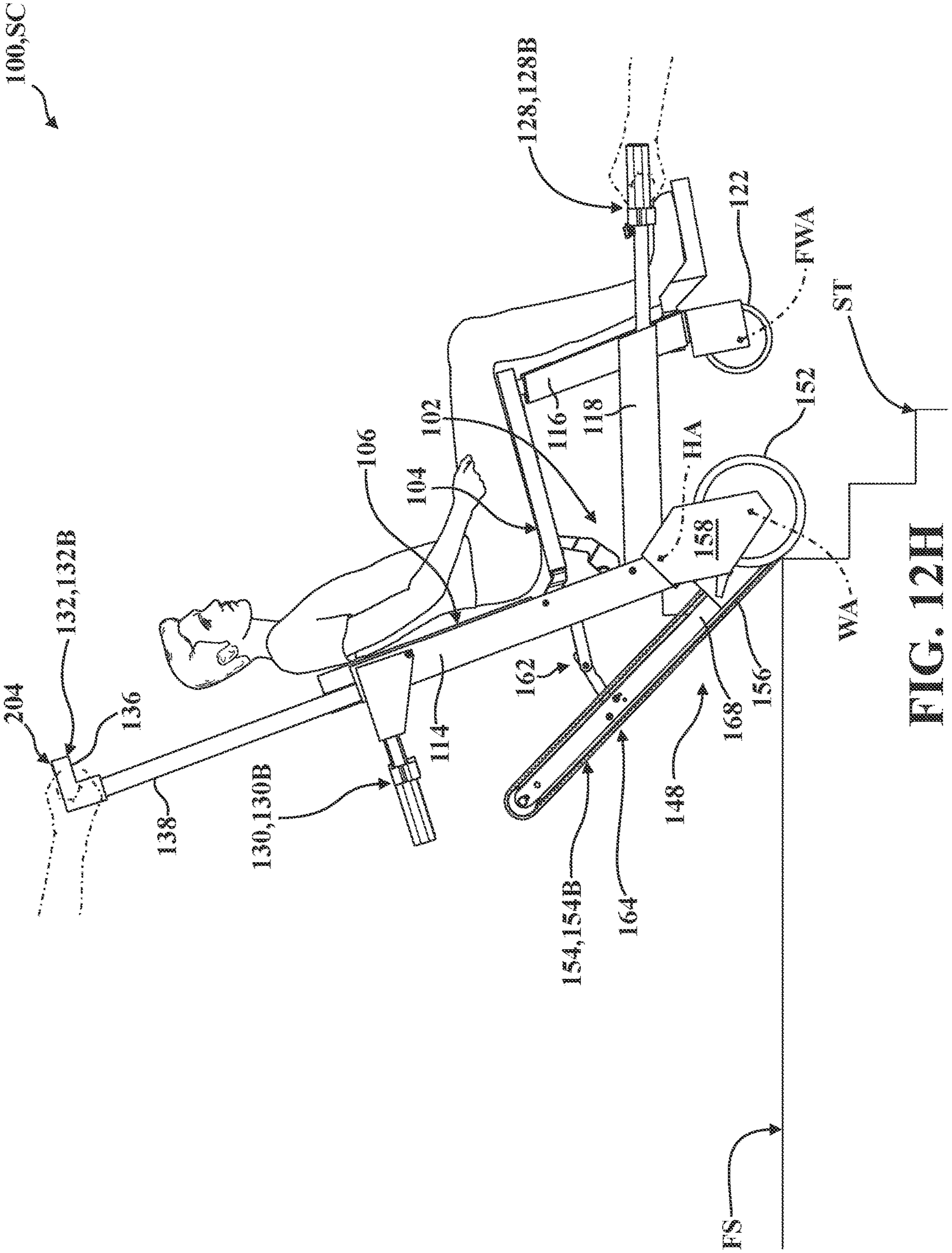
FIG. 12H is another right-side plan view of the patient transport apparatus of FIG. 12C, shown having moved initially down the stairs for descent to bring a belt of the track assembly into contact with the stairs while still supported by the first and second caregivers.
Figure 12I:
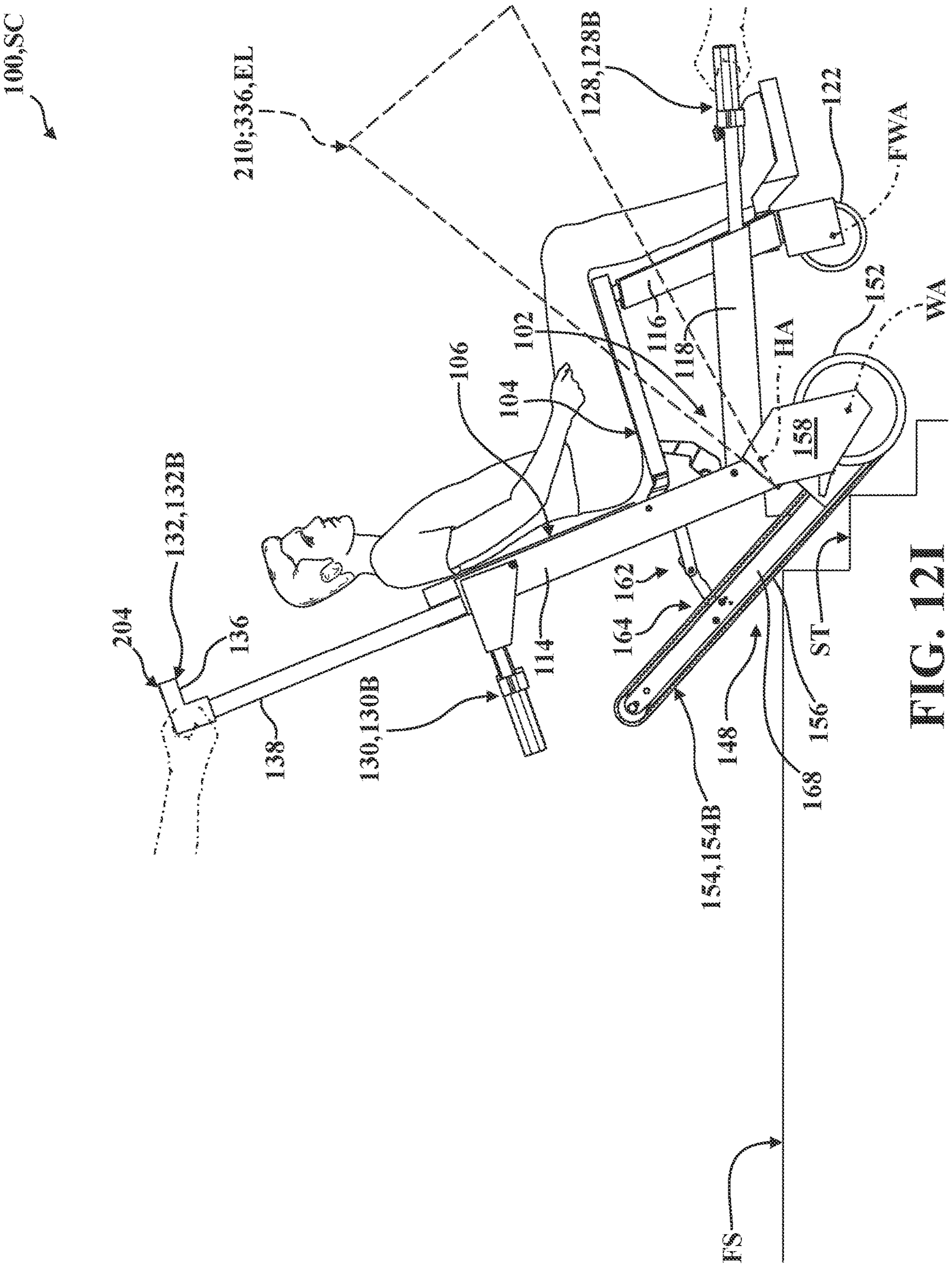
FIG. 12I is another right-side plan view of the patient transport apparatus of FIG. 12C, shown with the belt of the track assembly in contact with the stairs while still supported by the first and second caregivers.

In the representative embodiment illustrated herein, the upper grip 136 generally comprises a first hand grip region 144 arranged adjacent to one of the extension posts 138, and a second hand grip region 146 arranged adjacent to the other of the extension posts 138, each of which may be engaged by the caregiver to support the patient transport apparatus 100 for movement, such as during patient transport up or down stairs ST (see FIGS. 12G-12I).

As noted above, the patient transport apparatus 100 is configured for use in transporting the patient across floor surfaces FS, such as when operating in the stair configuration SC, and for transporting the patient along stairs ST when operating in the stair configuration SC. To these ends, the illustrated patient transport apparatus 100 includes a carrier assembly 148 arranged for movement relative to the support structure 102 between the chair configuration CC and the stair configuration ST. The carrier assembly 148 generally comprises at least one shaft 150 defining a wheel axis WA, one or more rear wheels 152 supported for rotation about the wheel axis WA, at least one track assembly 154 having a belt 156 for engaging stairs ST, and one or more hubs 158 supporting the shaft 150 and the track assembly 154 and the shaft 150 for concurrent pivoting movement about a hub axis HA. Here, movement of the carrier assembly 148 from the chair configuration CC (see FIGS. 1 and 6A) to the stair configuration SC (see FIGS. 2 and 6B) simultaneously deploys the track assembly 154 for engaging stairs ST with the belt 156 and moves the wheel axis WA longitudinally closer to the front support assembly 110 so as to position the rear wheels 152 further underneath the seat section 104 and closer to the front wheels 122.

As is described in greater detail below in connection with FIGS. 12A-12I, the movement of the rear wheels 152 relative to the front wheels 122 when transitioning from the chair configuration CC to the stair configuration SC that is afforded by the patient transport apparatus 100 of the present disclosure affords significant improvements in patient comfort and caregiver usability, in that the rear wheels 152 are arranged to promote stable transport across floor surfaces FS in the chair configuration CC but are arranged to promote easy transitioning from floor surfaces to stairs ST as the patient transport apparatus 100 is "tilted" backwards about the rear wheels 152 (compare FIGS. 12D-12H). Put differently, positioning the rear wheels 152 relative to the front wheels 122 consistent with the present disclosure makes "tilting" the patient transport apparatus 100 significantly less burdensome for the caregivers and, at the same time, much more comfortable for the patient due to the arrangement of the patient's center of gravity relative to the portion of the rear wheels 152 contacting the floor surface FS as the patient transport apparatus 100 is "tilted" backwards to transition into engagement with the stairs ST.

In the representative embodiments illustrated herein, the carrier assembly 148 comprises hubs 158 that are pivotably coupled to the respective rear uprights 114 for concurrent movement about the hub axis HA. Here, one or more bearings, bushings, shafts, fasteners, and the like (not shown in detail) may be provided to facilitate pivoting motion of the hubs 158 relative to the rear uprights 114. Similarly, bearings and/or bushings (not shown) may be provided to facilitate smooth rotation of the rear wheels 152 about the wheel axis WA. Here, the shafts 150 may be fixed to the hubs 158 such that the rear wheels 152 rotate about the shafts 150 (e.g., about bearings supported in the rear wheels 152), or the shafts 150 could be supported for rotation relative to the hubs 158. Each of the rear wheels 152 is also provided with a wheel lock 160 coupled to its respective hub 158 to facilitate inhibiting rotation about the wheel axis WA. The wheel locks 160 are generally pivotable relative to the hubs 158, and may be configured in a number of different ways without departing from the scope of the present disclosure. While the representative embodiment of the patient transport apparatus 100 illustrated herein employs hubs 158 with "mirrored" profiles that are coupled to the respective rear uprights 114 and support discrete shafts 150 and wheel locks 160, it will be appreciated that a single hub 158 and/or a single shaft 150 could be employed. Other configurations are contemplated.

Figure 6B:
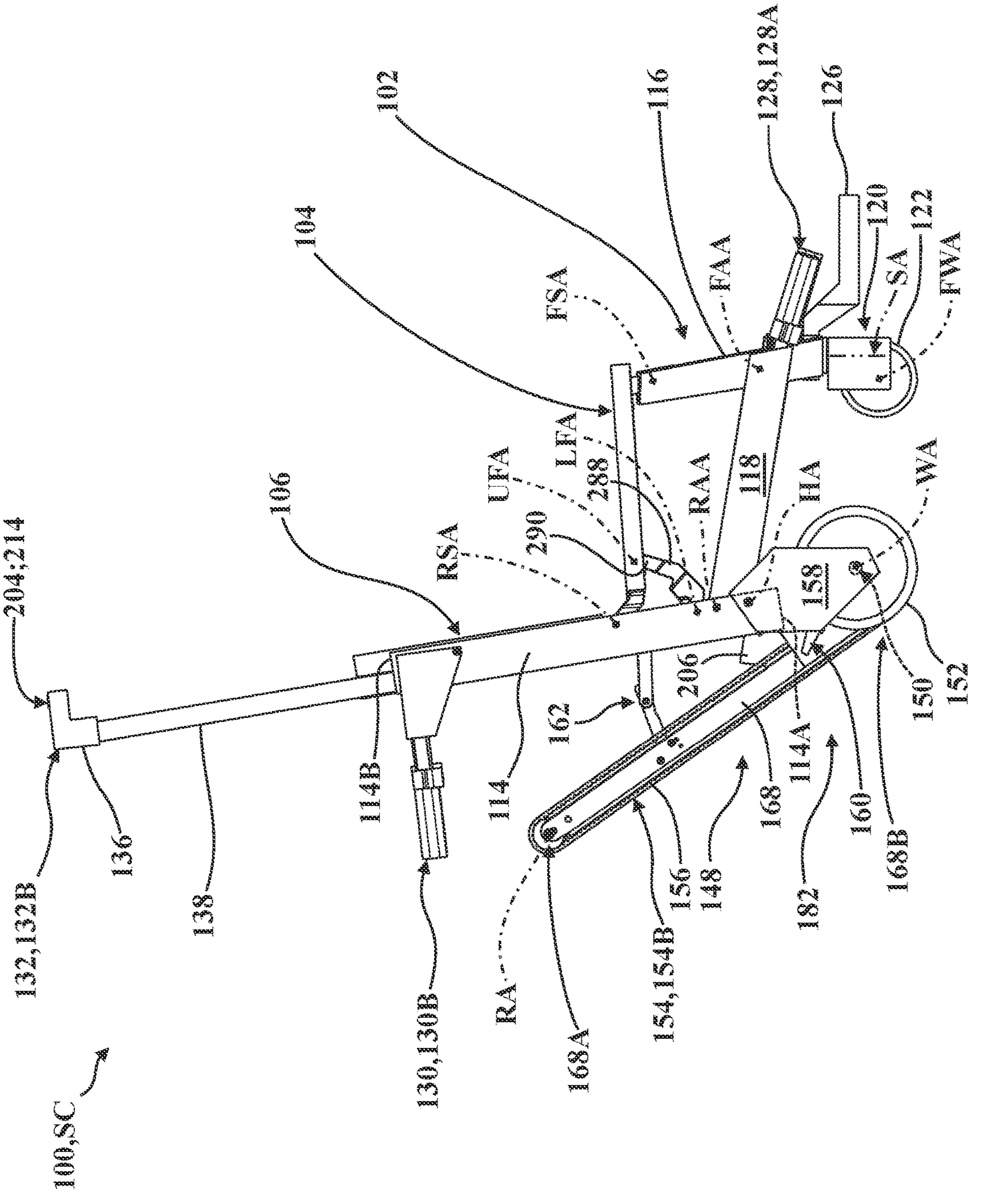
FIG. 6B is another right-side plan view of the patient transport apparatus of FIGS. 5-6A, shown arranged in the stair configuration as depicted in FIGS. 2-3.

As is best depicted in FIGS. 6A-6B, the rear uprights 114 each generally extend between a lower upright end 114A and an upper upright end 114B, with the hub axis HA arranged adjacent to the lower upright end 114A. The lower upright end 114A is supported for movement within the hub 158, which may comprise a hollow profile or recess defined by multiple hub housing components (not shown in detail in FIGS. 6A-6B). The rear uprights 114 may each comprise a generally hollow, extruded profile which supports various components of the patient transport apparatus 100. In the illustrated embodiment, the hub axis HA is arranged generally vertically between the rear arm axis RAA and the wheel axis WA.

Figure 7A:
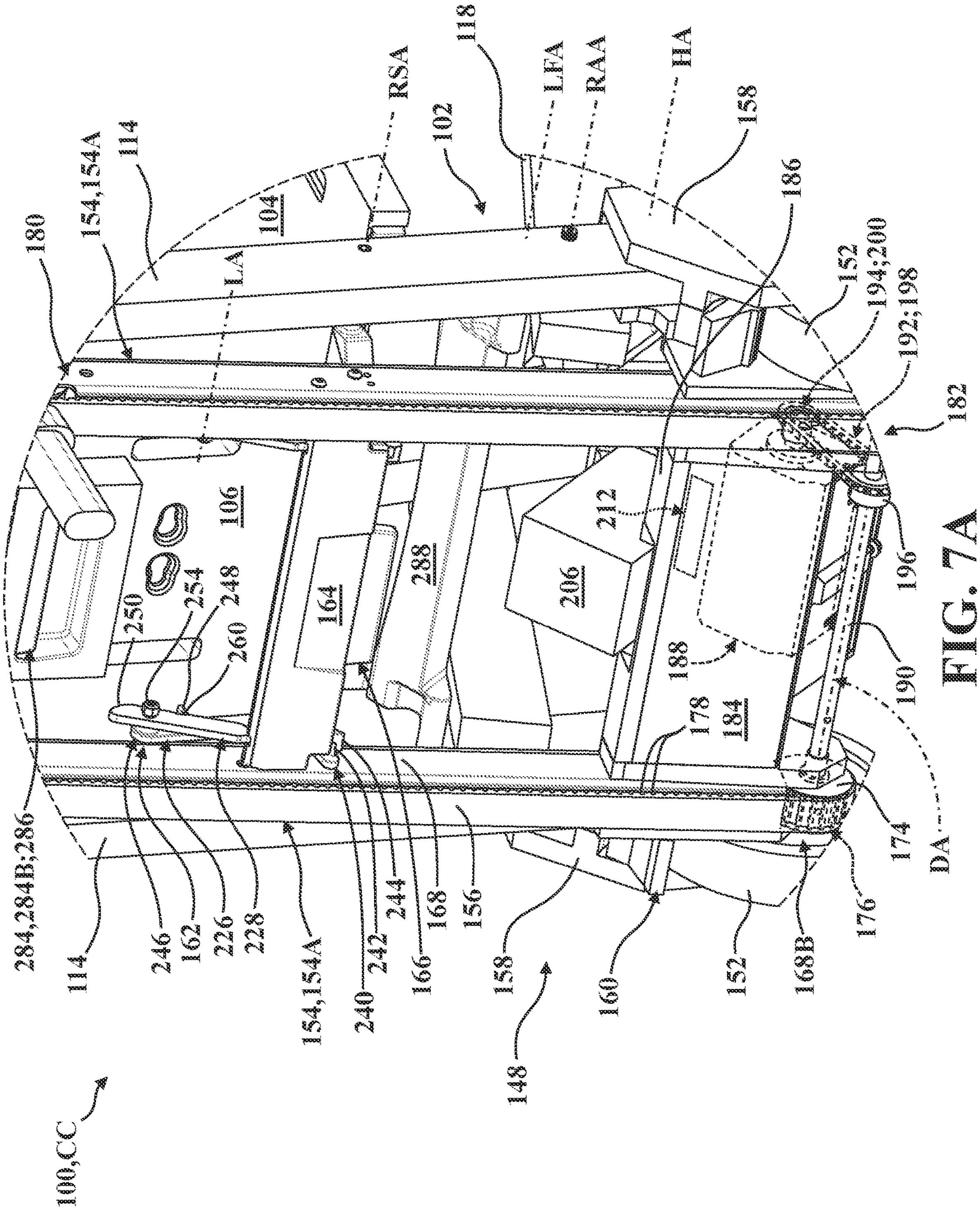
FIG. 7A is a partial rear perspective view of the patient transport apparatus of FIGS. 1-6B, shown arranged in the chair configuration as depicted in FIGS. 1 and 6A, with the deployment lock mechanism shown retaining the track assembly in the retracted position.
Figure 7B:
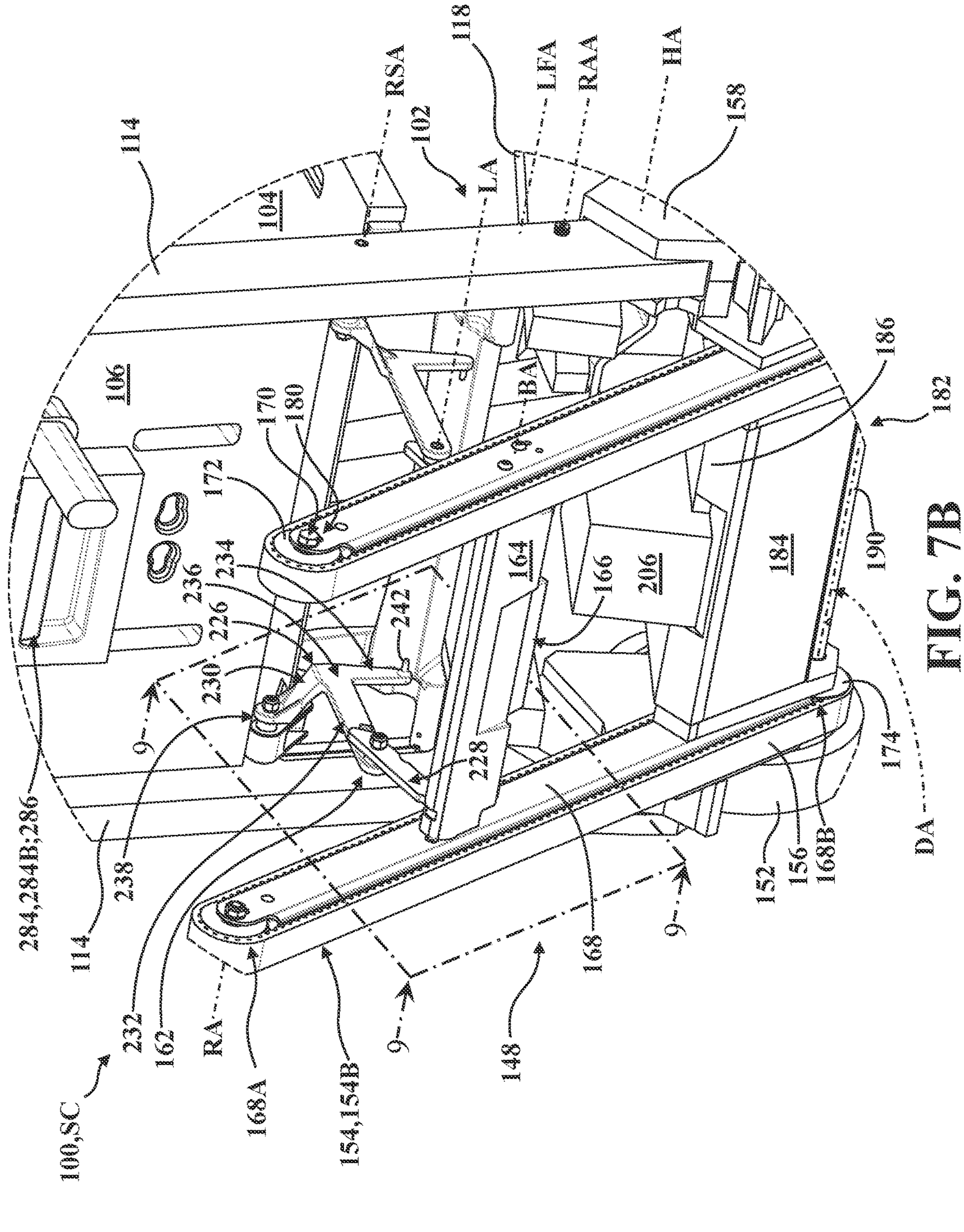
FIG. 7B is another partial rear perspective view of the patient transport apparatus of FIG. 7A, shown arranged in the stair configuration as depicted in FIGS. 2-3 and 6B, with the deployment lock mechanism shown retaining the track assembly in the deployed position.

Referring now to FIGS. 7A-7B, as noted above, the track assemblies 154 move concurrently with the hubs 158 between the chair configuration CC and the stair configuration SC. Here, the track assemblies 154 are arranged in a retracted position 154A when the carrier assembly 148 is disposed in the chair configuration CC, and are disposed in a deployed position 154B when the carrier assembly 148 is disposed in the stair configuration SC. As is described in greater detail below, the illustrated patient transport apparatus 100 comprises a deployment linkage 162 and a deployment lock mechanism 164 with a deployment lock release 166 arranged for engagement by the caregiver to facilitate changing between the retracted position 154A and the deployed position 154B (and, thus, between the chair configuration CC and the stair configuration SC).

In the illustrated embodiment, the patient transport apparatus 100 comprises laterally-spaced track assemblies 154 each having a single belt 156 arranged to contact stairs ST. However, it will be appreciated that other configurations are contemplated, and a single track assembly 154 and/or track assemblies with multiple belts 156 could be employed. The track assemblies 154 each generally comprise a rail 168 extending between a first rail end 168A and a second rail end 168B. The second rail end 168B is operatively attached to the hub 158, such as with one or more fasteners (not shown in detail). An axle 170 defining a roller axis RA is disposed adjacent to the first rail end 168A of each rail 168, and a roller 172 is supported for rotation about the roller axis RA (compare FIGS. 9A-9B). For each of the track assemblies 154, the belt 156 is disposed in engagement with the roller 172 and is arranged for movement relative to the rail 168 in response to rotation of the roller 172 about the roller axis RA. Adjacent to the second rail end 168B of each rail 168, a drive pulley 174 is supported for rotation about a drive axis DA and is likewise disposed in engagement with the belt 156 (see FIGS. 7A-7B; rotation about drive axis DA not shown in detail). Here, the drive pulley 174 comprises outer teeth 176 which are disposed in engagement with inner teeth 178 formed on the belt 156. The track assemblies 154 each also comprise a belt tensioner, generally indicated at 180, configured to adjust tension in the belt 156 between the roller 172 and the drive pulley 174.

In the representative embodiment illustrated herein, the patient transport apparatus 100 comprises a drive system, generally indicated at 182, configured to facilitate driving the belts 156 of the track assemblies 154 relative to the rails 168 to facilitate movement of the patient transport apparatus 100 up and down stairs ST. To this end, and as is depicted in FIG. 7A, the drive system 182 comprises a drive frame 184 and a cover 186 which are operatively attached to the hubs 158 of the carrier assembly 148 for concurrent movement with the track assemblies 154 between the retracted position 154A and the deployed position 154B. A motor 188 (depicted in phantom in FIG. 7A) is coupled to the drive frame 184 and is concealed by the cover 186. The motor 188 is configured to selectively generate rotational torque used to drive the belts 156 via the drive pulleys 174, as described in greater detail below. To this end, a drive axle 190 is coupled to each of the drive pulleys 174 and extends along the drive axis DA laterally between the track assemblies 154. The drive axle 190 is rotatably supported by the drive frame 184, such as by one or more bearings, bushings, and the like (not shown in detail). A geartrain 192 is disposed in rotational communication between the motor 188 and the drive axle 190. To this end, in the embodiment depicted in FIG. 7A, the geartrain 192 comprises a first sprocket 194, a second sprocket 196, and an endless chain 198. Here, the motor 188 comprises an output shaft 200 to which the first sprocket 194 is coupled, and the second sprocket 196 is coupled to the drive axle 190. The endless chain 198, in turn, is supported about the first sprocket 194 and the second sprocket 196 such that the drive axle 190 and the output shaft 200 rotate concurrently. The geartrain 192 may be configured so as to adjust the rotational speed and/or torque of the drive axle 190 relative to the output shaft 200 of the motor, such as by employing differently-configured first and second sprockets 194, 196 (e.g., different diameters, different numbers of teeth, and the like).

While the representative embodiment of the drive system 182 illustrated herein utilizes a single motor 188 to drive the belts 156 of the track assemblies 154 concurrently using a chain-based geartrain 192, it will be appreciated that other configurations are contemplated. By way of non-limiting example, multiple motors 188 could be employed, such as to facilitate driving the belts 156 of the track assemblies 154 independently. Furthermore, different types of geartrains 192 are contemplated by the present disclosure, including without limitation the geartrains 192 which comprise various arrangements of gears, planetary gearsets, and the like.

The patient transport apparatus 100 comprises a control system 202 to, among other things, facilitate control of the track assemblies 154. To this end, and as is depicted schematically in FIG. 4, the representative embodiment of the control system 202 generally comprises a user interface 204, a battery 206, one or more sensors 208, and one or more light modules 210 which are disposed in electrical communication with a controller 212. As will be appreciated from the subsequent description below, the controller 212 may be of a number of different types, styles, and/or configurations, and may employ one or more microprocessors for processing instructions or an algorithm stored in memory to control operation of the motor 188, the light modules 210, and the like. Additionally or alternatively, the controller 212 may comprise one or more sub-controllers, microcontrollers, field programmable gate arrays, systems on a chip, discrete circuitry, and/or other suitable hardware, software, and/or firmware that is capable of carrying out the functions described herein. The controller 212 is coupled to various electrical components of the patient transport apparatus 100 (e.g., the motor 188) in a manner that allows the controller 212 to control or otherwise interact with those electrical components the (e.g., via wired and/or wireless electrical communication). In some embodiments, the controller 212 may generate and transmit control signals to the one or more powered devices, or components thereof, to drive or otherwise facilitate operating those powered devices, or to cause the one or more powered devices to perform one or more of their respective functions.

The controller 212 may utilize various types of sensors 208 of the control system 202, including without limitation force sensors (e.g., load cells), timers, switches, optical sensors, electromagnetic sensors, motion sensors, accelerometers, potentiometers, infrared sensors, ultrasonic sensors, mechanical limit switches, membrane switches, encoders, and/or cameras. One or more sensors 208 may be used to detect mechanical, electrical, and/or electromagnetic coupling between components of the patient transport apparatus 100. Other types of sensors 208 are also contemplated. Some of the sensors 208 may monitor thresholds movement relative to discrete reference points. The sensors 208 can be located anywhere on the patient transport apparatus 100, or remote from the patient transport apparatus 100. Other configurations are contemplated.

It will be appreciated that the patient transport apparatus 100 may employ light modules 210 to, among other things, illuminate the user interface 204, direct light toward the floor surface FS, and the like. It will be appreciated that the light modules 210 can be of a number of different types, styles, configurations, and the like (e.g., light emitting diodes LEDs) without departing from the scope of the present disclosure. Similarly, it will be appreciated that the user interface 204 may employ user input controls of a number of different types, styles, configurations, and the like (e.g., capacitive touch sensors, switches, buttons, and the like) without departing from the scope of the present disclosure.

The battery 206 provides power to the controller 212, the motor 188, the light modules 210, and other components of the patient transport apparatus 100 during use, and is removably attachable to the cover 186 of the drive system 182 in the illustrated embodiment (see FIG. 7A; attachment not shown in detail). The user interface 204 is generally configured to facilitate controlling the drive direction and drive speed of the motor 188 to move the belts 156 of the track assembly 154 and, thus, allow the patient transport apparatus 100 to ascend or descend stairs ST. Here, the user interface 204 may comprise one or more activation input controls 214 to facilitate driving the motor 188 in response to engagement by the caregiver, one or more direction input controls 216 to facilitate changing the drive direction of the motor 188 in response to engagement by the caregiver, and/or one or more speed input controls 218 to facilitate operating the motor 188 at different predetermined speeds selectable by the caregiver. The user interface 204 may also comprise various types of indicators 220 to display information to the caregiver. It will be appreciated that the various components of the control system 202 introduced above could be configured and/or arranged in a number of different ways, and could communicate with each other via one or more types of electrical communication facilitated by wired and/or wireless connections. Other configurations are contemplated.

The activation input controls 214 may be arranged in various locations about the patient transport apparatus. In the illustrated embodiments, a first activation input control 222 is disposed adjacent to the first hand grip region 144 of the handle assembly 132, and a second activation input control 224 is disposed adjacent to the second hand grip region 146. In the illustrated embodiment, the user interface 204 is configured such that the caregiver can engage either of the activation input controls 222, 224 with a single hand grasping the upper grip 136 of the handle assembly 132 during use.

In the illustrated embodiments, the patient transport apparatus 100 is configured to limit movement of the belts 156 relative to the rails 168 during transport along stairs ST in an absence of engagement with the activation input controls 214 by the caregiver. Put differently, one or more of the controller 212, the motor 188, the geartrain 192, and/or the track assemblies 154 may be configured to "brake" or otherwise prevent movement of the belts 156 unless the activation input controls 214 are engaged. To this end, the motor 188 may be controlled via the controller 212 to prevent rotation (e.g., driving with a 0% pulse-width modulation PWM signal) in some embodiments. However, other configurations are contemplated, and the patient transport apparatus 100 could be configured to prevent movement of the belts 156 in other ways. By way of non-limiting example, a mechanical brake system (not shown) could be employed in some embodiments.

Referring now to FIGS. 7A-9B, the patient transport apparatus 100 employs the deployment lock mechanism 164 to releasably secure the track assembly 154 in the retracted position 154A and in the deployed position 154B. As is described in greater detail below, the deployment lock release 166 is arranged for engagement by the caregiver to move between the retracted position 154A and the deployed position 154B. The deployment lock mechanism 164 is coupled to the track assemblies 154 for concurrent movement, and the deployment linkage 162 is coupled between the deployment lock mechanism 164 and the support structure 102. The illustrated deployment linkage 162 generally comprises connecting links 226 which are pivotably coupled to the support structure 102, and brace links 228 which are coupled to the deployment lock mechanism 164 and are respectively pivotably coupled to the connecting links 226.

Figure 9A:
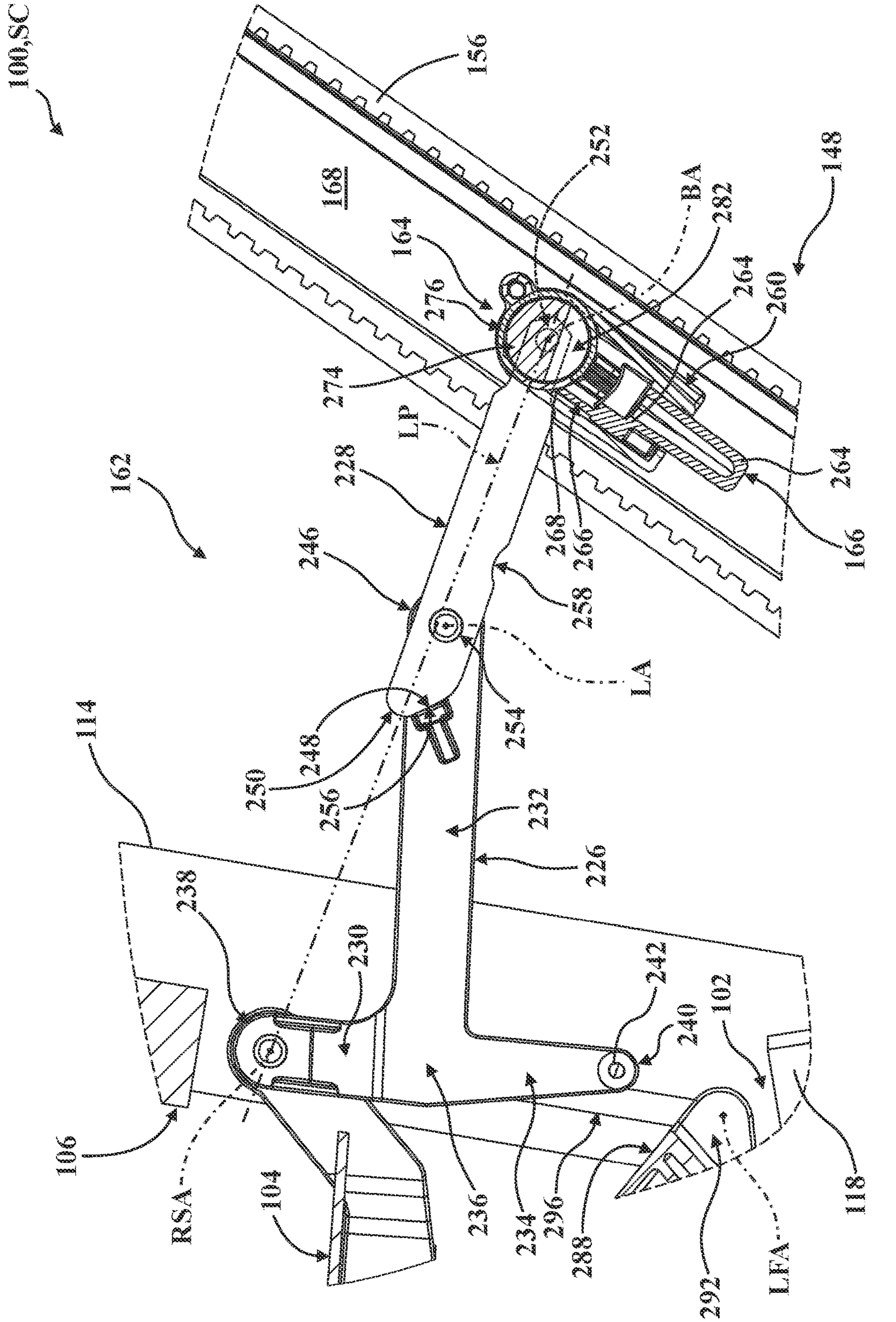
FIG. 9A is a partial section view generally taken through plane 9 of FIGS. 7B-8, shown with the deployment lock mechanism retaining the track assembly in the deployed position.

As is best shown in FIG. 9A, the connecting links 226 each comprise or otherwise define a forward pivot region 230, a connecting pivot region 232, a trunnion region 234, and an interface region 236. The forward pivot regions 230 extend from the interface regions 236 to forward pivot mounts 238 which are pivotably coupled to the rear uprights 114 about the rear seat axis RSA, such as by one or more fasteners, bushings, bearings, and the like (not shown in detail). Here, because the rear uprights 114 are spaced laterally away from each other at a distance large enough to allow the track assemblies 154 to "nest" therebetween in the retracted position 154A (see FIG. 7A), the forward pivot regions 230 of the connecting links 226 extend at an angle away from the rear uprights 114 at least partially laterally towards the track assemblies 154. The trunnion regions 234 extend generally vertically downwardly from the interface regions 236 to trunnion mount ends 240, and comprise trunnions 242 which extend generally laterally and are arranged to abut trunnion catches 244 of the deployment lock mechanism 164 to retain the track assemblies 154 in the retracted position 154A (see FIG. 7A) as described in greater detail below. The connecting pivot regions 232 extend longitudinally away from the interface regions 236 to rearward pivot mounts 246 which pivotably couple to the brace links 228 about a link axis LA. The connecting pivot regions 232 also comprise link stops 248 that are shaped and arranged to abut the brace links 228 in the deployed position 154B (see FIG. 7B), as described in greater detail below. The connecting links 226 are each formed as separate components with mirrored profiles in the illustrated embodiments, but could be realized in other ways, with any suitable number of components.

The brace links 228 each generally extend between an abutment link end 250 and a rearward link mount 252, with a forward link mount 254 arranged therebetween. The forward link mounts 254 are pivotably coupled to the rearward pivot mounts 246 of the connecting links 226 about the link axis LA, such as by one or more fasteners, bushings, bearings, and the like (not shown in detail). The rearward link mounts 252 are each operatively attached to the deployment lock mechanism 164 about a barrel axis BA, as described in greater detail below. The brace links 228 each define a link abutment surface 256 disposed adjacent to the abutment link end 250 which are arranged to abut the link stops 248 of the connecting links 226 in the deployed position 154B (see FIGS. 7B and 9B). The brace links 228 also define a relief region 258 formed between the forward link mount 254 and the rearward link mount 252. The relief regions 258 are shaped to at least partially accommodate the link stops 248 of the connecting links 226 when the track assemblies 154 are in the retracted position 154A (not shown in detail).

Figure 8:
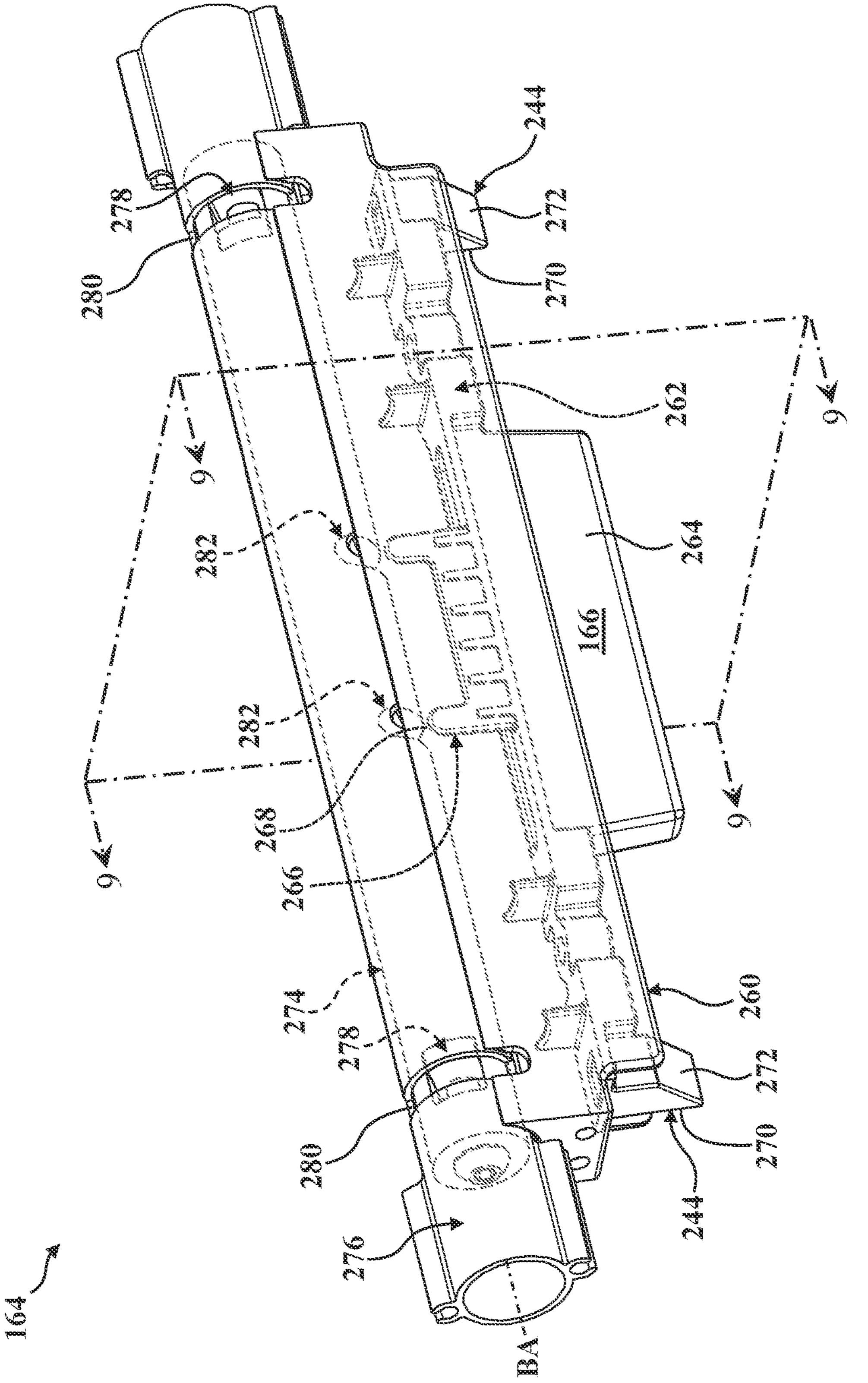
FIG. 8 is a perspective view of portions of the deployment lock mechanism of FIGS. 7A-7B, shown having a deployment lock release.

Referring now to FIG. 8, the deployment lock release 166 of the deployment lock mechanism 164 is supported for movement within a lock housing 260 which, in turn, is coupled to and extends laterally between the rails 168 of the track assemblies 154 (e.g., secured via fasteners; not shown). The deployment lock release 166 is formed as a unitary component in the illustrated embodiment, and generally comprises a deployment body 262, a deployment button 264, one or more push tabs 266, and the trunnion catches 244. The deployment button 264 is arranged for engagement by the caregiver, extends vertically downwardly from the deployment body 262, and is disposed laterally between the trunnion catches 244. The one or more push tabs 266 extend vertically upwardly from the deployment body 262 to respective push tab ends 268, and are employed to facilitate releasing the track assemblies 154 from the deployed position 154B as described in greater detail below. The trunnion catches 244 each define a retention face 270 arranged to abut the trunnions 242 of the connecting links 226 when the track assemblies 154 are in the retracted position 154A (see FIG. 7A; not shown in detail). The trunnion catches 244 also each define a trunnion cam face 272 arranged to engage against the trunnions 242 of the connecting links 226 as the track assemblies 154 are brought toward the deployed position 154B from the retracted position 154A. While not shown in detail throughout the drawings, engagement of the trunnions 242 against the trunnion cam faces 272 urges the deployment body 262 vertically upwardly within the lock housing 260 until the trunnions 242 come out of engagement with the trunnion cam faces 272. Here, one or more biasing elements (not shown) may bias the deployment lock release 166 vertically downwardly within the lock housing 260 such that disengagement of the trunnions 242 with trunnion cam faces 272 occurs as the track assemblies 154 reach the deployed position 154B and the trunnions 242 come into engagement with the retention faces 270 (see FIG. 7A; not shown in detail).

With continued reference to FIG. 8, the deployment lock mechanism 164 also comprises a barrel 274 supported for rotation about the barrel axis BA (compare FIGS. 9A-9B) within a cylinder housing 276 which, in turn, is coupled to and extends laterally between the rails 168 of the track assemblies 154 (e.g., secured via fasteners; not shown). The barrel 274 defines barrel notches 278 which receive the rearward link mounts 252 of the brace links 228 therein. Here, the cylinder housing 276 comprises transverse apertures 280 aligned laterally with the barrel notches 278 and shaped to receive the brace links 228 therethrough to permit the brace links 228 to move generally concurrently with the barrel 274 relative to the cylinder housing 276. Here, the barrel notches 278 and the rearward link mounts 252 are provided with complimentary profiles that allow the brace links 228 to pivot about the barrel axis BA as the barrel 274 rotates within the cylinder housing 276. The barrel notches 278 may be sized slightly larger than the rearward link mounts 252 to prevent binding. However, it will be appreciated that other configurations are contemplated. The barrel 274 also comprises push notches 282 arranged laterally between the barrel notches 278. The push notches 282 are shaped to receive the push tab ends 268 of the push tabs 266 to facilitate releasing the track assemblies 154 from the deployed position 154B in response to the caregiver engaging the deployment button 264. As depicted in FIG. 9A, retention of the track assemblies 154 in the deployed position 154B is achieved based on the geometry of the deployment linkage 162 acting as an "over center" lock.

Figure 9B:
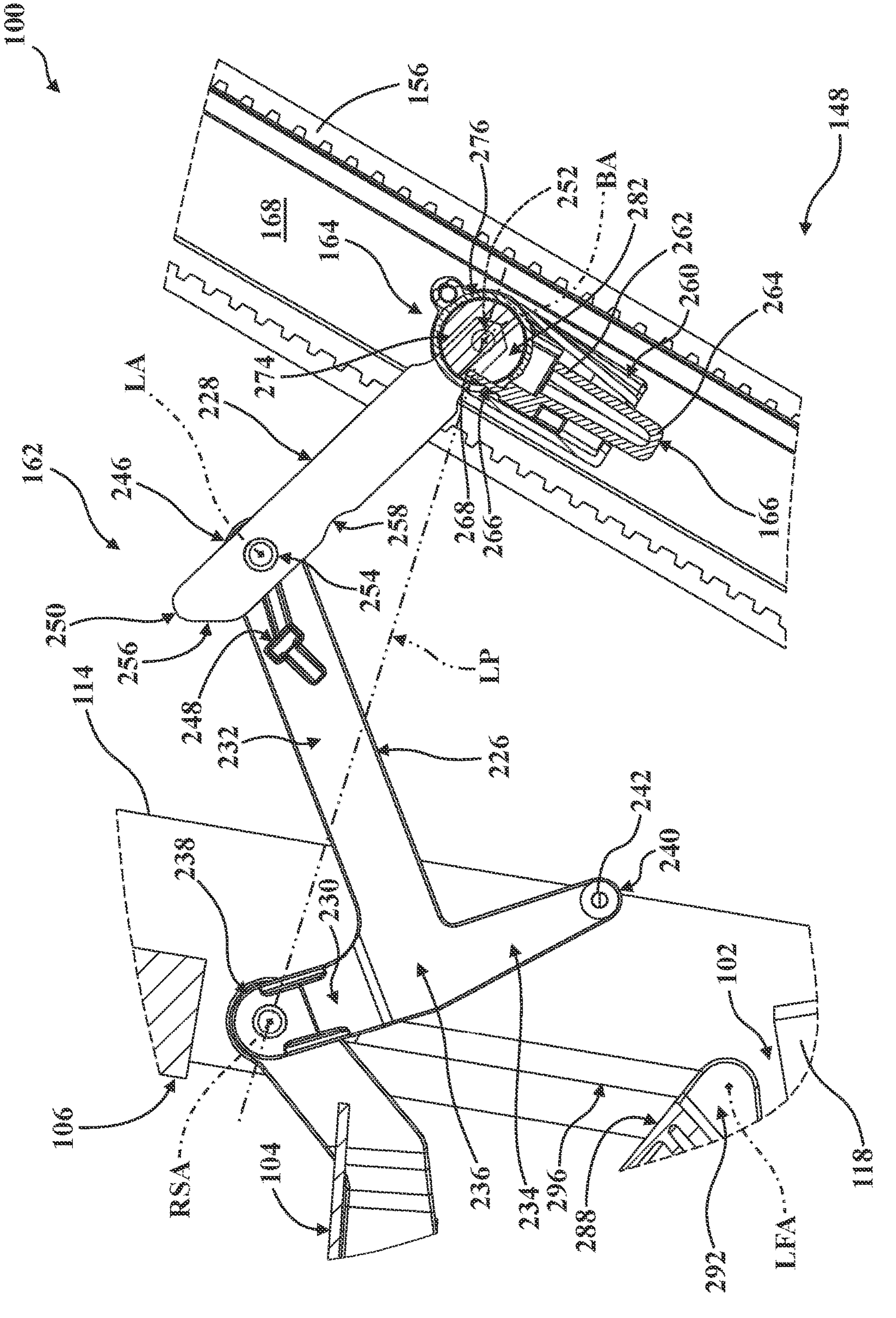
FIG. 9B is another partial section view of the portions of the patient transport apparatus depicted in FIG. 9A, shown with the track assembly having moved from the deployed position in response to engagement of the deployment lock release of the deployment lock mechanism.

More specifically, when the track assemblies 154 move to the deployed position 154B, the link axis LA is arranged below a linkage plane LP defined extending through the rear seat axis RSA and the barrel axis BA, and will remain in the deployed position 154B until the link axis LA is moved above the linkage plane LP (see FIG. 9B). To this end, the caregiver can engage the deployment button 264 to bring the push tab ends 268 of the push tabs 266 into engagement with the push notches 282 formed in the barrel 274 which, in turn, rotates the barrel 274 about the barrel axis BA as the push tab ends 268 contact the barrel 274 within the push notches 282, and pivots the brace links 228 about the barrel axis BA to cause the link axis LA to move above the linkage plane LP as shown in FIG. 9B. It will be appreciated that the deployment lock mechanism 164 could be configured in other ways sufficient to releasably lock the track assemblies 154 in the retracted position 154A and the deployed position 154B, and it is contemplated that one lock mechanism could lock the track assemblies 154 in the retracted position 154A while a different lock mechanism could lock the track assemblies 154 in the deployed position 154B. Other configurations are contemplated.

Figure 10:
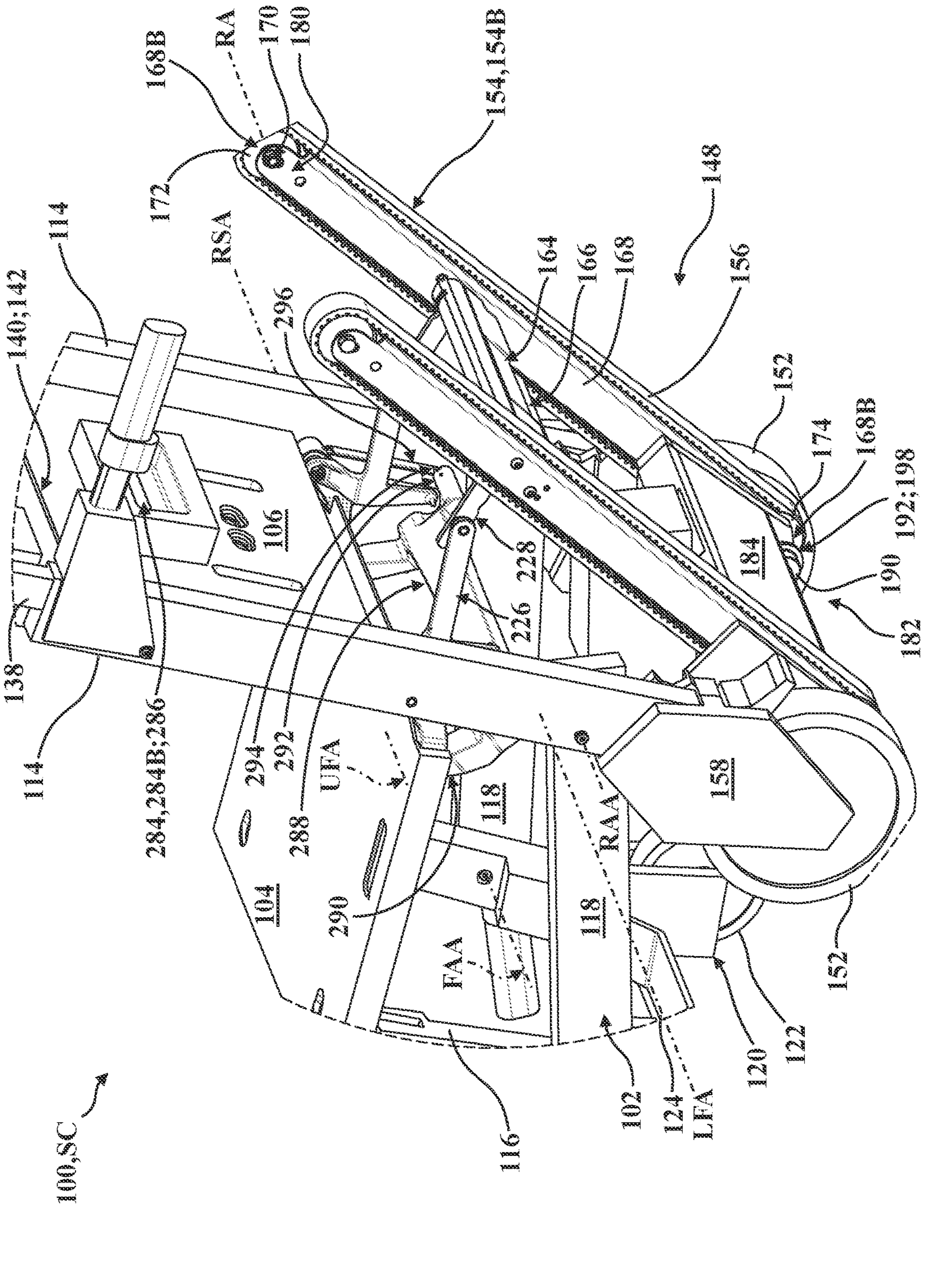
FIG. 10 is a partial rear perspective view of the patient transport apparatus of FIGS. 1-9B, showing additional detail of the folding lock mechanism.
Figure 11A:
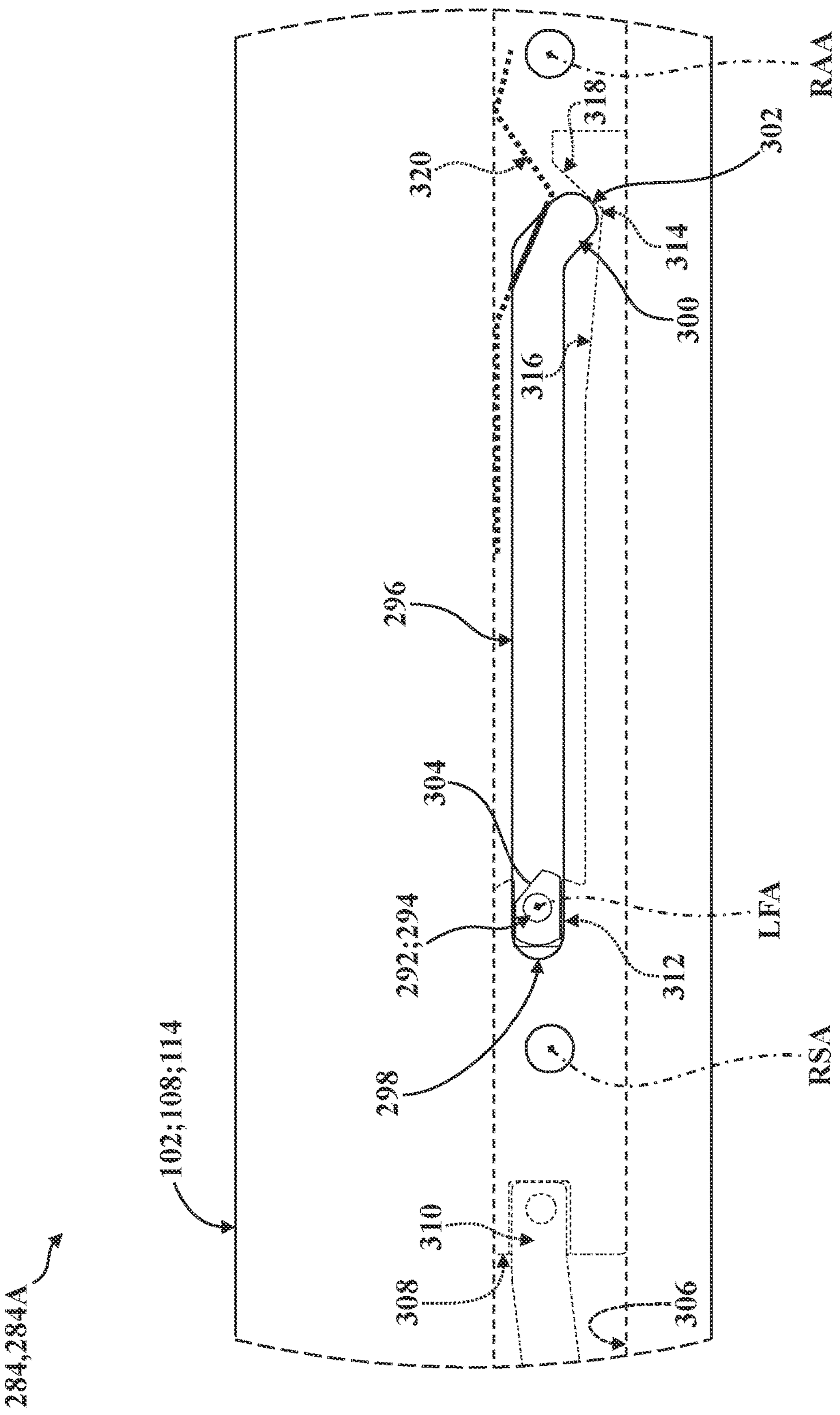
FIG. 11A is a partial schematic view of portions of the folding lock mechanism of the patient transport apparatus of FIGS. 1-10, shown arranged in a stow lock configuration corresponding to the stowed configuration as depicted in FIG. 5.
Figure 11B:
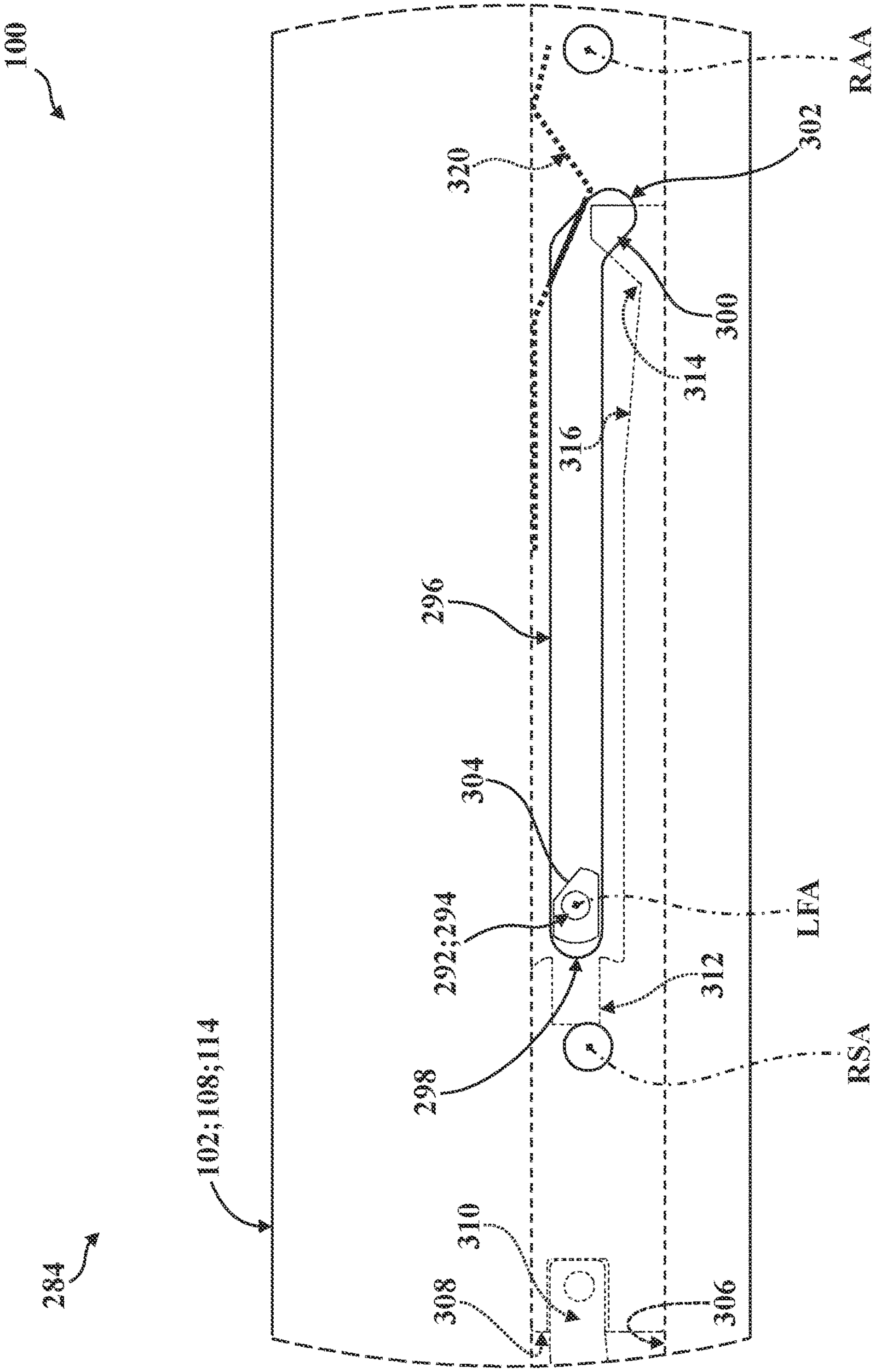
FIG. 11B is another partial schematic view of the portions of the folding lock mechanism of FIG. 11A, shown having moved out of the stow lock configuration to enable operation in the chair configuration as depicted in FIG. 6A.
Figure 11C:
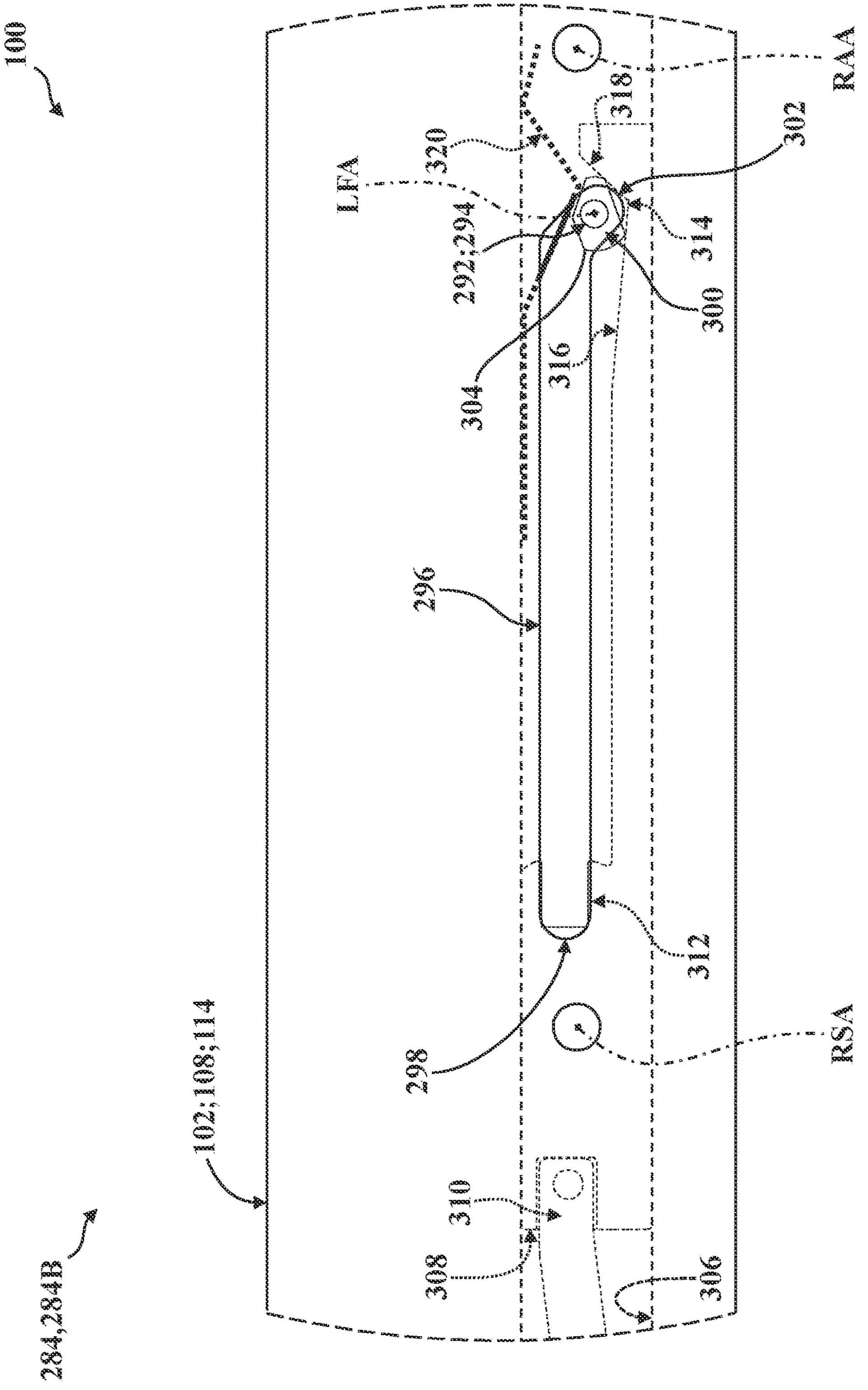
FIG. 11C is another partial schematic view of the portions of the folding lock mechanism of FIGS. 11A-11B, shown arranged in a use lock configuration corresponding to the chair configuration as depicted in FIG. 6A.
Figure 11D:
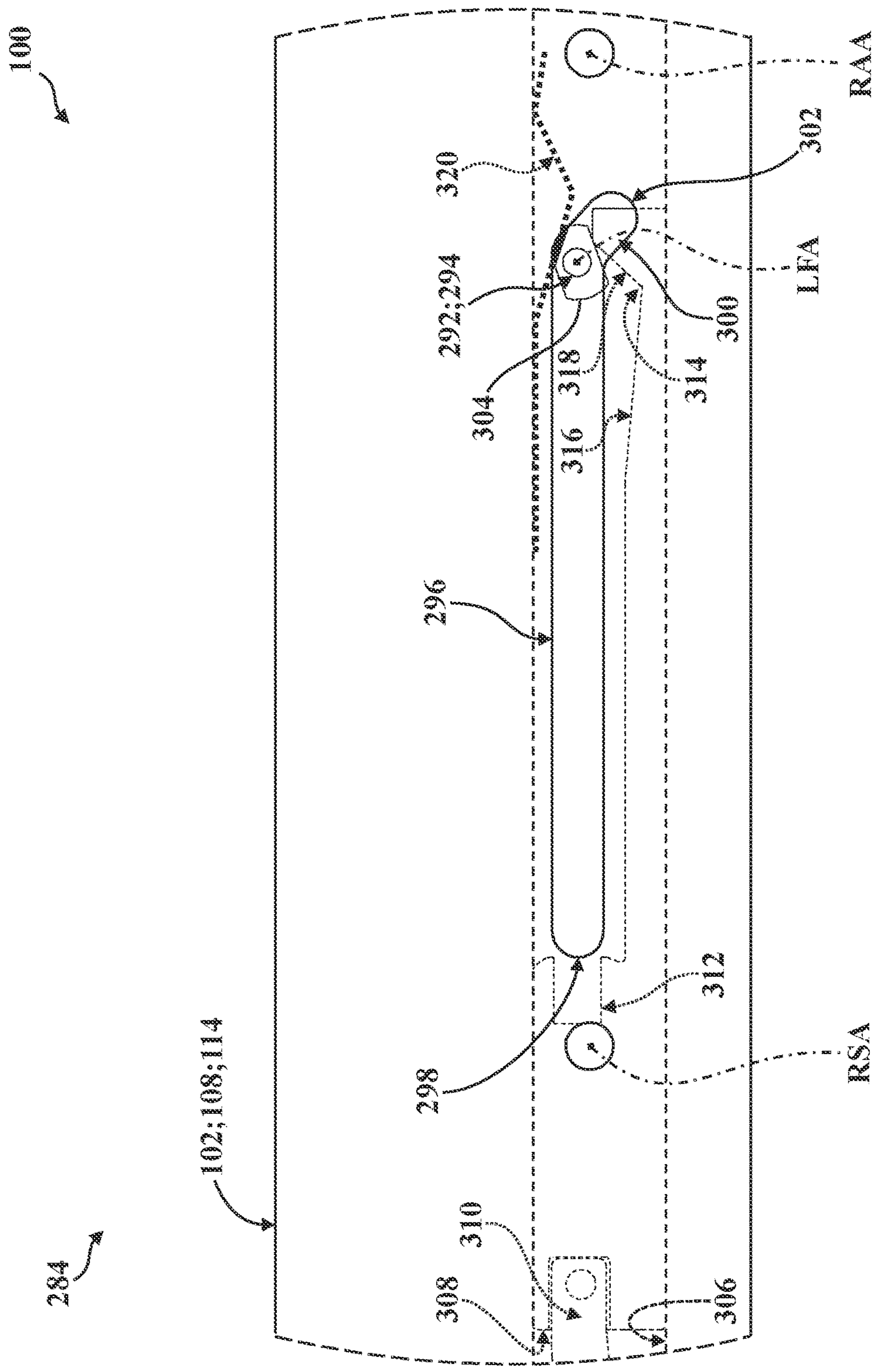
FIG. 11D is another partial schematic view of the portions of the folding lock mechanism of FIGS. 11A-11C, shown having moved out of the use lock configuration to enable operation in the stowed configuration as depicted in FIG. 5.

Referring now to FIGS. 10-11D, the patient transport apparatus 100 employs a folding lock mechanism 284 to facilitate changing between the stowed configuration WC (see FIG. 5) and the chair configuration CC (see FIG. 6A). To this end, the folding lock mechanism 284 generally comprises a folding lock release 286 (see FIG. 10) operatively attached to the back section 106 and arranged for engagement by the caregiver to releasably secure the folding lock mechanism 284 between a stow lock configuration 284A to maintain the stowed configuration WC, and a use lock configuration 284B to prevent movement to the stowed configuration WC from the chair configuration CC or from the stair configuration SC. To this end, the folding lock mechanism 284 generally comprises a folding link 288 with folding pivot mounts 290 and sliding pivot mounts 292. The folding pivot mounts 290 are pivotably coupled to the seat section 104 about an upper folding axis UFA that is arranged between the rear seat axis RSA and the front seat axis FSA (see FIGS. 2 and 6A-6B; pivoting not shown in detail). The sliding pivot mounts 292 each comprise a keeper shaft 294 which extends along a lower folding axis LFA which is arranged substantially parallel to the upper folding axis UFA. The keeper shafts 294 are disposed within and slide along slots 296 formed in each of the rear uprights 114. For the illustrative purposes, the keeper shafts 294 are shown in FIGS. 11A-11D as sized significantly smaller than the width of the slots 296. The slots 296 extend generally vertically along the rear uprights 114 between an upper slot end 298 and a transition slot region 300, and extend at an angle from the transition slot region 300 to a lower slot end 302. The slots 296 are disposed vertically between the rear seat axis RSA and the rear arm axis RAA in the illustrated embodiment. In some embodiments, the folding link 288, the slots 296, and or other portions of the folding lock mechanism 284 may be similar to as is disclosed in U.S. Pat. No. 6,648,343, previously referenced. Other configurations are contemplated.

In the representative embodiment illustrated herein, the folding lock mechanism 284 is configured to selectively retain the keeper shafts 294 adjacent to the upper slot ends 298 of the slots 296 in the stow lock configuration 284A (see FIG. 11A), and to selectively retain the keeper shafts 294 adjacent to the lower slot ends 302 of the slots 296 in the use lock configuration 284B (see FIG. 11C). To this end, keeper elements 304 are coupled to the keeper shafts 294 and move within upright channels 306 formed in the rear uprights 114. Here too, a carriage 308 is slidably supported within the upright channels 306 for movement relative to the slots 296 in response to engagement of the folding lock release 286 via the caregiver. A folding linkage assembly 310 generally extends in force-translating relationship between the folding lock release 286 and the carriage 308. While not shown in detail, the folding lock release 286 is supported by the back section 106 and moves in response to engagement by the caregiver, and the folding linkage assembly 310 comprises one or more components which may extend through the back section 106 and into the rear uprights 114 in order to facilitate movement of the carriage 308 within the upright channels 306 in response to user engagement of the folding lock release 286. As will be appreciated from the subsequent description below, FIGS. 11A and 11C represent an absence of user engagement with the folding lock release 286, whereas FIGS. 11B and 11D represent user engagement with the folding lock release 286.

The carriage 308 generally defines an upper pocket 312 shaped to receive and accommodate the keeper element 304 when the folding lock mechanism 284 is in the stow lock configuration 284A with the patient transport apparatus 100 arranged in the stowed configuration WC, and a lower pocket 314 shaped to receive and accommodate the keeper element 304 when the folding lock mechanism 284 is in the use lock configuration 284B with the patient transport apparatus 100 arranged in the chair configuration CC or in the stair configuration SC. In the illustrated embodiment, the upper pocket 312 has a generally U-shaped profile and the lower pocket 314 has a generally V-shape profile which defines a upper ramp 316 and a lower ramp 318. The keeper element 304 has a par of substantially parallel sides which are shaped to be received within the upper pocket 312 (not shown in detail).

As shown in FIG. 11A, engagement between the keeper element 304 and the upper pocket 312 of the carriage 308 prevents movement of the keeper shaft 294 along the slot 296. When the caregiver engages the folding lock release 286 to move the folding lock mechanism 284 out of the stow lock configuration 284A, the corresponding movement of the folding linkage assembly 310 causes the carriage 308 to travel vertically upwardly within the upright channel 306 until the keeper element 304 comes out of engagement with the upper pocket 312, as shown in FIG. 11B. Here, the keeper shaft 294 can subsequently traverse the slot 296 toward the lower slot end 302 in order to move to the use lock configuration 284B depicted in FIG. 11C (movement not shown; compare FIG. 11B to FIG. 11C). While not shown, it will be appreciated that the carriage 308, the folding linkage assembly 310, and or the folding lock release 286 may comprise one or more biasing elements arranged to urge the carriage 308 vertically down the upright channel 306.

When in the use lock configuration 284B depicted in FIG. 11C, the keeper shaft 294 is disposed adjacent to the lower slot end 302 of the slot 296 such that the keeper element 304 is generally disposed adjacent to or otherwise in the lower pocket 314, such as in contact with the upper ramp 316 and the lower ramp 318. Here, the keeper element 304 is retained via a folding lock biasing element 320 (depicted schematically) that is coupled to the rear upright 114 (e.g., disposed within the upright channel 306). To this end, the keeper element 304 has a notch side that abuts the folding lock biasing element 320 and is arranged transverse (e.g., non-parallel) to the two parallel sides (not shown in detail). The engagement between the keeper element 304 and folding lock biasing element 320 urges the keeper shaft 294 toward the lower slot end 302 of the slot 296 to maintain operation in the use lock configuration 284B depicted in FIG. 11C. When the caregiver engages the folding lock release 286 to move the folding lock mechanism 284 out of the use lock configuration 284B, the corresponding movement of the folding linkage assembly 310 causes the carriage 308 to travel vertically upwardly within the upright channel 306. Here, as the lower ramp 318 of the carriage 308 defined by the lower pocket 314 moves together with the keeper element 304 disposed in engagement therewith, the folding lock biasing element 320 compresses as the keeper shaft 294 travels out of the transition slot region 300, as shown in FIG. 11D. Here, the keeper shaft 294 can subsequently traverse the slot 296 toward the upper slot end 298 in order to move to the stow lock configuration 284A depicted in FIG. 11A (movement not shown; compare FIG. 11D to FIG. 11A). It will be appreciated that the folding lock mechanism 284 could be configured in other ways sufficient to releasably lock the patient transport apparatus in the stowed configuration WC, the stair configuration SC, and the chair configuration CC, and it is contemplated that one lock mechanism could lock the patient transport apparatus 100 in the stowed configuration WC while a different lock mechanism could lock the patient transport apparatus 100 in the stair configuration SC and/or the chair configuration CC. Other configurations are contemplated.

FIGS. 12A-12I successively depict exemplary steps of transporting a patient supported on the patient transport apparatus 100 down stairs ST. In FIG. 12A, a first caregiver is shown engaging the pivoting handle assemblies 130 in the engagement position 130B to illustrate approaching stairs ST while the patient transport apparatus 100 is moved along floor surfaces FS in the chair configuration CC. FIG. 12B depicts a second caregiver engaging the front handle assemblies 128 after having moved them to the extended position 128B. In FIG. 12C, the patient transport apparatus 100 has been moved closer to the stairs ST with the first caregiver still engaging the pivoting handle assemblies 130 and with the second caregiver still engaging the front handle assemblies 128. In FIG. 12D, the first caregiver has moved the handle assembly 132 to the extended position 132B as the second caregiver continues to engage the front handle assemblies 128.

In FIG. 12E, the first caregiver has engaged the deployment lock release 166 to move the patient transport apparatus 100 out of the chair configuration CC and into the stair configuration SC. Here, the track assemblies 154 are shown arranged between the retracted position 154A and the deployed position 154B, and the rear wheels 152 move closer to the front wheels 122, as the first caregiver pulls the track assemblies 154 away from the back section 106. In FIG. 12F, the patient transport apparatus 100 is shown in the stair configuration SC with the track assemblies 154 arranged in the deployed position 154B. Here, the rear wheels 152 are positioned significantly closer to the front wheels 122 compared to operation in the chair configuration CC, and are also arranged further under the seat section 104. It will be appreciated that transitioning the patient transport apparatus 100 from the chair configuration CC to the stair configuration SC has resulted in minimal patient movement relative to the support structure 102 as the carrier assembly 148 pivots about the hub axis HA and moves the rear wheels 152 closer to the front wheels 122 in response to movement of the track assemblies 154 to the deployed position 154B.

Furthermore, while the arrangement of patient's center of gravity has not changed significantly relative to the support structure 102, the longitudinal distance which extends between the patient's center of gravity and the location at which the rear wheels 152 contact the floor surface FS has shortened considerably. Because of this, the process of "tilting" the patient transport apparatus 100 (e.g., about the rear wheels 152) to transition toward contact between the track assemblies 154 and the stairs ST, as depicted in FIG. 12G, is significantly more comfortable for the patient than would otherwise be the case if the patient transport apparatus 100 were "tilted" about the rear wheels 152 from the chair configuration CC (e.g., with the rear wheels 152 positioned further away from the front wheels 122). Put differently, the arrangement depicted in FIG. 12G is such that the patient is much less likely to feel uncomfortable, unstable, or as if they are "falling backwards" during the "tilting" process. Here too, the caregivers are afforded with similar advantages in handling the patient transport apparatus 100, as the arrangement of the rear wheel 152 described above also makes the "tilting" process easier to control and execute.

In FIG. 12H, the caregivers are shown continuing to support the patient transport apparatus 100 in the stair configuration SC as the belts 156 of the track assemblies 154 are brought into contact with the edge of the top stair ST. In FIG. 12I, the caregivers are shown continuing to support the patient transport apparatus 100 in the stair configuration SC as the belts 156 of the track assemblies 154 contact multiple stairs ST during descent.

Figure 13A:
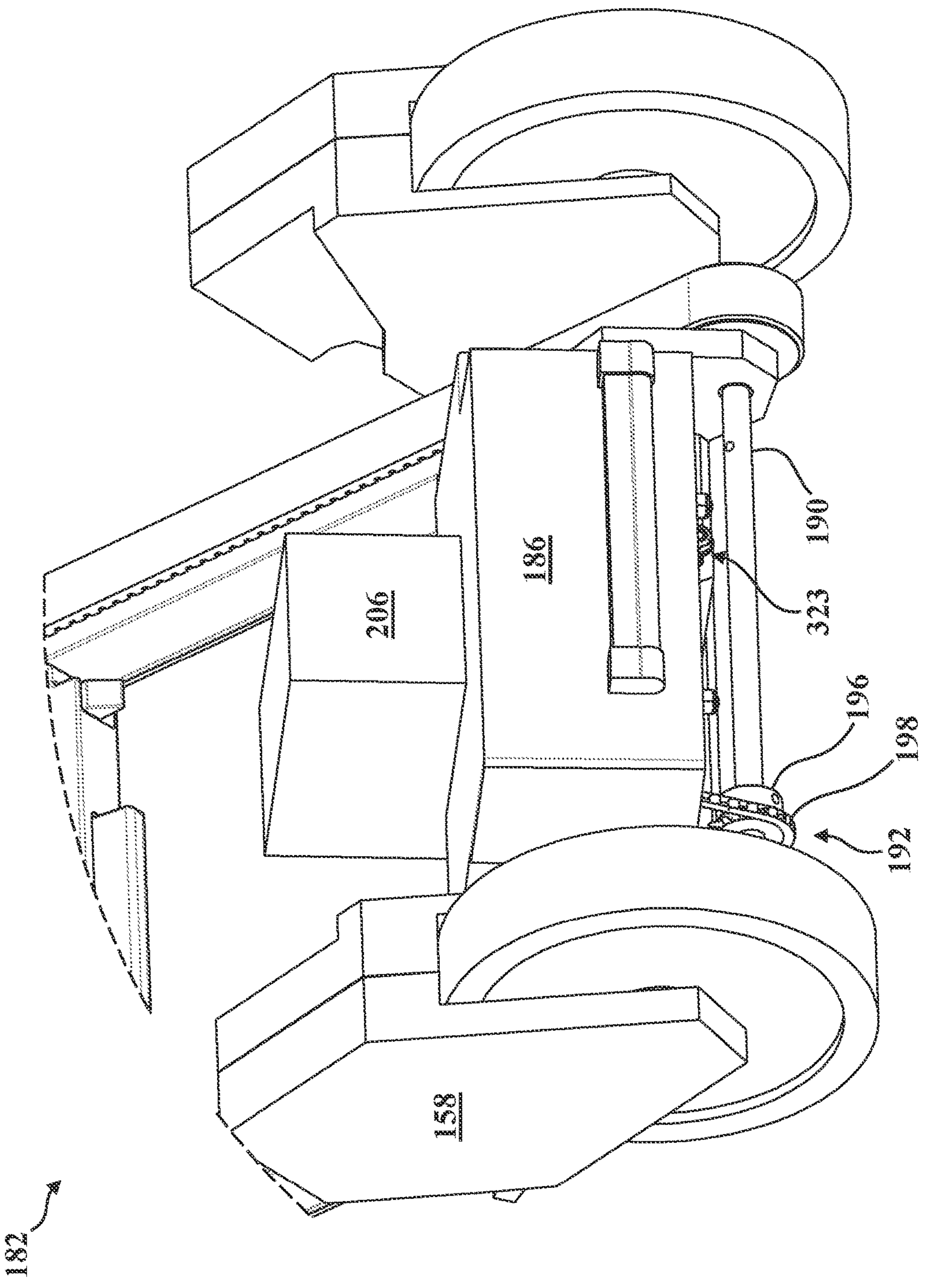
FIG. 13A is a partial perspective view of a drive system of the patient transport apparatus of FIGS. 1-12I.
Figure 13B:
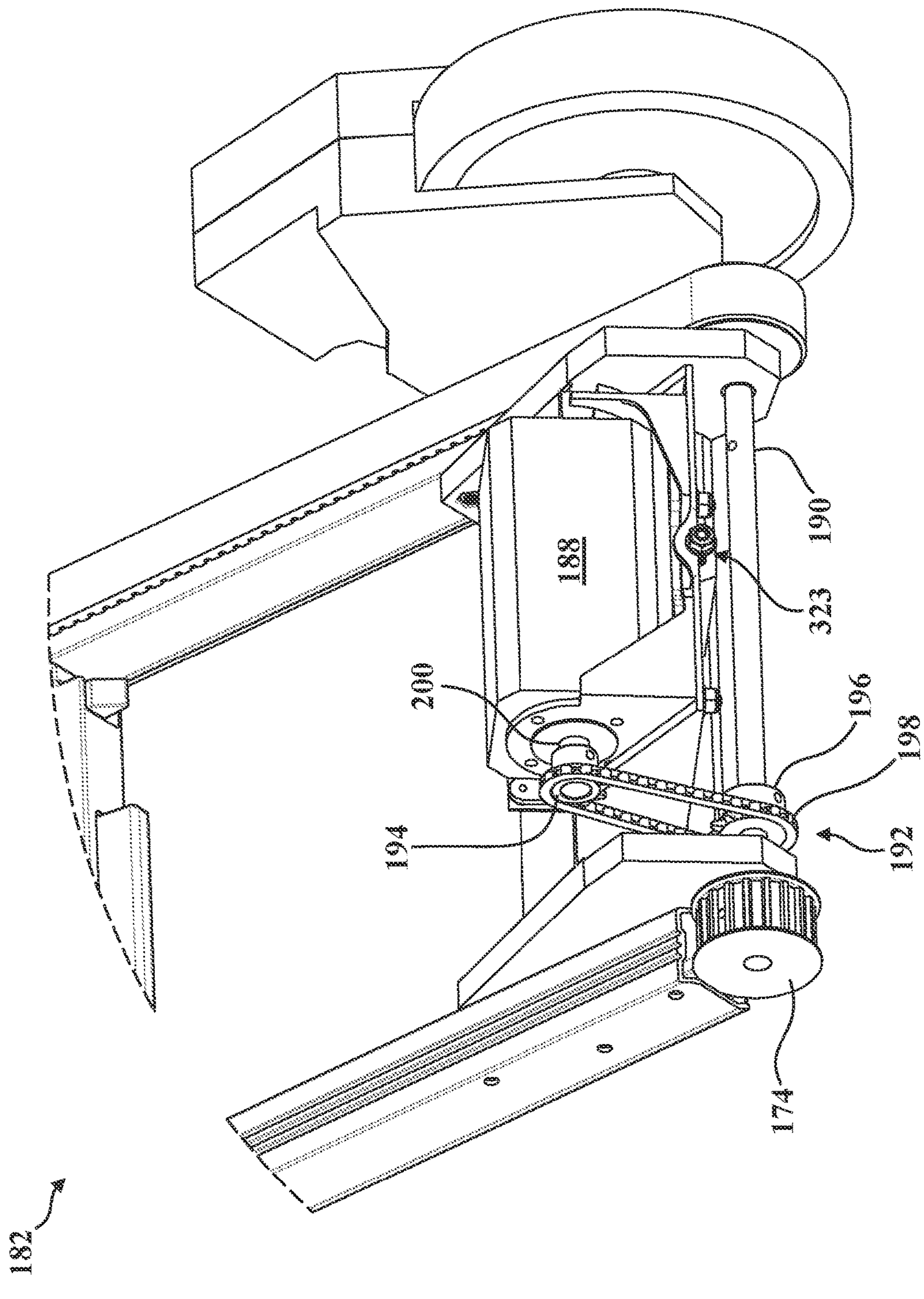
FIG. 13B is another partial perspective view of the drive system of FIG. 13A, shown with certain components removed.

Referring now to FIGS. 13A-13B, portions of the drive system 182 are depicted without the full patient transport apparatus 100 in FIG. 13A, and additional components have been removed in FIG. 13B for illustrative purposes. As shown in FIG. 13B, in some embodiments, the motor 188 may be supported on an adjustable platform 323 that is movable relative to the drive frame 184 to adjust slack in the endless chain 198 (adjustment not shown in detail). This arrangement helps to optimize power density and minimize weight in the drive system 182. It will be appreciated that this arrangement could be utilized with other type of geartrains 192, such as where a belt drive (not shown) would replace the endless chain 198. Other configurations are contemplated.

Figure 14:
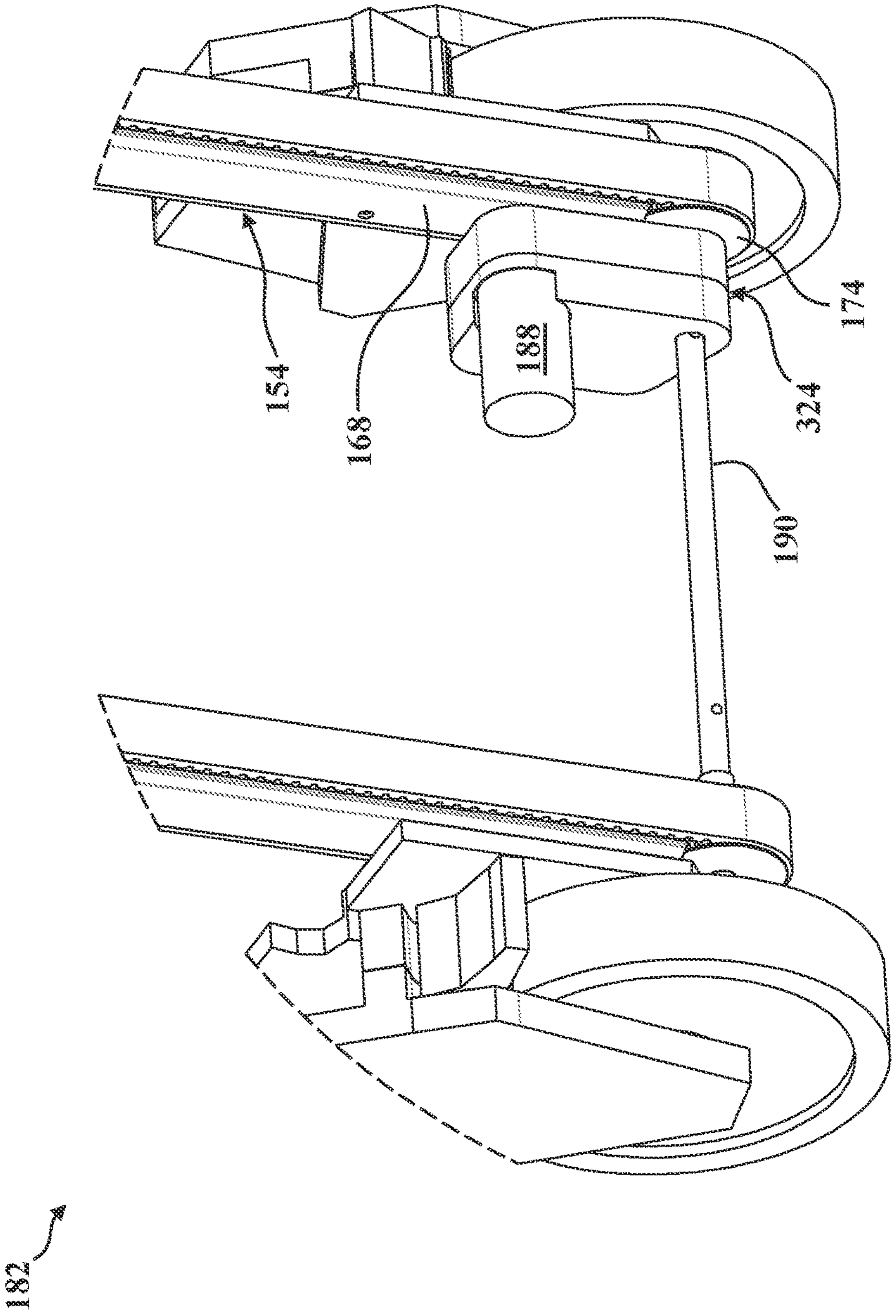
FIG. 14 is a partial perspective view of an alternative drive system for the patient transport apparatus of FIGS. 1-12I.

Referring now to FIG. 14, another embodiment of the drive system 182 is shown depicted without the full patient transport apparatus 100. In this embodiment, the geartrain 192 is configured with a direct drive gearbox 324 coupled to one of the rails 168 of the track assembly 154. Here, the drive axle 190 extends through the direct drive gearbox 324, and the motor 188 is coupled to the direct drive gearbox 324. It will be appreciated that the direct drive gearbox 324 may comprise various arrangements of gears (not shown) to facilitate adjusting the speed/torque between the motor 188 and the drive axle 190. Other configurations are contemplated.

Figure 15:
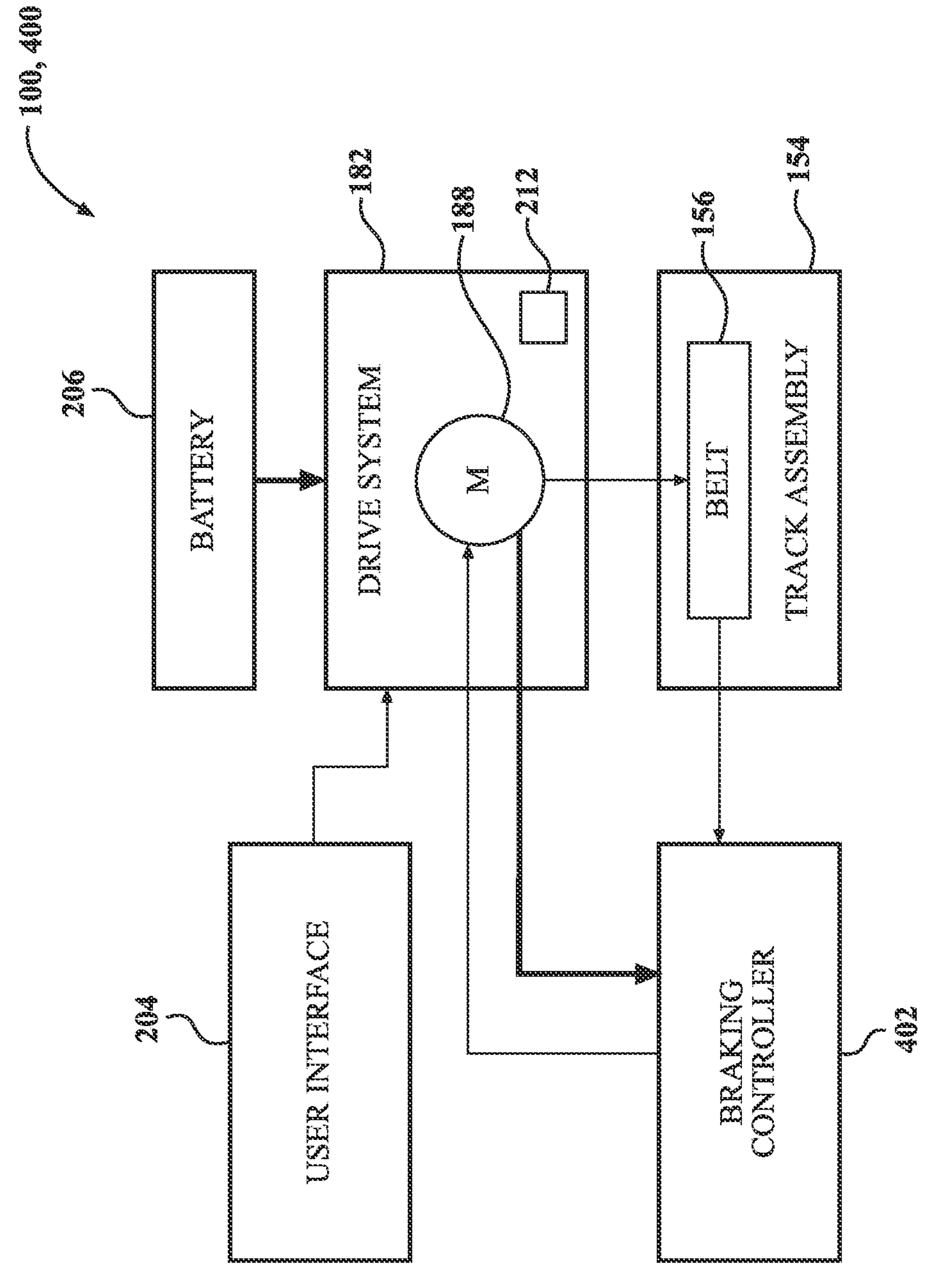
FIG. 15 is a partial schematic view of a control system of a passive brake embodiment of the patient transport apparatus of FIGS. 1-12I, shown with a braking controller.

In some embodiments, the patient transport apparatus 100 includes a "passive brake," generally referred to at 400, that allows the speed of the patient transport apparatus 100 to be controlled when on stairs ST even when the battery 206 is of low charge, dead, or not connected to the drive system 182 (e.g., inadvertently removed). FIG. 15 schematically illustrates certain components of the patient transport apparatus 100 in a representative embodiment which includes the passive brake 400. However, as will be appreciated from the subsequent description below, other configurations are contemplated by the present disclosure.

Figure 16A:
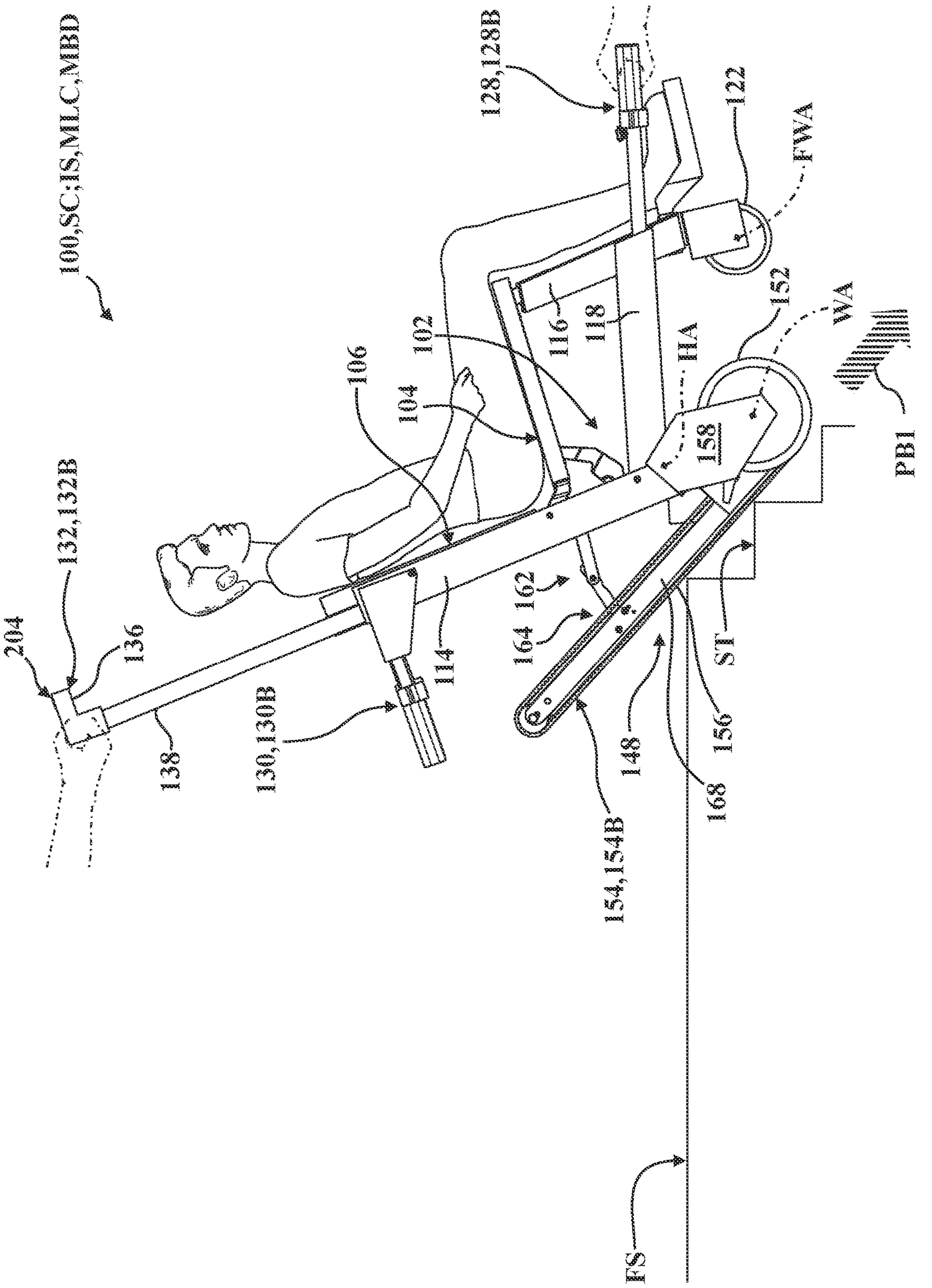
FIG. 16A is a right-side plan view of the passive brake embodiment the patient transport apparatus of FIGS. 1-12I, shown with the belt of the track assembly in contact with the stairs and descending the stairs while operating in a low charge mode or a battery disconnect mode.
Figure 16B:
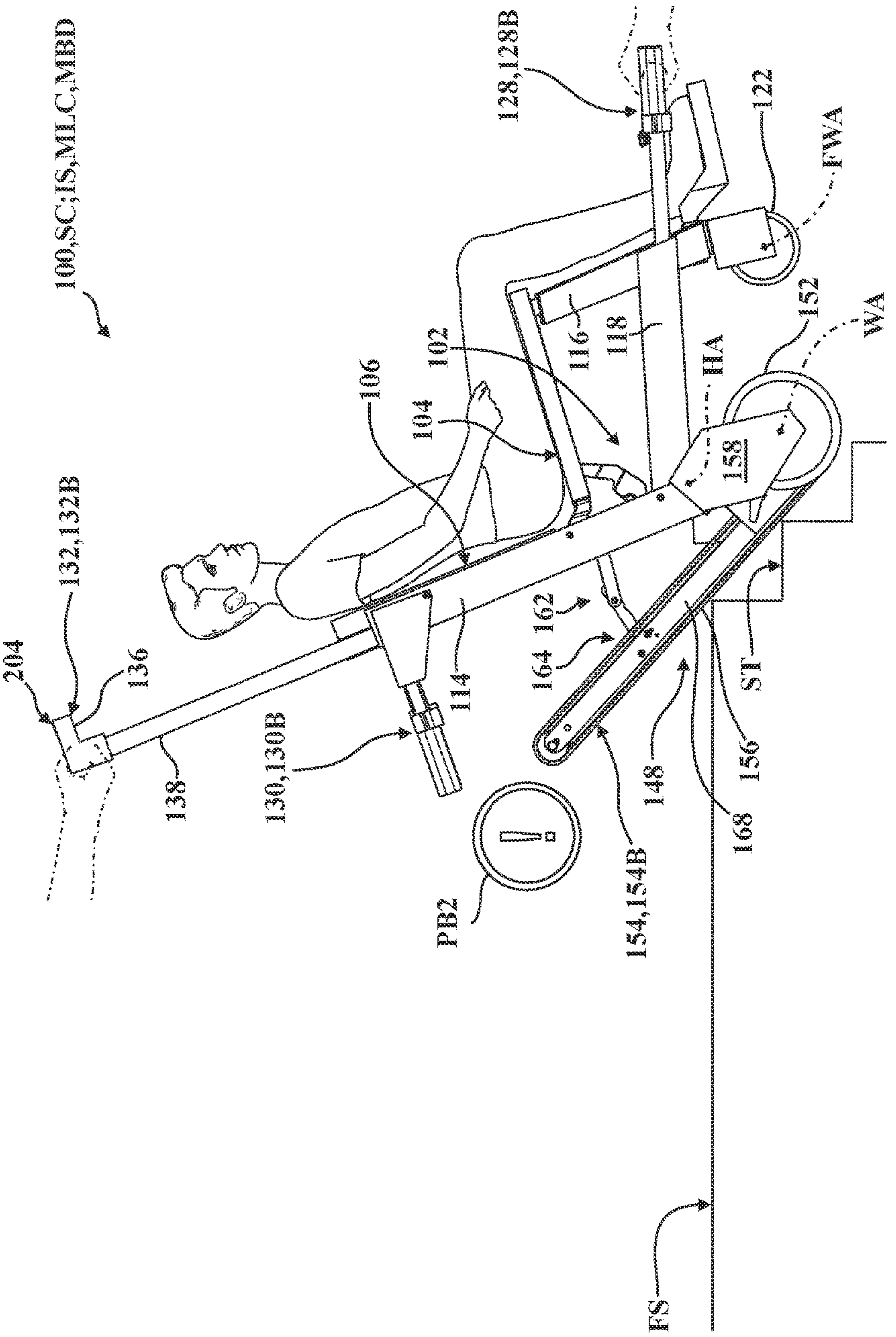
FIG. 16B is another right-side plan view of the passive brake embodiment the patient transport apparatus of FIGS. 1-12I, shown with the belt of the track assembly in contact with the stairs and the passive brake engaged while operating in the low charge mode or battery disconnect mode.

FIGS. 16A and 16B illustrate an example operation of the passive brake 400. As shown in FIG. 16A, the patient transport apparatus 100 descends stairs ST at a controlled speed, as indicated by the cross-hatched arrow PB1, while the battery 206 is of low charge, dead, or not connected to the drive system 182. In some use case scenarios, and depending on the specific configuration of the drive system 182, the patient transport apparatus 100 may be configured to naturally descend stairs ST without power from the battery 206 due to weight (e.g., of a patient, of equipment placed on the support structure 102, of the patient transport apparatus 100 itself, and the like). Referring to FIG. 16B, if the speed PB1 of the patient transport apparatus 100 rises above a threshold speed value TSV, the passive brake 400 is enabled, as indicated by the encircled exclamation point PB2. As will be appreciated from the subsequent description below, when the passive brake 400 is enabled, in some embodiments, the patient transport apparatus 100 generally descends stairs ST at a controlled, limited rate that is slower than would otherwise occur without utilization of the passive brake 400. However, depending on the configuration of the patient transport apparatus 100, in some embodiments, motion may substantially cease when the passive brake 400 is enabled.

As will be appreciated from the subsequent description below, the patient transport apparatus 100 is configured to operate in a variety of states and modes in certain embodiments, including for example in or between one or more inactive states SI and/or one or more active states SA. In some embodiments, during operation in some inactive states SI, power consumption of the battery 206 by various systems and components of the patient transport apparatus 100 is limited. However, in some embodiments, during operation in some active states SA, the controller 212 controls movement of the belt 156 by driving the motor 188 of the patient transport apparatus 100 using power from the battery 206. Examples of various states SI, SA are described in greater detail below.

The patient transport apparatus 100 generally utilizes the battery 206 to provide power to the drive system 182 (e.g., in the active state SA) which, among other things, employs the motor 188 to drive the belt 156. In embodiments which utilize the passive brake 400 according to the present disclosure, and as is depicted schematically in FIG. 15, a braking controller 402 is also disposed in communication with the motor 188 to facilitate control of descent on stairs ST. The braking controller 402 is configured to sense configured to sense a speed PB1 of the patient transport apparatus 100 (see FIG. 16A) when the battery 206 is of low charge, dead, or not connected to the drive system 182. The braking controller 402 is able to sense the speed PB1 of the patient transport apparatus 100 in the representative embodiment illustrated herein by sensing a movement of the belt 156 (e.g., by sensing rotation of the motor 188 or a separate sensor disposed in rotational communication with the drive system 182). Furthermore, and as is described in greater detail below, the braking controller 402 is also configured to control the motor 188 to limit movement of the belt 156 when the battery 206 is of low charge, dead, or not connected to the drive system 182 to effect corresponding limited movement of the patient transport apparatus 100 along stairs ST.

In some embodiments, the braking controller 402 is configured to sense movement (e.g., speed) of the belt 156 by sensing a voltage of the motor 188 of the drive system 182, such as where voltage increases when the speed of the motor 188 increases. The braking controller 402 is configured to limit movement of the belt 156 in response to the sensed voltage of the motor 188 being greater than a threshold voltage value TVV. This corresponds to the braking controller 402 limiting movement of the belt 156 in response to a speed of the patient transport apparatus 100 rising above a threshold speed value TSV.

Figure 17A:
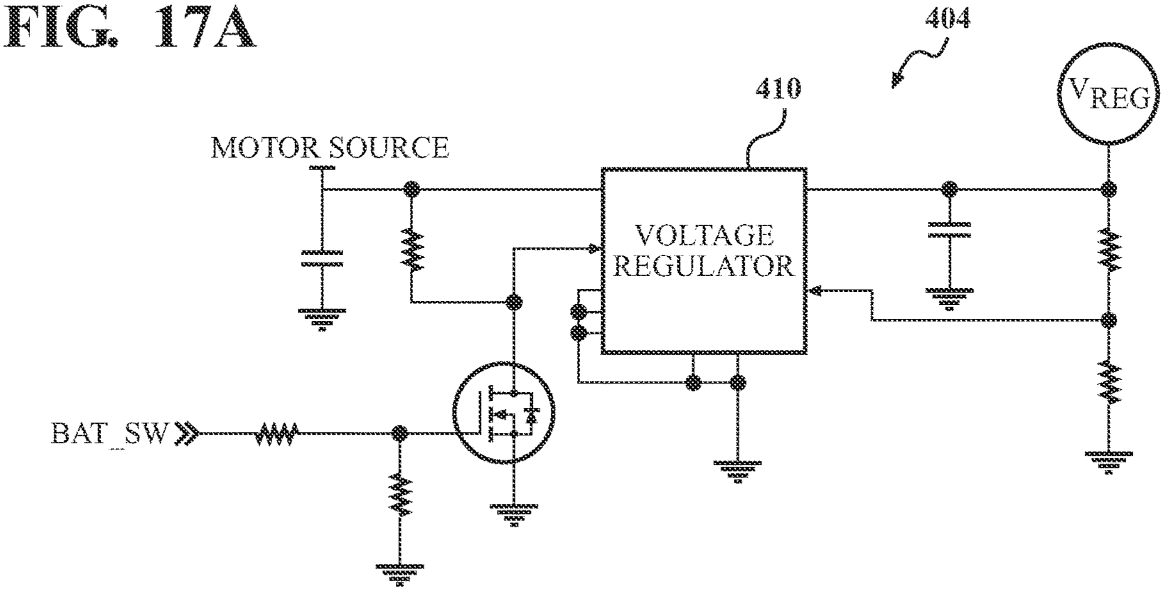
FIG. 17A is an electrical diagram including a voltage regulator of a passive brake circuit of the braking controller shown in FIG. 15 of the patient transport apparatus of FIGS. 1-12I.
Figure 17B:
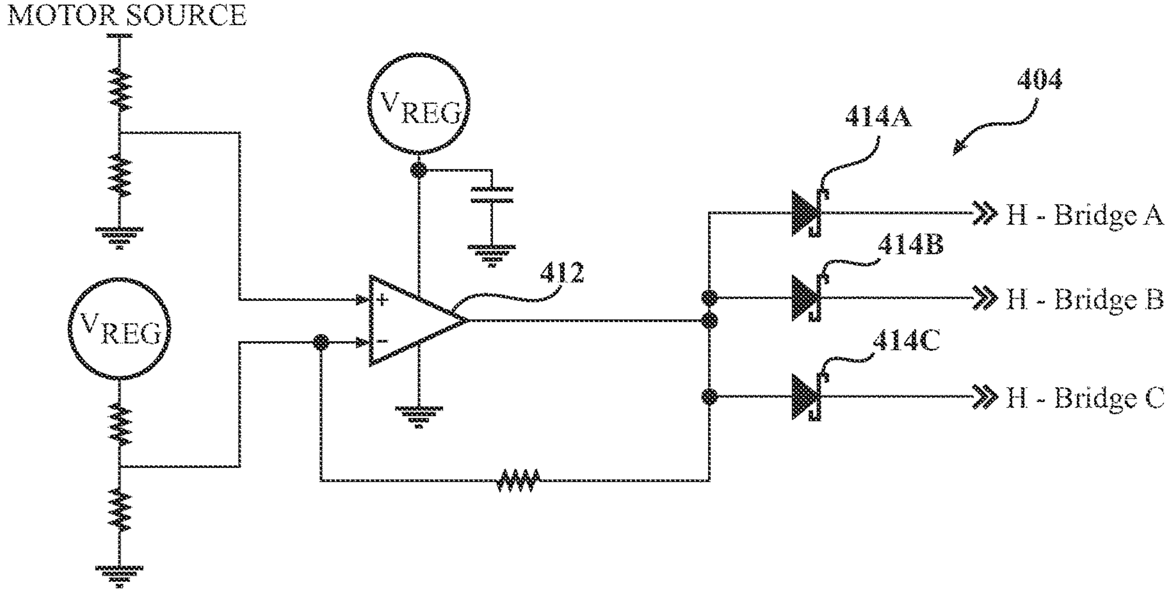
FIG. 17B is an electrical diagram including a comparator of the passive brake circuit of the braking controller shown in FIG. 15 patient transport apparatus of FIGS. 1-12I.

In some embodiments, the braking controller 402 is configured to limit movement of the belt 156 using a passive brake circuit 404, such as is depicted in FIGS. 17A-17B. As shown in FIG. 17A, the speed of the motor 188 is represented as sensed voltage of the motor 188, "MOTOR SOURCE". In order to compare the sensed voltage of the motor 188 to a threshold value, the passive brake circuit 404 first generates a regulated voltage $V_{RE}G$ using a voltage regulator 410. Therefore, no matter the sensed voltage of the motor 188, the regulated voltage $V_{REG}$ will be a stable voltage value. As shown in FIG. 17B, the passive brake circuit 404 can compare the sensed voltage of the motor 188 to the regulated voltage $V_{REG}$ using comparator 412. If the sensed voltage of the motor 188 is greater than the regulated voltage $V_{REG}$, switches 414A, 414B, and 414C are activated, limiting movement of the belt 156, which will be described in greater detail below. It should be noted that the voltage regulator 410 may be operated such that the passive brake circuit 404 generates any suitable voltage as the regulated voltage $V_{REG}$. For example, in some embodiments, the regulated voltage $V_{REG}$ may be 1V, 5V, 10V, etc. The regulated voltage $V_{REG}$ may be pre-defined, adjustable (e.g., between predefined parameters that can be selected by a user), and the like. Other configurations are contemplated.

Those having ordinary skill in the art will appreciate that the motor 188 includes one or more windings with leads A, B. C. Here, by shorting the windings to one another, movement of the belt 156 can be limited. For example, depending on the specific configuration of the motor 188, it may take a considerable amount of torque to effect rotation of the motor 188 while the windings are shorted to one another, and/or when dynamically shorting the windings to each based on signals, sensors, and the like (e.g., based on sensed rotation of the motor 188).

Figure 18:
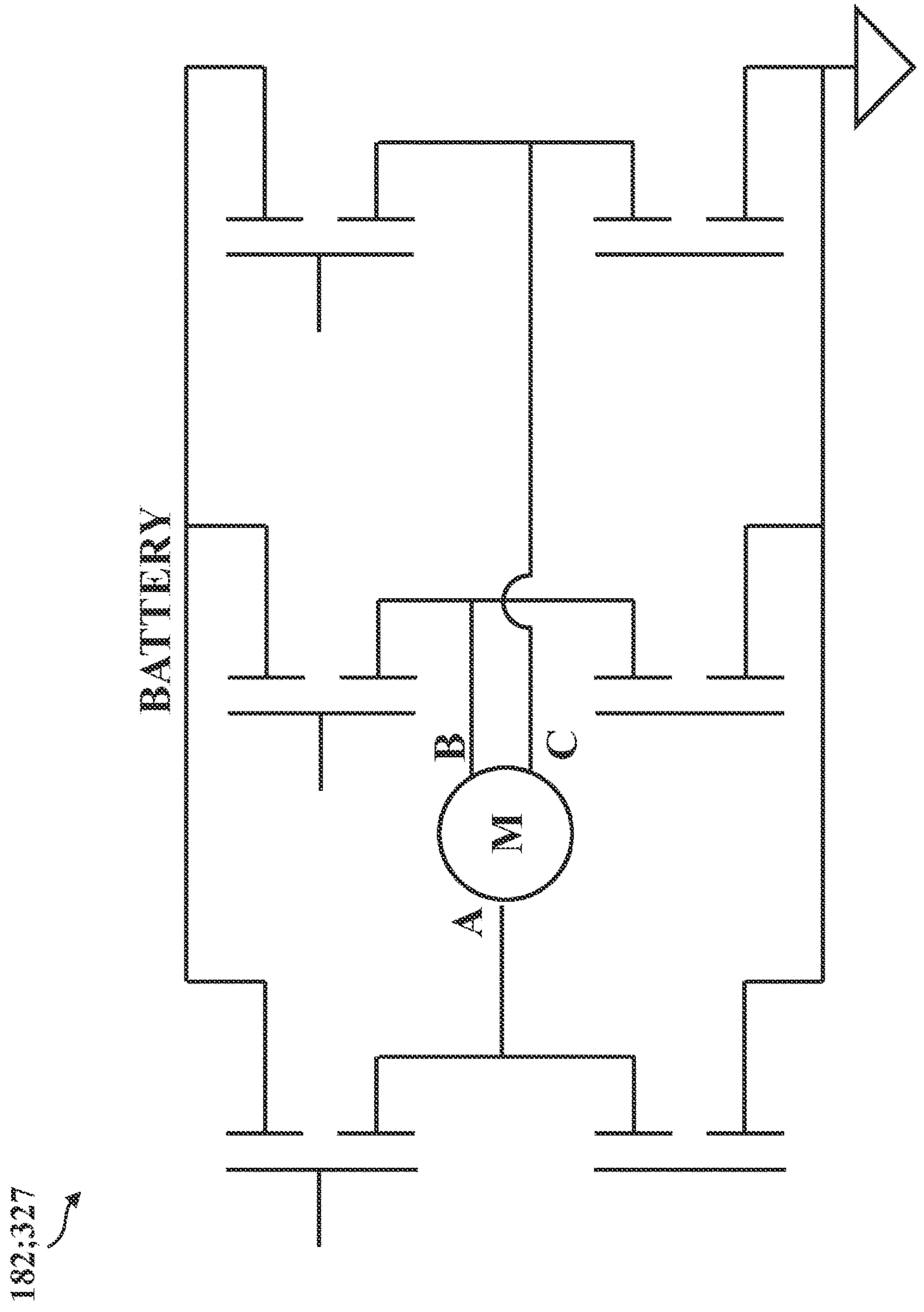
FIG. 18 is an electrical diagram depicting an H-bridge for a motor of a drive system for the patient transport apparatus of FIGS. 1-12I.
Figure 19:
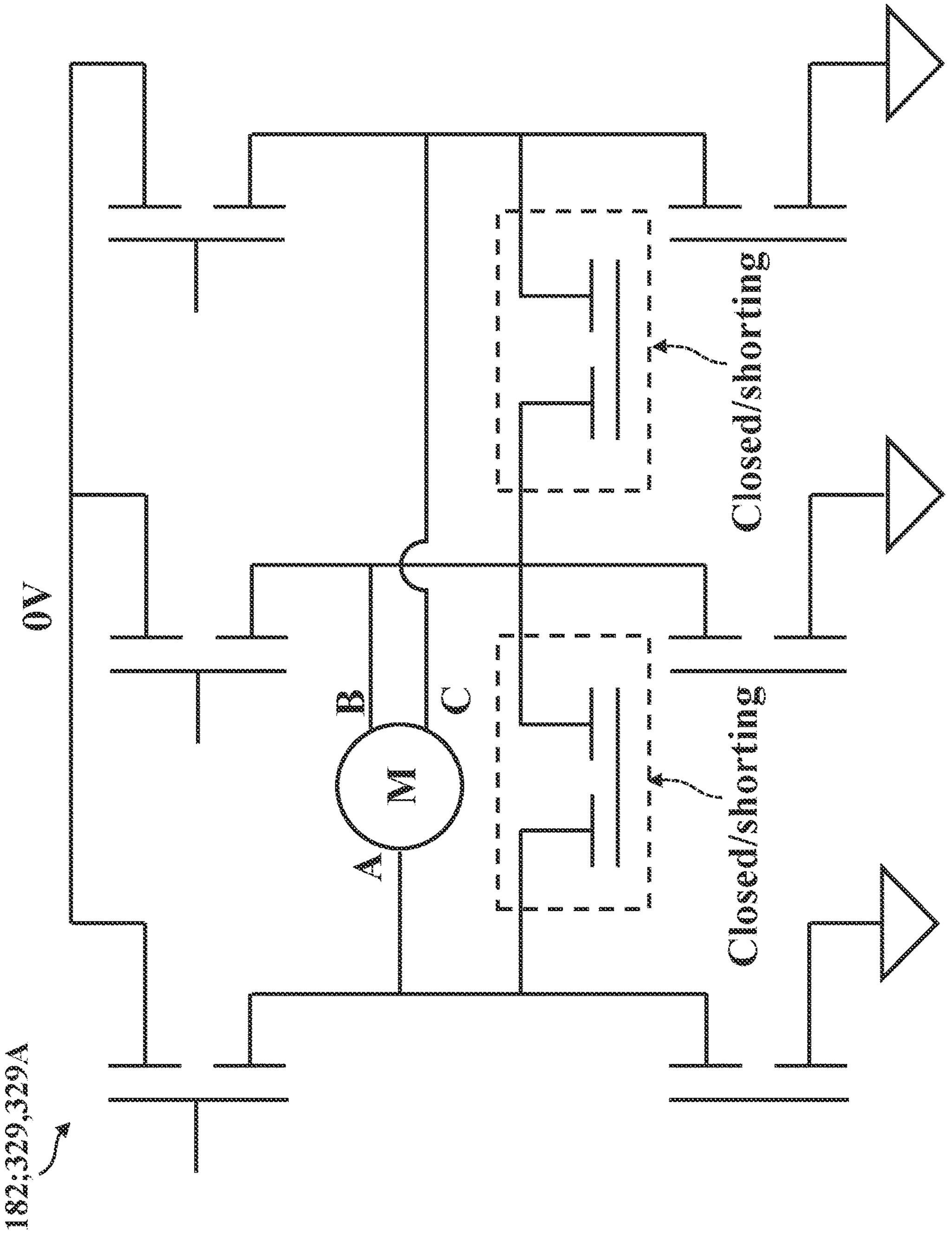
FIG. 19 is an electrical diagram depicting an H-bridge for a motor of a drive system for the patient transport apparatus of FIGS. 1-12I, shown having a junction gate field-effect transistor arrangement under no-power conditions to short leads of the motor.
Figure 20:
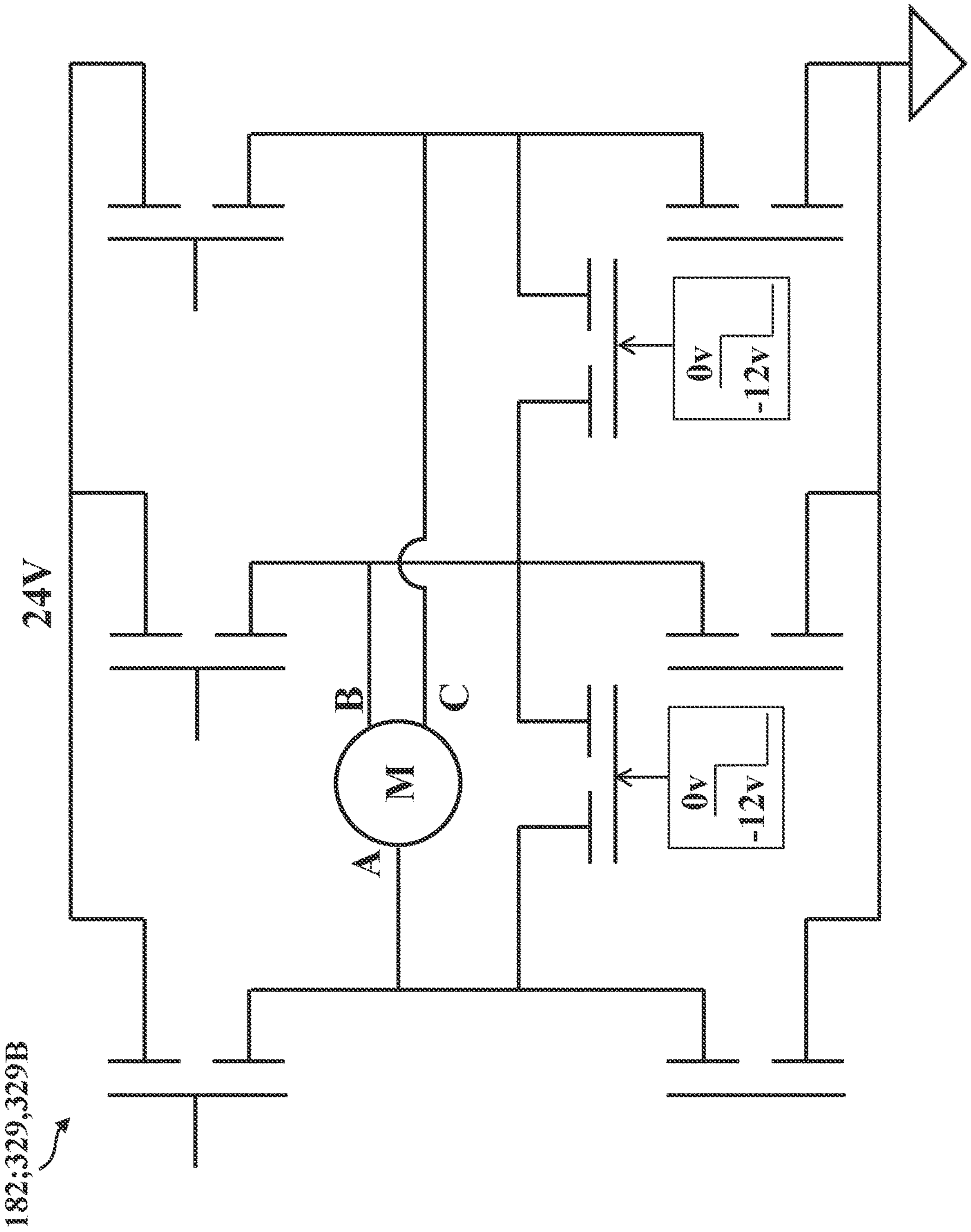
FIG. 20 is another electrical diagram depicting the H-bridge of FIG. 19, shown with the junction gate field-effect transistor arrangement under powered conditions to drive the motor.

In the embodiment of FIGS. 15 and 17A-17B, the braking controller 402 is utilized to facilitate shorting the leads A, B, C of the motor 188 via the passive brake circuit 404 as noted above and as is described in greater detail below. However, in some embodiments, other configurations could be utilized which do not necessarily rely on the braking controller 402 itself to facilitate shorting the leads A, B, C of the motor 188, and/or which utilize different types of circuits to effect control of the motor 188. Embodiments depicting aspects of these types of arrangements are schematically depicted in FIGS. 18-20. In FIG. 18, an exemplary bridge 327 for the motor 188 is shown. In some embodiments, the controller 212 may be coupled to motor leads A, B, C of the motor 188 using this type of bridge 326. In FIGS. 19-20, a J-FET H-bridge 329 for the motor 188 is depicted in a non-powered state 329A in FIG. 19, and in a powered state 329B in FIG. 20. In some embodiments, the controller 212 may be coupled to the motor leads A, B, C of the motor 188 using this type of J-FET H-bridge 329. As will be appreciated from the subsequent description below, the use of junction gate field-effect transistors (J-FETs) as depicted in FIGS. 19-20 can afford significant advantages to the drive system 182 in certain embodiments. With a more conventional H-bridge, when the motor leads A, B, C of the motor 188 are shorted together, it takes a considerable amount of torque to effect rotation. However, the J-FET H-bridge 329 acts like a "normally closed" switch to short the motor leads A, B, C together; when the battery 206 is connected to the drive system 182, its voltage creates the appropriate gate voltage to open this switch, thereby allowing rotation to occur freely. Similar to the braking controller 402 introduced above and described in greater detail below, this configuration likewise affords the ability to limit the speed of descent of the patient transport apparatus 100 on stairs ST even when the battery 206 is dead or not plugged in (e.g., inadvertently removed). It will be appreciated that aspects of the embodiments illustrated in FIGS. 18-20 could be utilized with the braking controller 402 or other components of the patient transport apparatus 100. Other configurations are contemplated.

Referring again to FIGS. 15 and 17A-17B, as noted above, the braking controller 402 is configured to sense movement of the belt 156 and control the motor 188 via the passive brake circuit 404 to limit movement of the belt 156 when the battery 206 is of low charge, dead, or not connected to the drive system 182. As is depicted schematically in FIG. 15, the battery 206 may be isolated from the braking controller 402. Put differently, the braking controller 402 may not be powered by the battery 206 in some embodiments. Here, for example, the braking controller 402 may be configured to receive power generated by rotation of the motor 188, as indicated in FIG. 15 by the bold line from the motor 188 to the braking controller 402. As previously stated, in some embodiments, the patient transport apparatus 100 will naturally descend stairs ST without power from the battery 206 due to a weight of the patient transport apparatus 100 and gravity. Thus, the motor 188 will rotate while the patient transport apparatus 100 descends stairs ST due to movement of the belts 156. In such an embodiment, the drive system 182 is configured to generate electricity via rotation of the motor 188 effected by movement of the belt 156 such that the braking controller 402 receives power from rotation of the motor 188 (e.g., by receiving the power from the electricity generated by the drive system 182 and not necessarily provided by the battery 206).

It will be appreciated that the passive brake 400 may operate in instances where the battery 206 is not of low charge, is not dead, or is connected to the drive system 182. Referring to FIG. 17A, the voltage regulator 410 of the passive brake circuit 404 includes an enable pin, which is arranged to receive a signal, "BAT_SW", indicating whether the battery 206 is of low charge, dead, or not connected to the drive system 182 (e.g., a signal generated by the controller 212). In embodiments where the battery 206 is not of low charge, is not dead, or is connected to the drive system 182, signal BAT_SW pulls the enable pin of the voltage regulator 410 low such that the braking controller 402 does not short the windings of the motor 188. In such instances, the passive brake 400 can be "disabled" and normal rotation of the motor 188 can occur (e.g., free rotation). However, a signal (e.g., a "pulsed" signal) may be transmitted to the enable pin of the voltage regulator 410 as signal BAT_SW to allow the braking controller 402 to short the windings of the motor 188. As such, when the battery 206 is present, a voltage pulse may be applied to the via the passive braking circuit 404, as shown in FIG. 20, and passive braking can be applied either full-on or in pulses to slow the rate of descent of the patient transport apparatus 100 while on stairs ST. This configuration results in improved battery life when compared to utilizing resistors to dampen rotation, which would otherwise drain the battery.

Figure 21:
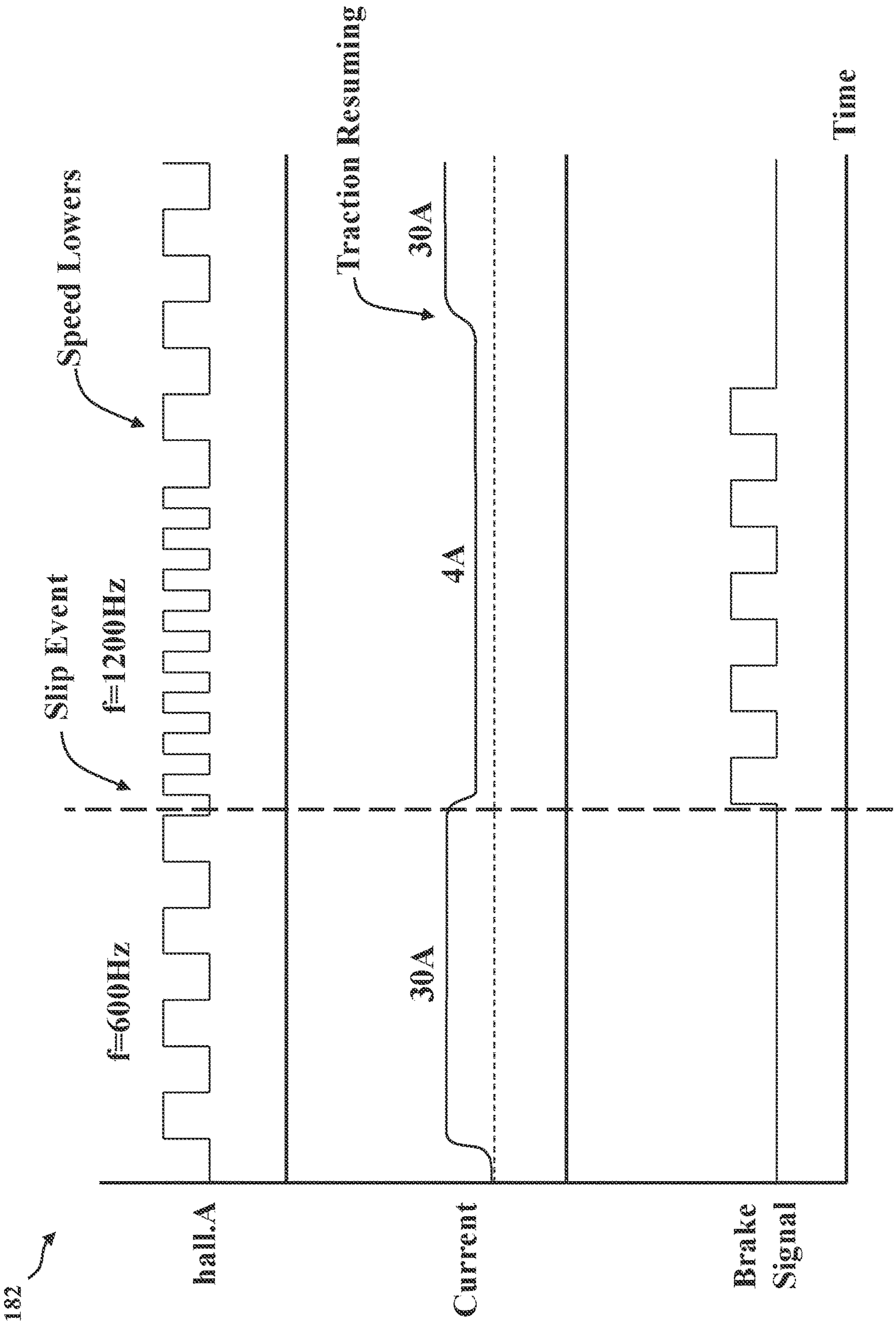
FIG. 21 is a representative timing diagram depicting a belt slip event.

It will be appreciated that the use of passive braking affords significant advantages by, among other things, affording opportunities for improved control of the drive system 182 under various operating conditions. For example, with reference to FIG. 21, the controller 212 can be configured to control the motor 188 and to detect and mitigate slipping of the belt 156. Here, the controller 212 can detect slip events to prevent large speed surges using the aforenoted braking techniques and, thus, can ensure that a consistent ascent and/or descent speed is achieved on stairs ST. When the belts 156 begin to slip, the rotational speed will increase and the current will decrease rapidly. Using hall-effect sensors (not shown) to measure the rotational speed of the motor 188, and based on pre-determined drive speed settings that can be selected via the user interface 204, the desired speed can be determined or is otherwise known to the controller 212. Here, a slip event will result in the hall effect frequency increasing drastically (e.g., from approximately 600 Hz to approximately 1200 Hz, or other frequencies). Here, too, current will drop from whatever steady state value it was at (e.g., 30 A) to a much lower value (e.g., 4 A). When both of these conditions occur, the passive braking techniques described above can be engaged to bring the rotational speed back into an acceptable range for a selected speed.

As noted above, the patient transport apparatus 100 may be configured to operate in a variety of states and modes. As shown in the flowchart 450 FIG. 22, the controller 212 may be operable in an inactive state SI and an active state SA. During the inactive state SI, power consumption of the patient transport apparatus 100 is limited, and during the active state SA the controller 212 can be utilized to control movement of the belt 156 with the motor 188 of the patient transport apparatus 100.

Figure 22:
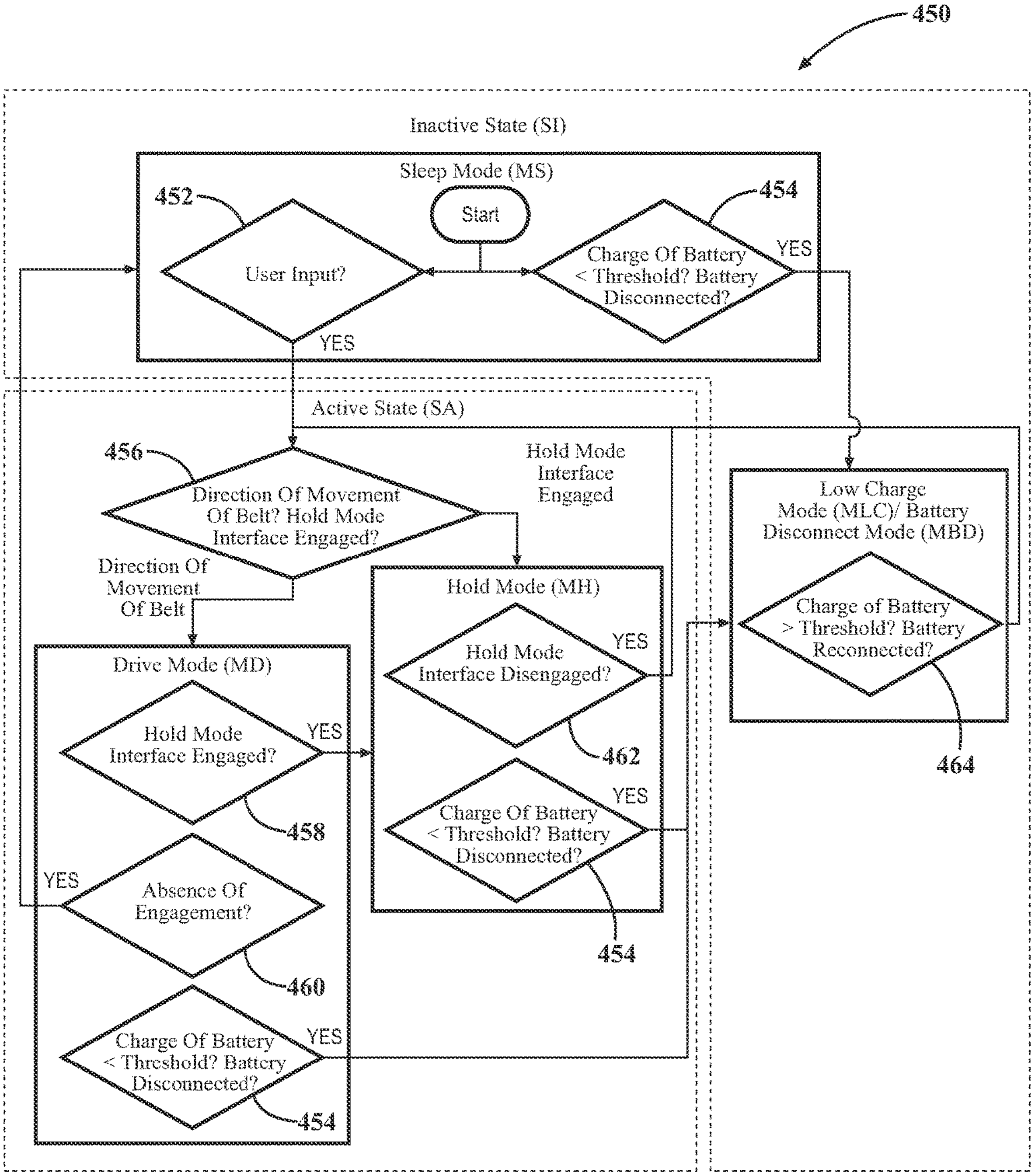
FIG. 22 is a flowchart diagram of an inactive state and an active state of the passive brake embodiment the patient transport apparatus of FIGS. 1-12I.

It will be appreciated that the controller 212 may be configured to operate in a variety of inactive states SI and active states SA. As shown in FIG. 22, the controller 212 may be configured to operate in (or between) a sleep mode MS of the inactive state SI, a low charge mode MLC of the inactive state SI, and/or a battery disconnect mode MBD of the inactive state SI. Generally, the controller 212 may be configured to operate in the sleep mode MS in response to an absence of engagement with the user interface 204, the controller 212 may be configured to operate in the low charge mode MLC of the inactive state SI in response to a charge of the battery 206 being less than a threshold charge value TCV (e.g., less than 5% charge), and the controller 212 may be configured to operate in the battery disconnect mode MBD of the inactive state SI in response to the battery 206 not being connected to the drive system 182.

As shown in FIG. 22, the controller 212 may be configured to operate in a drive mode MD of the active state SA, and a hold mode MH of the active state SA. Generally, the controller 212 may be configured to operate in the drive mode MD of the active state SA to control a direction of movement of the belt 156, and the controller 212 may be configured to operate the hold mode MH of the active state SA for limiting movement of the belt 156 to facilitate a controlled descent of the patient transport apparatus 100 along stairs ST. Each of the modes introduced above will be described in greater detail below.

During the sleep mode MS of the inactive state SI, power consumption of the patient transport apparatus 100 is limited. In some embodiments, power consumption of the patient transport apparatus 100 may be limited by only allowing the controller 212 to provide power from the battery 206 to certain components of the patient transport apparatus 100. For example, during the sleep mode MS, the controller 212 may be unable to generate and transmit control signals to some of the one or more powered devices, or components thereof, to drive the patient transport apparatus 100. Here, however, the controller 212 may be configured to provide power to the user interface 204. In the sleep mode MS, the user interface 204 may be prevented from emitting light, but may be configured to receive a user input generate by user engagement of any portion of the user interface 204. Additionally, in some instances of the sleep mode MS, one or more of the controller 212, the motor 188, the geartrain 192, and/or the track assemblies 154 may also be configured to "brake" or otherwise prevent movement of the belts 156.

FIGS. 16A and 16B may be referred to in order to illustrate operation of the patient transport apparatus 100 during the low charge mode MLC of the inactive state SI, or to illustrate operation during the battery disconnect mode MBD of the inactive state SI. As previously stated, in FIGS. 16A and 16B, the battery 206 is of low charge, dead, or not connected to the drive system 182. In other words, in FIGS. 16A and 16B, the controller 212 is operating in the low charge mode MLC or the battery disconnect mode MBD. Because the patient transport apparatus 100 utilizes the passive brake 400 in the representative embodiment, it will be appreciated that, in FIG. 16A, the patient transport apparatus 100 descends stairs ST at the controlled speed PB1. If the speed PB1 of the patient transport apparatus 100 rises above the threshold speed value TSV, the passive brake 400 is enabled, as indicated by the encircled exclamation point PB2. Here, when the passive brake 400 is enabled, in some embodiments, the patient transport apparatus 100 generally descends stairs ST at a controlled, limited rate that is slower than would otherwise occur without utilization of the passive brake 400. However, it will be appreciated that motion may substantially cease when the passive brake 400 is enabled in some embodiments.

Figure 23:
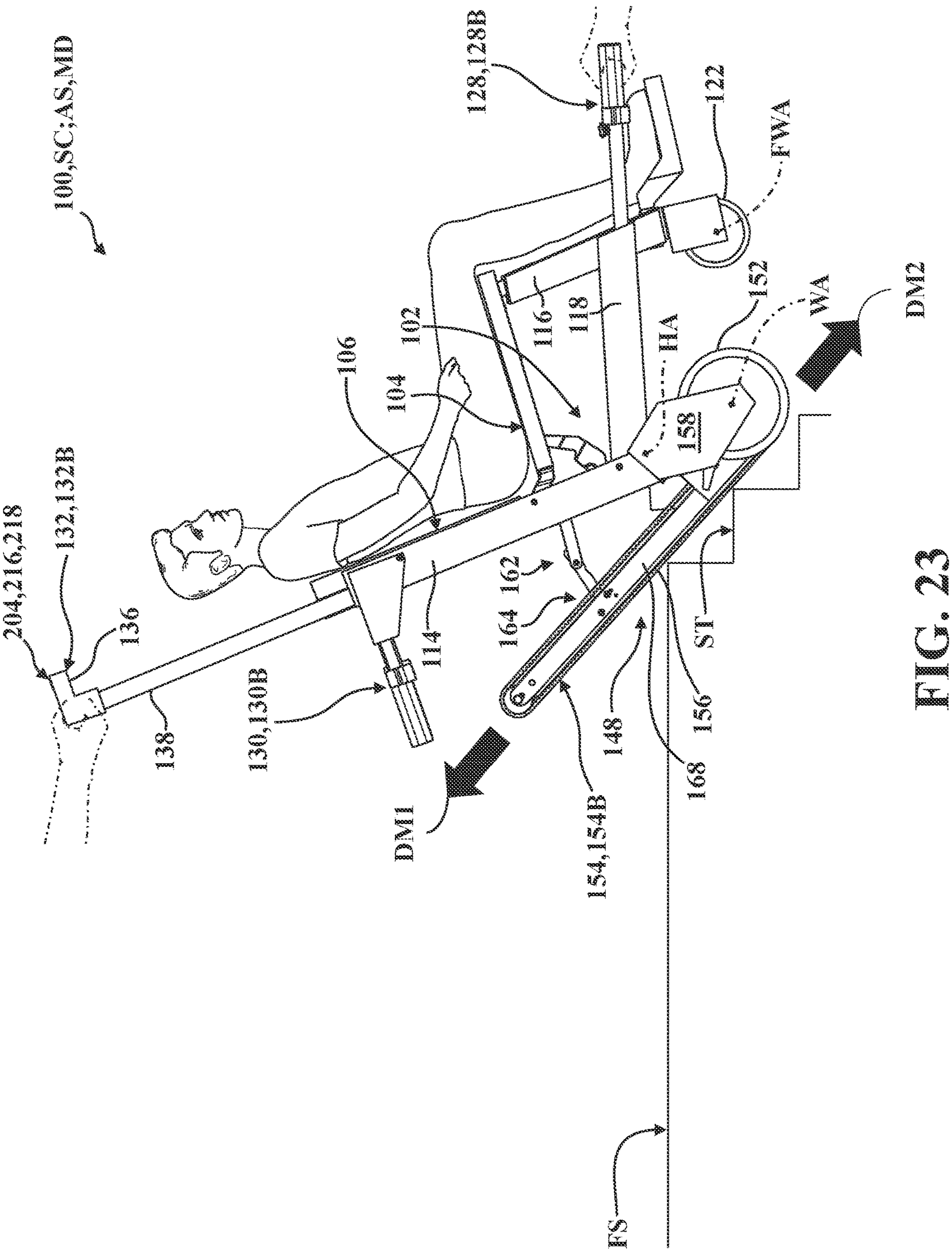
FIG. 23 is a right-side plan view of the patient transport apparatus of FIGS. 1-12I, shown with the belt of the track assembly in contact with the stairs and ascending and descending the stairs while operating in a drive mode.

FIG. 23 illustrates an example operation of the patient transport apparatus 100 during the drive mode MD of the active state SA. The drive mode MD generally represents operation according "standard utilization" scenarios of the patient transport apparatus 100 (e.g., transitioning into/out of engagement with stairs ST, and ascending/descending stairs ST). FIG. 23 further illustrates the patient transport apparatus 100 descending stairs ST while in the drive mode MD. As shown, the drive system 182 may be configured to control a direction of movement of the belt 156, wherein the user interface 204 is further arranged for engagement by a user to adjust the direction of movement of the belt 156, as indicated by arrows DM1 and DM2 in FIG. 23. In such instances, the user interface 204 may include a direction input control 216 and a speed input control 218 for adjusting the direction and speed of movement of the belt 156.

Figure 24:
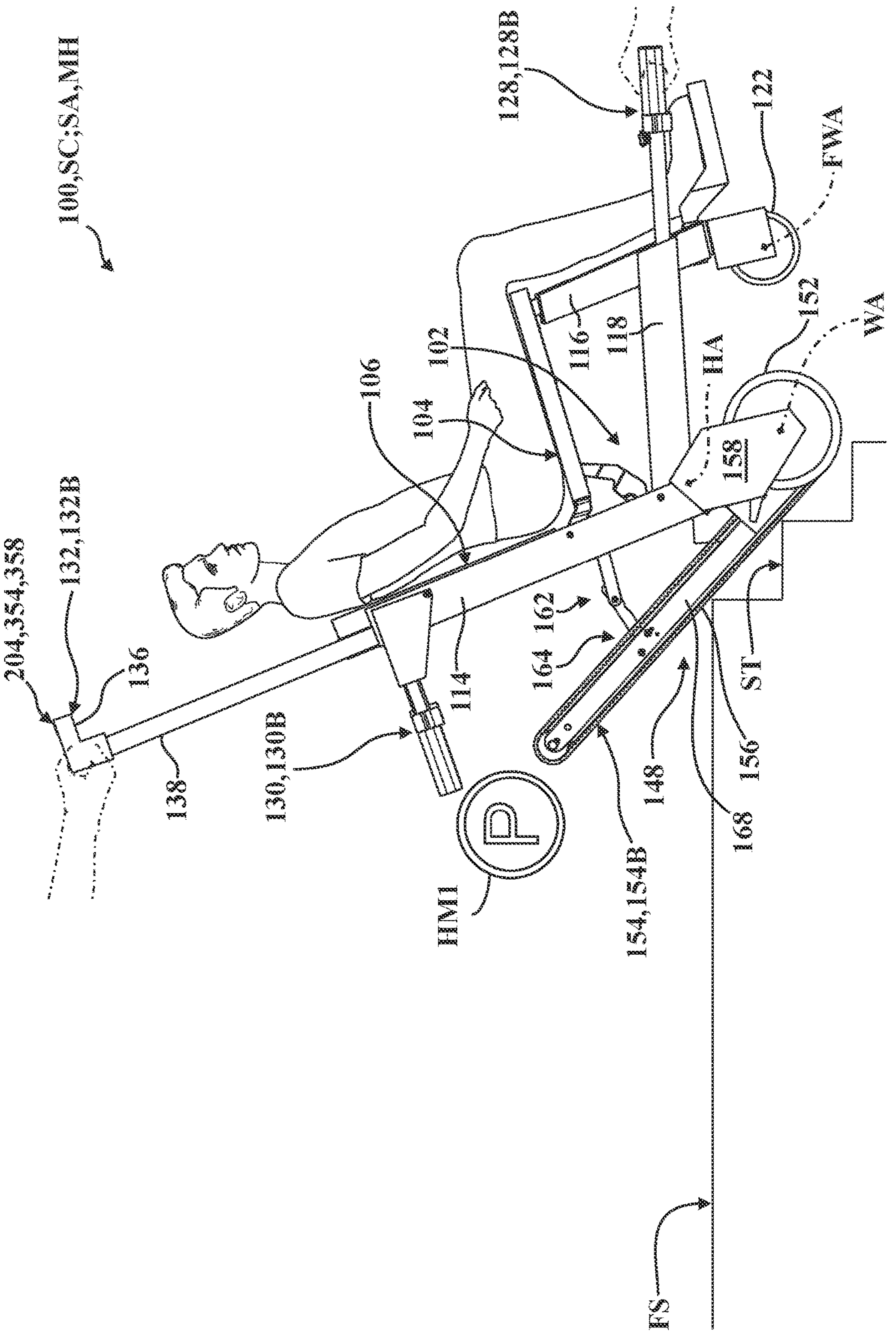
FIG. 24 is a right-side plan view of the patient transport apparatus of FIGS. 1-12I, shown with the belt of the track assembly in contact with the stairs and maintaining a substantially fixed position along stairs while operating in a hold mode.
Figure 25:
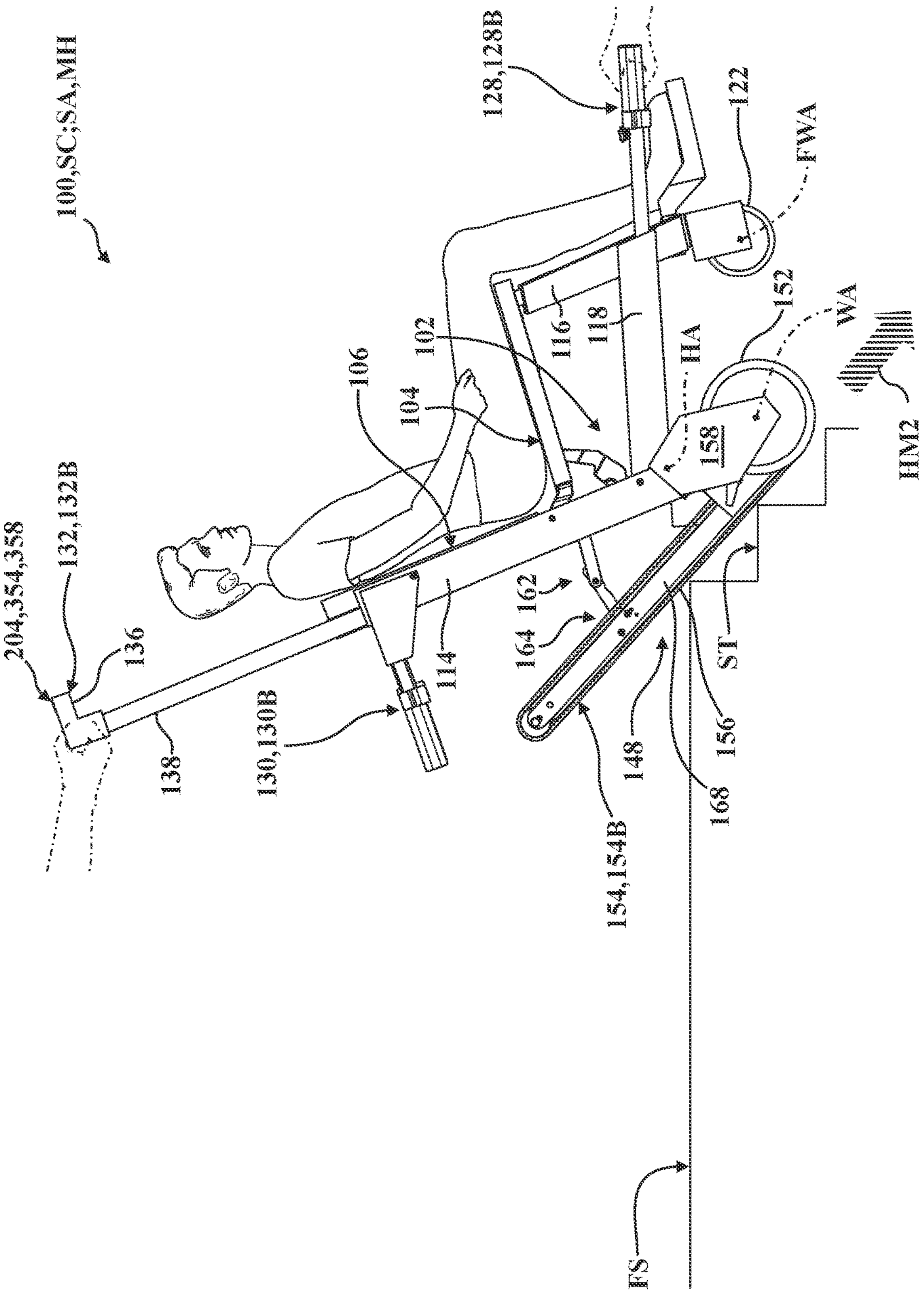
FIG. 25 is another right-side plan view of the patient transport apparatus of FIGS. 1-12I, shown with the belt of the track assembly in contact with the stairs and descending the stairs while operating in the hold mode.

In some embodiments, the patient transport apparatus 100 may include a hold mode interface 354, shown in FIGS. 24 and 25, for operating the patient transport apparatus 100 in the hold mode MH to limit movement of the belt 156. For example, the hold mode interface 354 may be included on the user interface 204, as shown in FIGS. 24-27E, and a user may engage the hold mode interface 354. The user interface 204 may also include a hold mode interface sensor 358 for sensing whether the hold mode interface 354 is engaged. If the controller 212 operates in the hold mode MH, the drive system 182 may be configured to control the motor to limit movement of the belt 156 to maintain the patient transport apparatus 100 in a substantially fixed position along stairs, as shown in FIG. 24 and as indicated by the encircled "P" HM1. In such an instance, the track assembly 154 may be configured to "brake" or otherwise prevent movement of the belt 156. As another example, if the controller 212 operates in the hold mode MH, the drive system 182 may be configured to control the motor 188 to limit movement of the belt 156 to facilitate a controlled descent of the patient transport apparatus 100 along stairs ST, as shown in FIG. 25 and as indicated by the cross-hatched arrow HM2. In such an instance, the motor 188 may be configured to operate at a predetermined speed in order to facilitate a controlled descent of the patient transport apparatus 100. It will be appreciated that these scenarios are similar to those described above in connection with the passive brake 400, but occur in the active state SA using power from the battery 206.

Referring back to FIG. 22, the flowchart 450 illustrates how the controller 212 switches between various states and modes. In the embodiment depicted in FIG. 22, the drive system 182 begins operation in the sleep mode MS of the inactive state IS. While in the sleep mode MS, the controller 212 at step 452 determines if it has received a user input generated by user engagement of any portion of the user interface 204. If the controller 212 receives the user input, the controller 212 switches operation of the drive system 182 to the active state SA. In step 454, the controller 212 determines if the charge of the battery 206 is less than the threshold charge value TCV (e.g. 5% charge) and if the battery 206 is not connected to the drive system 182. If the charge of the battery 206 is less than the threshold charge value TCV, the controller 212 switches operation to the low charge mode MLC of the inactive state SI, and if the battery 206 is not connected to the drive system 182 the controller 212 switches operation to the battery disconnect mode MBD of the inactive state SI. In flowchart 450, the low charge mode MLC and the battery disconnect mode MBD are illustrated using a single block.

Upon entering the active state SA, the controller 212 determines whether to enter the drive mode MD and whether to enter the hold mode MH during step 456. The controller 212 switches operation to the drive mode MD in response the user engaging the user interface 204 to adjust the direction of movement of the belt 156. The controller 212 switches operation to the hold mode MH in response to the hold mode interface sensor 358 sensing that the hold mode interface 354 is engaged.

While operating in the drive mode MD, the controller 212 determines whether to enter the hold mode MH, enter the sleep mode MS, enter the low charge mode MLC, or enter the battery disconnect mode MBD. During step 458, the controller 212 switches operation to the hold mode MH in response to the hold mode interface sensor 358 sensing that the hold mode interface 354 is engaged. During step 460, the controller 212 is configured to switch operation to the sleep mode MS in response to an absence of engagement with the user interface occurring over a predetermined period (e.g. 5 min, 3 min, 1 min, 30 sec, etc.). During step 454, the controller 212 determines if the charge of the battery 206 is less than the threshold charge value TCV (e.g. 5% charge) and if the battery 206 is not connected to the drive system 182 to determine whether to switch operation to the low charge mode MLC or the battery disconnect mode MBD, respectively. If the controller 212 does not enter any of these modes, the controller 212 generally otherwise continues operating in the drive mode MD.

While operating in the hold mode MH, the controller 212 determines whether to return to step 456 of the active state SA, to enter the low charge mode MLC, or to enter the battery disconnect mode MBD. During step 462, the controller 212 switches operation back to the active state SA in response to the hold mode interface sensor 358 sensing that the hold mode interface 354 is no longer engaged. As such, in the embodiment illustrated in FIG. 22, the controller 212 operates in the hold mode MH if the hold mode interface 354 is engaged, and the controller 212 exits the hold mode MH by switching operation to step 456 of the active state SA if the hold mode interface 354 is no longer engaged. During step 454, the controller 212 determines if the charge of the battery 206 is less than the threshold charge value TCV (e.g. 5% charge) and if the battery 206 is not connected to the drive system 182 to determine whether to switch operation to the low charge mode MLC or the battery disconnect mode MBD, respectively. If the controller 212 does not return to step 456 of the active state SA or does not enter the low charge mode MLC or the battery disconnect mode MBD, the controller 212 generally otherwise continues operating in the hold mode MH.

While operating in the low charge mode MLC, the controller 212 may be configured to enter step 456 of the active state SA if the controller 212 determines that the charge of the battery 206 is greater than the threshold charge value TCV during step 464. Additionally, while operating in the battery disconnect mode MBD, the controller 212 may be configured to enter step 456 of the active state SA if the controller 212 determines that the battery 206 is connected to the drive system 182.

It should be noted, the flowchart 450 illustrated in FIG. 22 represents operation of the controller 212 according to embodiments of the present disclosure, but other configurations are contemplated. For example, in some embodiments, the controller 212 may be configured to enter the sleep mode MS, instead of step 456 of the active state SA, from the low charge mode MLC in response to the controller 212 determining that the charge of the battery 206 is greater than the threshold charge value TCV during step 464. Similarly, the controller 212 may be configured to enter the sleep mode MS, instead of step 456 of the active state SA, from the battery disconnect mode MBD in response to the controller 212 determining that the battery 206 is connected to the drive system 182.

Figure 4:
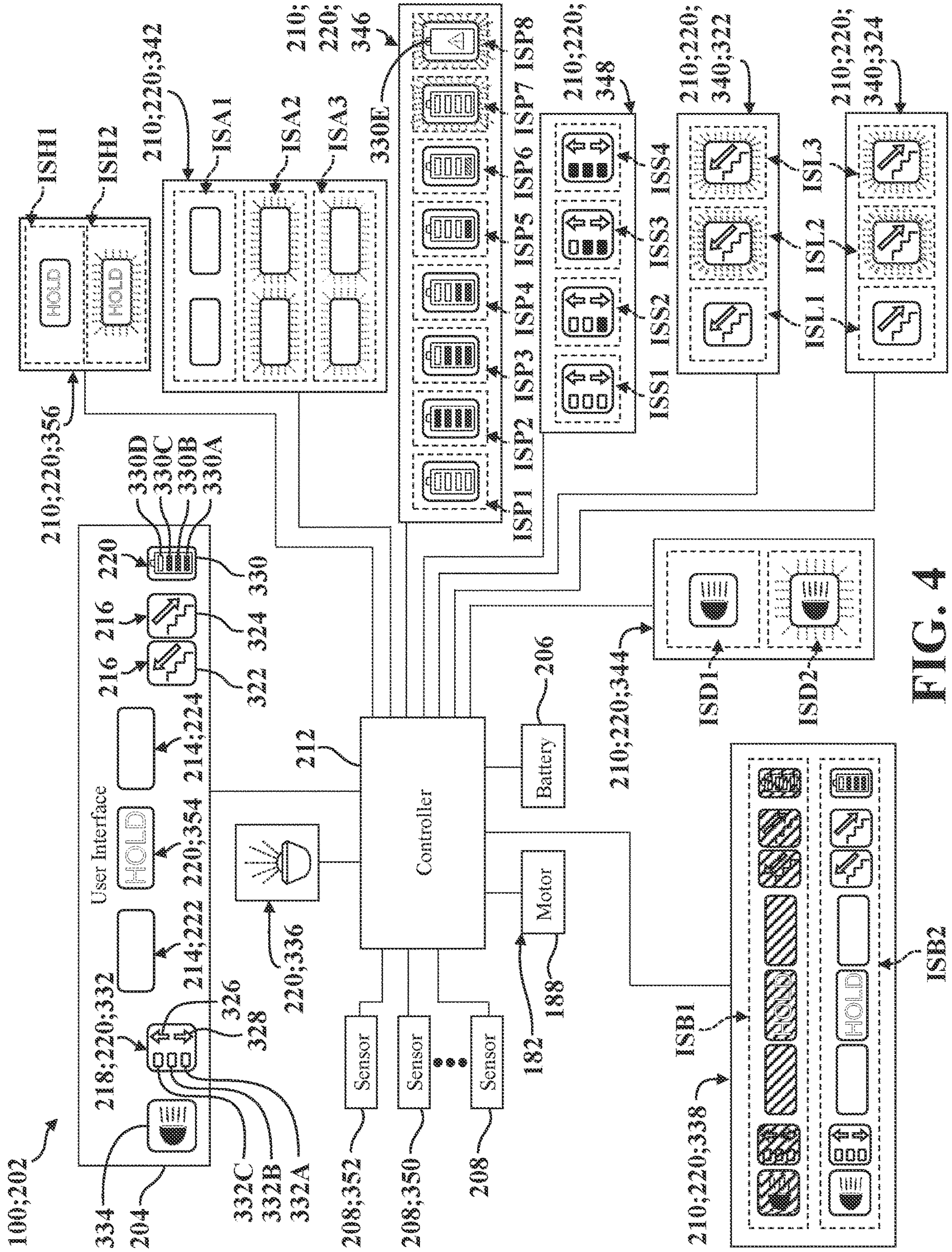
FIG. 4 is a partial schematic view of a control system of the patient transport apparatus of FIGS. 1-3, shown with a controller disposed in communication with a battery, a user interface, a drive system, and a plurality of light modules.
Figure 26A:
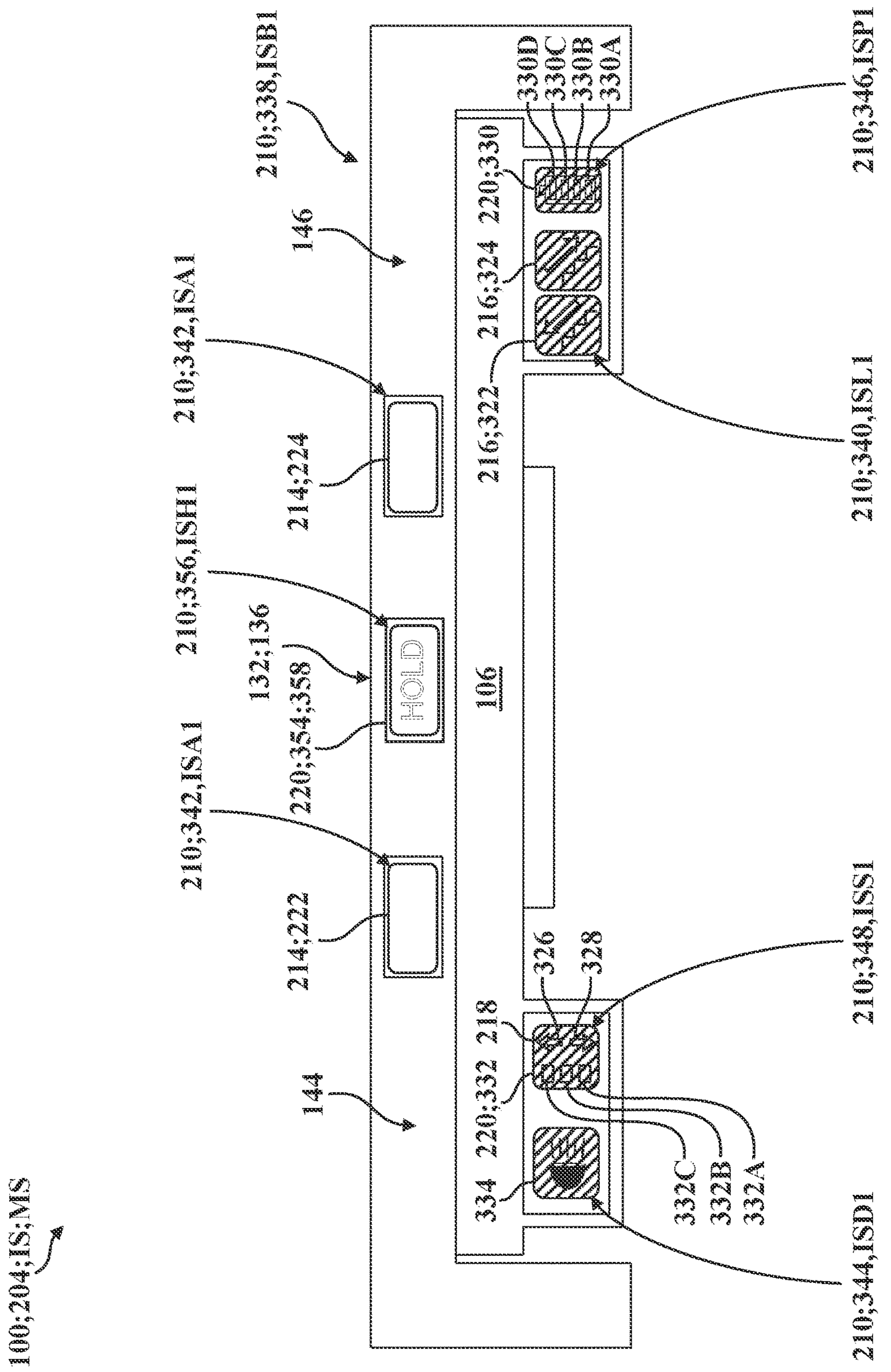
FIG. 26A is a schematic, top-side view of a user interface of the patient transport apparatus of FIGS. 1-12I, shown depicted in a sleep mode.

As noted above, the representative embodiment of the patient transport apparatus 100 illustrated herein employs the control system 202 to, among other things, facilitate operation of the drive system 182 via the controller 212 in response to caregiver engagement with the user interface 204. Referring now to FIGS. 4 and 26A, a representative embodiment of the user interface 204 of the patient transport apparatus 100 is depicted schematically. As noted above, in some embodiments, the user interface 204 may include one or more activation input controls 214 (e.g., the first and second activation input controls 222, 224) that are disposed in communication with the controller 212. Here too, in some embodiments, the user interface 204 may include one or more direction input controls 216, such as a first direction input control 322 and a second direction input control 324, to facilitate changing the drive direction of the motor 188. Furthermore, in some embodiments, the user interface 204 may include one or more speed input controls 218, such as a first speed input control 326 and a second speed input control 328, to facilitate operating the motor 188 at different predetermined speeds. Moreover, in some embodiments, the user interface 204 may include one or more indicators 220 to display information to the caregiver, such as a battery indicator 330 to display information about the charge of the battery 206, and such as a speed indicator 332 to display information about the selected drive speed of the motor 188. In some embodiments, the user interface 204 may include a hold mode interface 354 arranged for engagement by the caregiver such that the controller 212 operates in a hold mode MH of the active state SA, as noted above, in order to control the motor 188 to limit movement of the belt 156 to facilitate a controlled descent of the patient transport apparatus 100 along stairs ST. In some embodiments, the user interface 204 may include an area light input control 334 arranged for engagement by the caregiver to operate a light module 210 realized as an area light module 336 arranged to illuminate the area surrounding the patient transport apparatus 100 (see FIGS. 1-2). Each of the components of the user interface 204 introduced above will be described in greater detail below.

In some embodiments, the user interface 204 may comprise one or more light modules 210 realized as backlight modules 338 arranged to illuminate various input controls 214, 216, 218, 222, 224, 322, 324, 326, 328, 354 and/or indicators 220, 330, 332, 356 under certain operating conditions. In some embodiments, the user interface 204 may comprise one or more light modules 210 configured to, among other things, provide status information to the caregiver. In some embodiments, one or more direction light modules 340 could be provided adjacent to the direction input control(s) 216, 322, 324 to indicate a selected drive direction to the caregiver, alert the caregiver of a need to interact with the user interface 204, and the like. In some embodiments, one or more activation light modules 342 could be provided adjacent to the activation input controls 214, 222, 224 to indicate a current operating state of the patient transport apparatus 100 (e.g., the operating state of the motor 188) to the caregiver, alert the caregiver of a need to interact with the user interface 204, and the like. In some embodiments, one or more area light input modules 344 could be provided adjacent to the area light input control 334 to indicate a status of the area light module 336 to the caregiver, alert the caregiver of a need to interact with the user interface 204, and the like. In some embodiments, one or more battery light modules 346 may be provided as a part of (or otherwise adjacent to) the battery indicator 330 to indicate a status of the charge state of the battery 206 to the caregiver, alert the caregiver of a need to interact with the user interface 204, and the like. In some embodiments, one or more speed light modules 348 may be provided as a part of (or otherwise adjacent to) the speed indicator 332 and/or the speed input control(s) 218, 326, 328 to indicate a selected one of a plurality of drive speed DS1, DS2, DS3 to the caregiver, alert the caregiver of a need to interact with the user interface 204, and the like. In some embodiments, one or more hold mode indicators 356 could be provided adjacent to the hold mode interface 354 to indicate whether the controller 212 is operating in the hold mode MH of the active state SA, which is described in greater detail below. Each of the light modules 210 introduced above will be described in greater detail below.

Figure 26B:
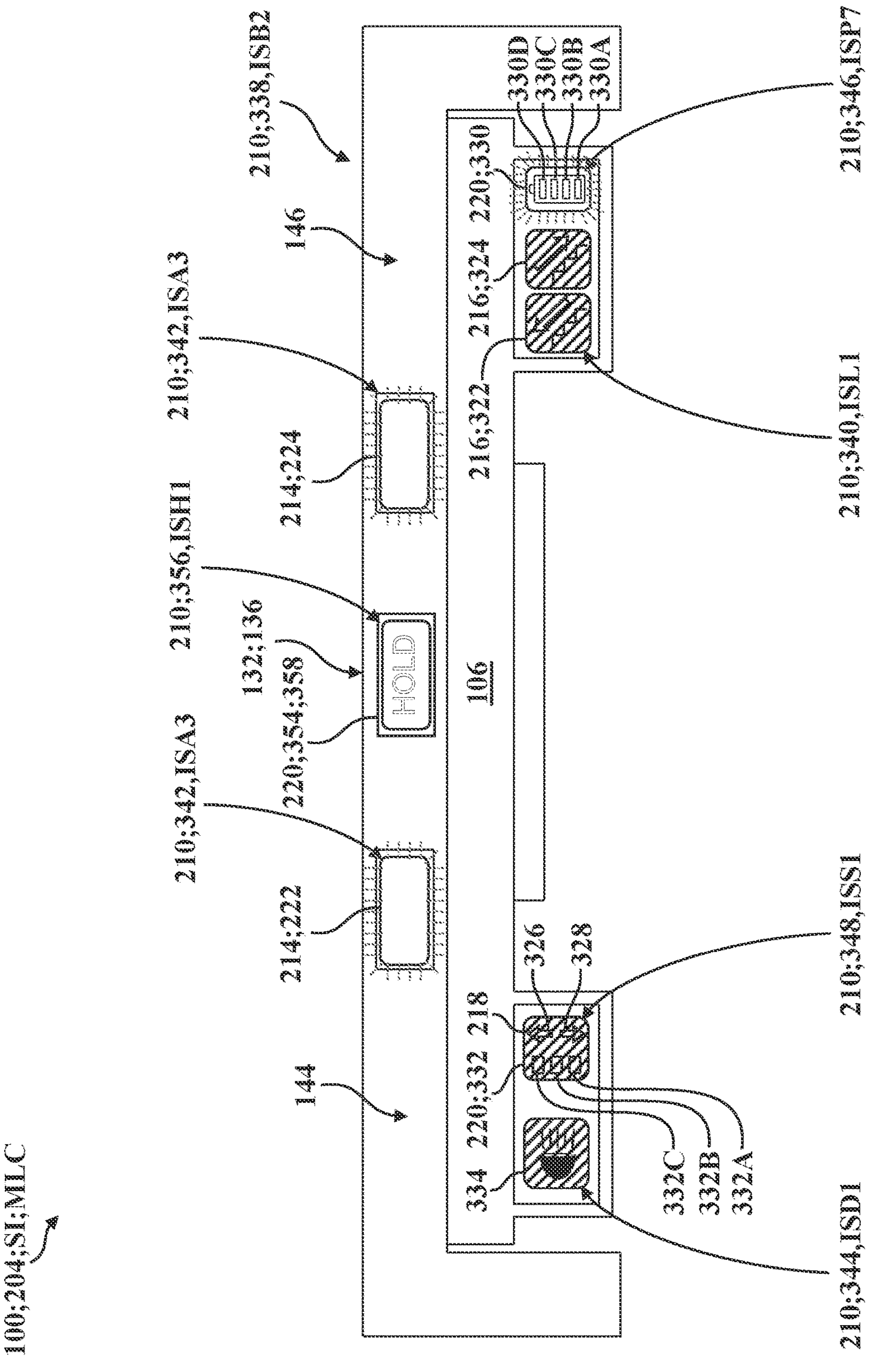
FIG. 26B is a schematic, top-side view of a user interface of FIG. 26A, shown depicted in the low charge mode.
Figure 26C:
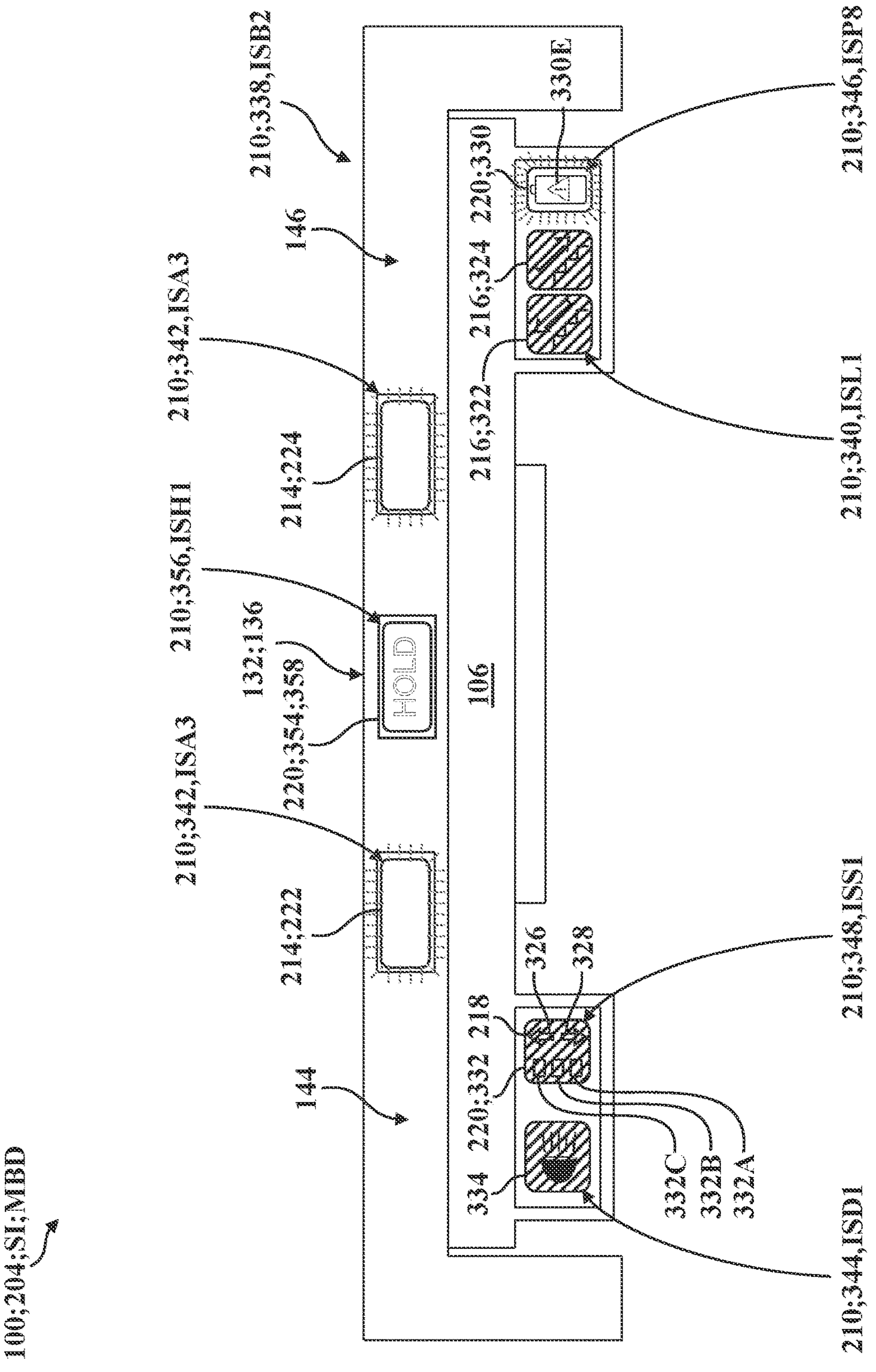
FIG. 26C is a schematic, top-side view of a user interface of FIG. 26A-26B, shown depicted in the battery disconnect mode.
Figure 27A:
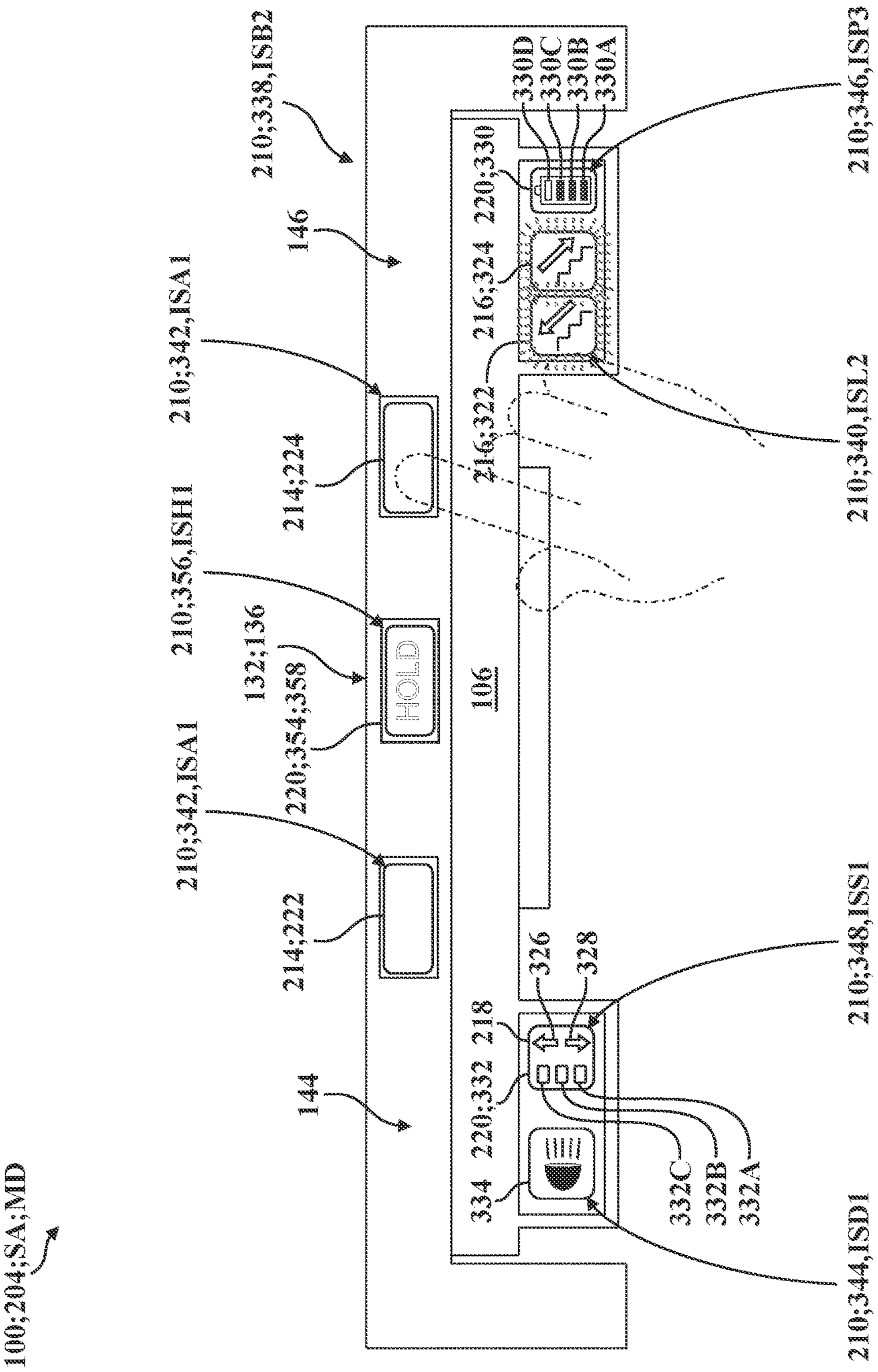
FIG. 27A is another schematic, top-side view of the user interface of FIG. 26A-26C, shown depicted in the drive mode after being engaged by a caregiver, and shown prompting the caregiver to select a drive direction.
Figure 27B:
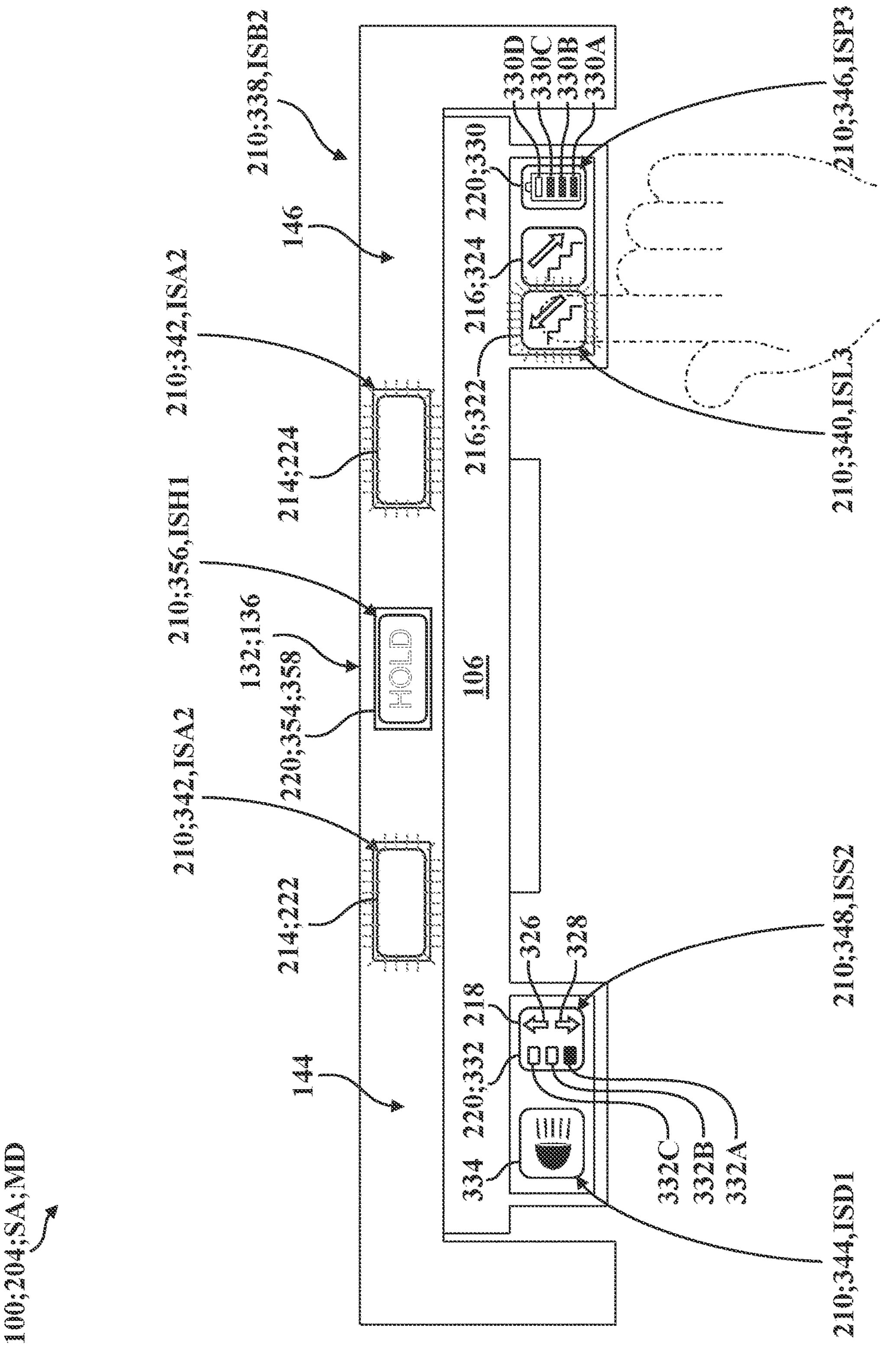
FIG. 27B is another schematic, top-side view of the user interface of FIG. 26A-27A, shown depicted in the drive mode after the caregiver has selected a drive direction.
Figure 27C:
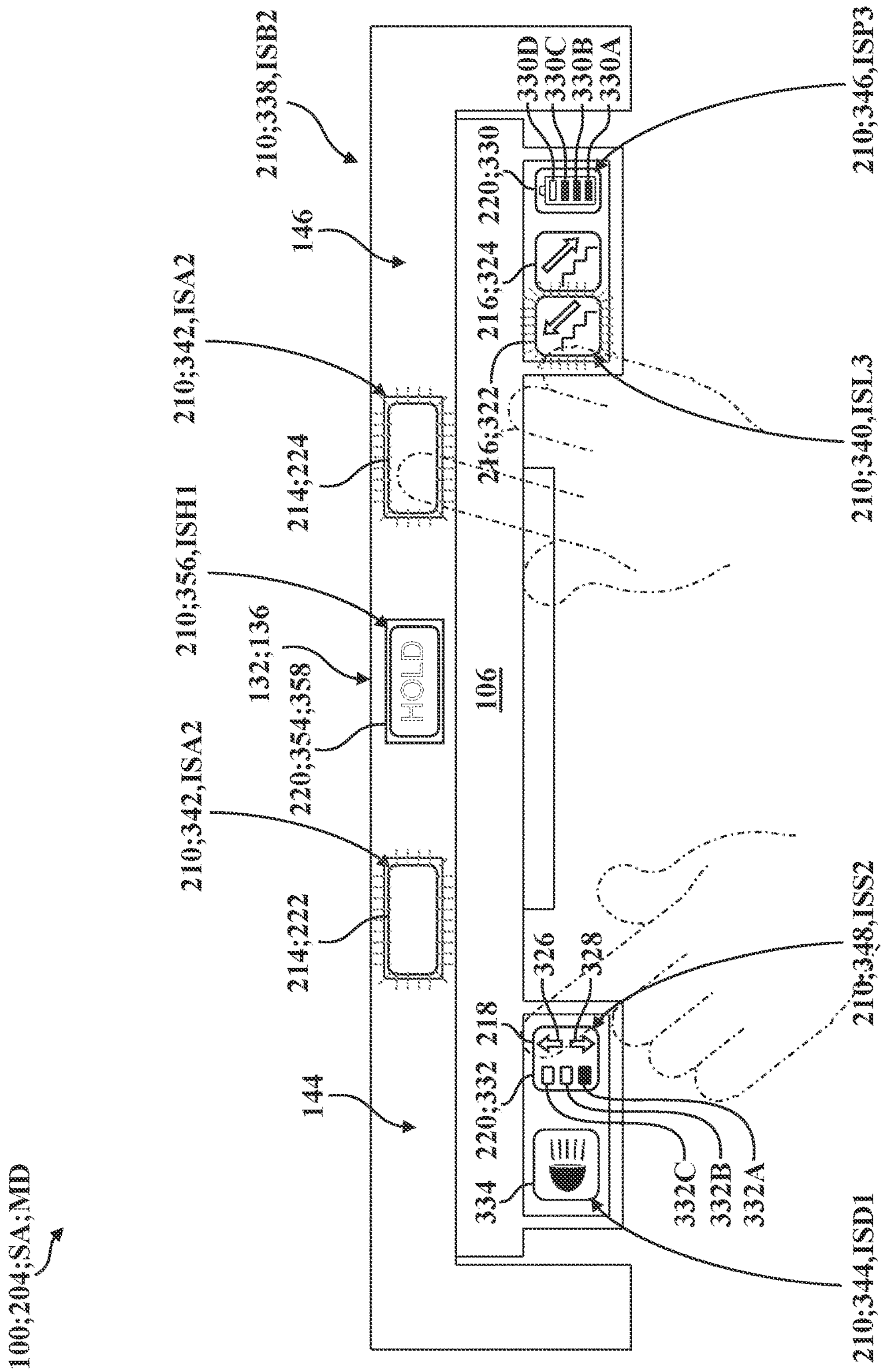
FIG. 27C is another schematic, top-side view of the user interface of FIG. 26A-27B, shown depicted in the drive mode with the caregiver engaging an activation input control while also engaging a speed input control.
Figure 27D:
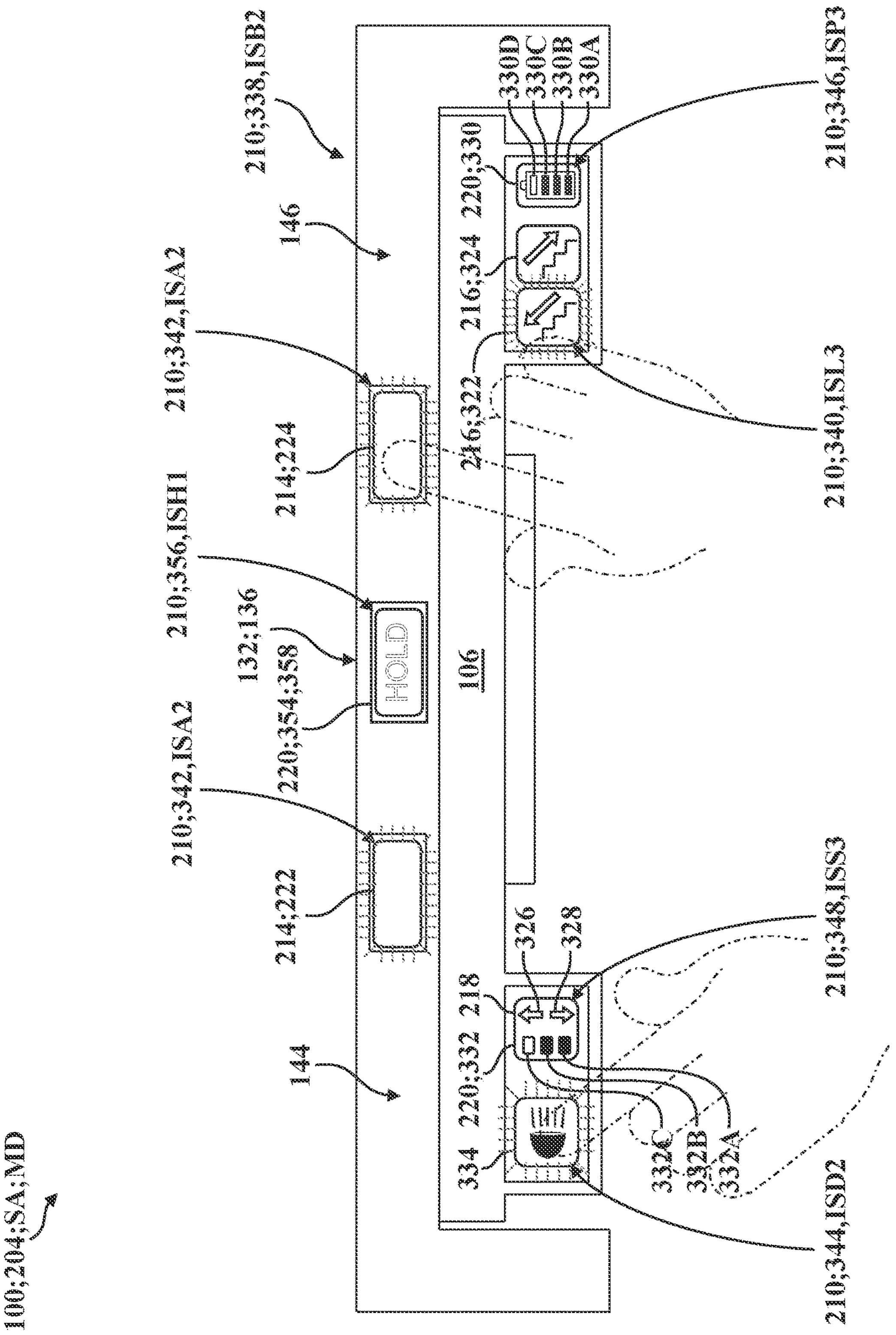
FIG. 27D is another schematic, top-side view of the user interface of FIG. 26A-27C, shown depicted in the drive mode with the caregiver engaging the activation input control while also engaging an area light input control.
Figure 27E:
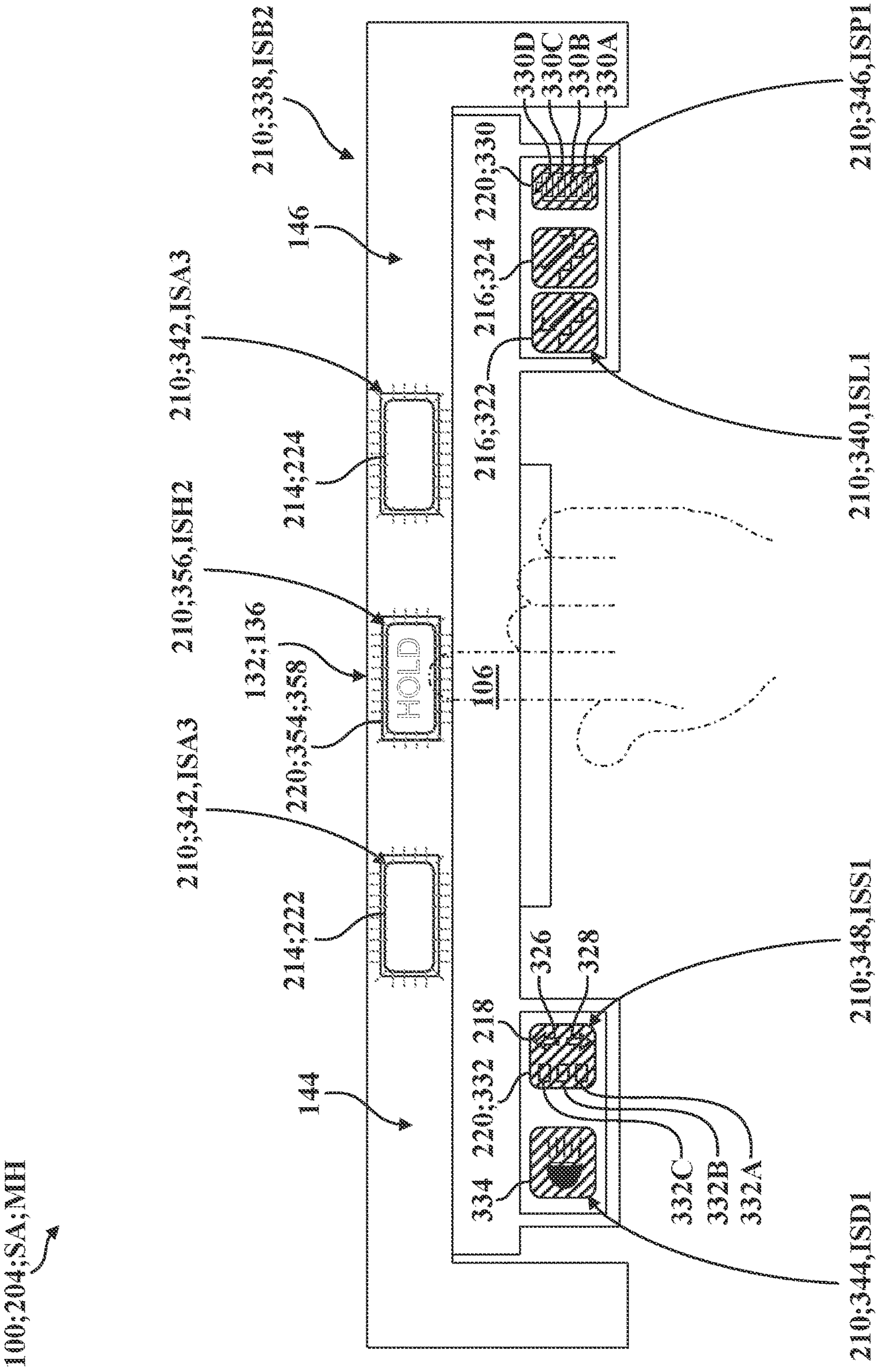
FIG. 27E is another schematic, top-side view of the user interface of FIG. 26A-27D, shown depicted in the hold mode with the caregiver engaging a hold mode interface.

In the representative embodiment illustrated herein, the controller 212 may be operable in the inactive state SI in which power consumption is limited, and the active state SA in which the controller 212 controls movement of the belt 156 with the motor 188 of the patient transport apparatus 100. As previously described, the controller 212 may be configured to operate in a variety of inactive states SI and active states SA. For example, the controller 212 may be configured to operate in the sleep mode MS of the inactive state SI, the low charge mode MLC of the inactive state SI, and the battery disconnect mode MBD of the inactive state SI. Certain inactive states SI (e.g., sleep mode MS, low charge mode MLC, and battery disconnect mode MBD) are shown in FIGS. 26A-26C. Also previously described, the controller 212 may be configured to operate in the drive mode MD of the active state SA and the hold mode MH of the active state. The drive mode MD is shown in FIGS. 27A-27D, and the hold mode MH is shown in FIG. 27E.

As noted above, the one or more light modules 210 may include one or more backlight modules 338 disposed in communication with the controller 212. The controller 212 may be configured to operate the backlight modules 338 such that the user is able to visually discern whether the controller 212 is in an inactive state SI or an active state SA. For example, the controller 212 may be configured to operate the backlight module 338 in first and second illumination states ISB1, ISB2. In some embodiments, the first illumination state ISB1 may be defined by the absence of light emission and the second illumination state ISB2 may be defined by light emission. It will be appreciated that the first and second illumination states ISB1, ISB2 of the backlight module 338 could be defined in other ways sufficient to differentiate from each other. By way of non-limiting example, first and second illumination states ISB1, ISB2 could be defined by emission of light at different brightness levels (e.g., dimmed or changing between dimmed and brightened), in different colors, blinking patterns and the like. Other configurations are contemplated.

In the illustrated embodiment of FIG. 26A, the controller 212 is shown in a sleep mode MS of the inactive state SI. During the sleep mode MS of the inactive state SI, the controller 212 may be configured to operate the backlight module 338 in the first illumination state ISB1. In this representative embodiment, during the first illumination state ISB1, the backlight module 338 does not emit any light and thus no portion of the user interface 204 is illuminated. In response to receiving a user input UI1 generated by user engagement of any portion of the user interface 204, the controller 212 may be configured to switch from the sleep mode MS of the inactive state SI to an active state SA.

In response to the controller 212 switching from the sleep mode MS of the inactive state SI to an active state SA, the controller 212 switches the backlight module 338 from the first illumination state ISB1 to the second illumination state ISB2. During the second illumination state ISB2, the backlight module 338 may be configured to at least partially illuminate one or more controls 214, 216, 218, 222, 224, 322, 324, 326, 328, 354 and/or indicators 220, 330, 332, 356 of the user interface 204. In the illustrated embodiment of FIG. 27A, the backlight module 338 is shown operating in the second illumination state ISB2 such that the direction input controls 216, the battery indicator 330, area light input control 334, the speed indicator 332, and the speed input controls 218 are all illuminated with backlighting.

As noted above, the one or more light modules 210 may include the area light module 336 that is disposed in communication with the controller 212 and configured to provide light to the surrounding area. As is depicted generically in FIGS. 1-2, the illustrated area light module 336 is coupled to the carrier assembly 148 (e.g., to the cover 186) and emits light EL in different directions relative to the seat section 104 (as well as to other components) as the patient transport apparatus 100 moves between the chair configuration CC (see FIG. 1) and the stair configuration SC (see FIG. 2). More specifically, the area light module 336 is arranged so as to emit light EL toward the floor surface FS when the patient transport apparatus 100 operates in the chair configuration CC (see FIGS. 1 and 12D; light emission is towards stairs as illustrated), and to emit light EL more upwardly when the patient transport apparatus 100 operates in the stair configuration SC (see FIGS. 2, 12F, and 12I). This configuration may advantageously direct emitted light above the second caregiver when transporting the patient down stairs ST with the patient transport apparatus 100 while still affording illumination of the surrounding area. In some embodiments, additional and/or alternative area light modules 336 could be provided to direct emitted light toward other areas, such as behind the patient transport apparatus 100. To this end, one or more area light modules 336 could be coupled to the back section 106 (see FIG. 3) arranged to emit light toward the floor surface FS and/or stairs ST behind the patient transport apparatus 100. Other configurations are contemplated.

Irrespective of the specific configuration and/or arrangement of the area light module 336, the area light input control 334 may be configured to operate the area light module 336 in response to user engagement, and in some embodiments, the controller 212 may be configured to operate the area light input module 344 in a first illumination state ISD1 and a second illumination state ISD2 so as to provide visual cues as to an operating state of the area light module 336. The first illumination state ISD1 may be defined by the absence of light emission. The area light input module 344 is shown in the first illumination state ISD1 in FIGS. 26A-27C. The second illumination state ISD2 may be defined by light emission. The area light input module 344 is shown in the second illumination state ISD2 in FIG. 27D. It will be appreciated that the first and the second illumination states ISD1, ISD2 of the area light input module 344 could be defined in other ways sufficient to differentiate from each other. By way of non-limiting example, the first and second illumination states ISD1, ISD2 could be defined by emission of light at different brightness levels (e.g., dimmed or changing between dimmed and brightened), in different colors, blinking patterns and the like. Other configurations are contemplated.

The controller 212 may be configured to automatically enter the sleep mode MS of the inactive state SI in which the controller 212 initiates the sleep mode MS based on the absence of user engagement with the user interface 204. The automatic sleep mode MS may be disabled or deactivated in response to engagement of the activation input controls 214, such as in order to prevent the controller 212 from entering automatic sleep mode MS while the patient transport apparatus 100 is ascending or descending stairs. The controller 212 may be configured to determine an absence of user engagement with the user interface 204 over a predetermined period. For example, the controller 212 may include a power countdown timer that is activated in response to the controller 212 switching to an active state SA and the activation input controls 214 being disengaged. The power countdown timer may be reset in response to engagement of any portion of the user interface 204. In response to determining the absence of user engagement of the user interface 204 at the end of the predetermined period, the controller 212 may switch from an active state SA to the sleep mode MS.

The controller 212 may set or otherwise determine the predetermined period based on an operating state of the area light module 336. In response to the area light module 336 being OFF (e.g., the area light input module 344 is in the first illumination state ISD1), the controller 212 may set the time threshold to three minutes. In response to the area light module 336 being ON (e.g., the area light input module 344 is in the second illumination state ISD2), the controller 212 may set the timer threshold to fifteen minutes. While the examples of three minutes and fifteen minutes are provided, the controller 212 may be configured to the predetermined period or to other suitable times.

The battery indicator 330 may be configured to display a charge state of the battery 206 to the user. The state of charge of the battery 206 may be based on a voltage of the battery 206. The battery indicator 330 may include a plurality of bars 330A, 330B, 330C, 330D or other indicia. As noted above, the one or more light modules 210 may include one or more battery light modules 346 disposed adjacent or underneath to the battery indicator 330. The controller 212 may be configured to operate the battery light module 346 in a first illumination state ISP1, a second illumination state ISP2, a third illumination state ISP2, a fourth illumination state ISP4, a fifth illumination state ISP5, a sixth illumination state ISP6, a seventh illumination state ISP7, and an eighth illumination state ISP8. In response to the controller 212 being in the sleep mode MS of the inactive state SI, the controller 212 may operate the battery light module 346 in the first illumination state ISP1 in which none of the bars 330A, 330B, 330C, 330D are illuminated (e.g., there is an absence of light emission). In response to the state of charge of the battery 206 falling within a first predetermined range, the controller 212 may operate the battery light module 346 in the second illumination state ISP2 in which all four bars 330A, 330B, 330C, 330D are illuminated. The first predetermined range may be set from 76-100%. In response to the state of charge of the battery 206 falling within a second predetermined range, the controller 212 may operate the battery light module 346 in the third illumination state ISP3 in which first, second, and third bars 330A, 330B, 330C are illuminated. The second predetermined range may be set from 51-75%. In response to the state of charge of the battery 206 falling within a third predetermined range, the controller 212 may operate the battery light module 346 in the fourth illumination state ISP4 in which the first and second bars 330A, 330B are illuminated. The third predetermined range may be set from 26-50%. In response to the state of charge of the battery 206 falling within a fourth predetermined range, the controller 212 may operate the battery light module 346 in the fifth illumination state ISP5 in which the first bar 330A is illuminated. The fourth predetermined range may be set to 15-25%. In response to the state of charge of the battery 206 falling within a fifth predetermined range, the controller 212 may operate the battery light module 346 in the sixth illumination state ISP6 in which the first bar 330A is illuminated in an oscillating manner (e.g., flashing manner). The fifth predetermined range may be set to 5-15%. In response to the state of charge of the battery 206 falling below a threshold value, e.g. 5%, the controller 212 may operate the battery light module 346 in the seventh illumination state ISP7, as represented by an embodiment of the low charge mode MLC of the inactive state SI shown in FIG. 26B. As shown, in the seventh illumination state ISP7, none of the bars 330A, 330B, 330C, 330D are illuminated and the controller 212 illuminates the battery indicator 330 in an oscillating manner (e.g., flashing manner). In some instances, the controller 212 may also illuminate the activation light module 342 in a third illumination state ISA3, which will be described in greater detail below, in order to communicate to the user that the state of charge of the battery 206 is below the threshold value. While example ranges are provided for the first, second, third, fourth, and fifth predetermined ranges and an example threshold value is provided, the controller 212 may be configured to set the ranges to alternative ranges and the threshold value to an alternative threshold value. Other configurations are contemplated.

The battery indicator 330 may also be configured to display if the battery 206 is not connected to the drive system 182. In response to the battery 206 not being connected to the drive system 182, the controller 212 may operate the battery light module 346 in the eighth illumination state ISP8, as represented by an embodiment of the battery disconnect mode MBD of the inactive state SI shown in FIG. 26C. As shown, the battery indicator 330 may be configured to present, reveal, display, or otherwise draw user attention to a symbol 330E (e.g., a warning or caution indicia) to indicate that the battery 206 is not connected to the drive system 182. It will be appreciated that the battery indicator 330 may be powered using another power source (e.g., an interface battery that is separate from the battery 206; not shown). In the eighth illumination state ISP8 shown in FIG. 26C, the controller 212 may illuminate the symbol 330E in an oscillating manner (e.g., a flashing manner). In some embodiments, the controller 212 may be configured to operate the activation light module 342 in the third illumination state ISA3, which will be described in greater detail below, in order to communicate to the user that the battery 206 is not connected to the drive system 182. While a caution sign is provided to indicate that the battery 206 is not connected to the drive system 182, in other embodiments, alternate or additional indicia may be used to indicate that the battery 206 is not connected to the drive system 182.

As noted above, the one or more light modules 210 may include one or more direction light modules 340 arranged adjacent to or underneath the direction input controls 216 and disposed in communication with the controller 212. The direction input controls 216 may include the first direction input control 322 and the second direction input control 324. Here, the first direction input control 322 may be configured to select a drive direction of the motor 188 in order to ascend stairs. The second direction input control 324 may be configured to select a drive direction of the motor 188 in order to descend stairs. In some embodiments, the controller 212 may be configured to operate the direction light module 340 in a first illumination state ISL1, a second illumination state ISL2, and a third illumination state ISL3. The first illumination state ISL1 may be defined by the absence of light emission. The second illumination state ISL2 may be defined by oscillating light emission. The third illumination state ISL3 may be defined by steady light emission. It will be appreciated that the first, second, and third illumination states ISL1, ISL2, ISL3 of the direction light module 340 could be defined in other ways sufficient to differentiate them from each other. By way of non-limiting example, the first and second illumination states ISL1, ISL2, ISL3 could be defined by emission of light at different brightness levels (e.g., dimmed or changing between dimmed and brightened), in different colors, blinking patterns and the like. Other configurations are contemplated.

With reference back to FIGS. 26A-26C, the direction light module 340 is shown in the first illumination state ISL1 (e.g., there is no light being emitted by the direction light module 340). The controller 212 may operate the direction light module 340 in the first illumination state ISL1 in order to communicate to the user that the patient transport apparatus 100 is operating in an inactive state SI. In response to receiving the first user input UI1 generated by user engagement of any portion of the user interface 204, in addition to switching from the sleep mode MS of the inactive state SI to an active state SA, the controller 212 may be configured to switch the direction light module 340 from the first illumination state ISL1 to the second illumination state ISL2. For example, an embodiment of the drive mode MD of the active state SA is shown in FIG. 27A. As shown, the controller 212 has switched the direction of light module 340 to the second illumination state ISL2. The controller 212 may operate the direction light module 340 in the second illumination state ISL2 in order to provide a visual prompt to the user that one of the direction input controls 216 needs to be selected.

In response to receiving a second user input UI2 generated by user selection of one of the direction input controls 216, the controller 212 may be configured to switch operation of the direction light module 340 from the second illumination state ISL2 to the third illumination state ISL3. The third illumination state ISL3 may provide a visual cue to the user that a direction has been selected. For example, an embodiment of the drive mode MD of the active state SA is shown in FIGS. 27B-27D. As shown in FIGS. 27B-27D, the first direction input control 322 was selected by the user and is thus emitted with steady light during the third illumination state ISL3.

With reference to FIG. 27C, as previously discussed, the one or more speed input controls 218 may be configured to select between the plurality of drive speeds DS1, DS2, DS3 of the motor 188. The speed indicator 332 may be disposed adjacent to the one or more speed input controls 218. The speed indicator 332 may be configured to display the selected one of the plurality of drive speeds DS1, DS2, DS3 of the motor 188 to the user. Here, the one or more light modules 210 may include the speed light module 348 disposed adjacent or underneath the speed indicator 332. The speed indicator 332 may include a plurality of bars 332A, 332B, 332C or other indicia that are illuminated by the speed light module 348 in order to communicate to the user the selected one of the plurality of drive speeds DS1, DS2, DS3 of the motor 188.

The controller 212 may be configured to operate the speed light module 348 in a first illumination state ISS1 defined by the absence of light emission. The controller 212 may be configured to operate the speed light module 348 in a second illumination state ISS2 defined by light emission of a first bar 332A. The controller 212 may be configured to operate the speed light module 348 in a third illumination state ISS3 defined by light emission of first and second bars 332A, 332B. The controller 212 may be configured to operate the speed light module 348 in a fourth illumination state ISS4 defined by the light emission of all three bars 332A, 332B, 332C. It will be appreciated that the first, second, third, and fourth illumination states ISS1, ISS2, ISS3, and ISS4 of the light module of the speed indicator 332 could be defined in other ways sufficient to differentiate from each other. By way of non-limiting example, the first and second illumination states ISS1, ISS2 could be defined by emission of light at different brightness levels (e.g., dimmed or changing between dimmed and brightened), in different colors, blinking patterns and the like. Other configurations are contemplated.

The plurality of drive speeds DS1, DS2, DS3 may correspond to predetermined speed settings (a specific RPM setting) stored in memory of the controller 212. The plurality of drive speeds DS1, DS2, DS3 may include a first drive speed DS1, a second drive speed DS2, and a third drive speed DS3. The first drive speed DS1 corresponds to the lowest of the plurality of drive speeds DS1, DS2, DS3. The third drive speed DS3 corresponds to the highest drive speed of the plurality of drive speeds DS1, DS2, DS3. The second drive speed DS2 corresponds to a speed in between the first drive speed DS1 and the third drive speed DS3. It will be appreciated that the forgoing are non-limiting, illustrative examples of three discreet drive speeds, and other configurations are contemplated, including without limitation additional and/or fewer drive speeds, drive speeds defined in other ways, and the like.

As noted above, the one or more speed input controls 218 may include a first speed input control 326 and a second speed input control 328. The controller 212 may be configured to increase the selected speed to the next higher drive speed setting in response to the user engagement of the first speed input control 326. For example, in response to receiving a third user input UI3 generated by user engagement of the first speed input control 326 when the current selected drive speed is the first drive speed DS1, the controller 212 may set the current speed to the second drive speed DS2. The controller 212 may be configured to decrease the selected drive speed to the next lower drive speed setting in response to user engagement of the second speed input control 328. For example, when the current selected drive speed is the second drive speed DS2, the controller 212 may set the current speed to the first drive speed DS1 in response to user engagement of the second speed input control 328.

The controller 212 may be configured to operate the speed light module 348 in one of the second, third, or fourth illumination states ISS2, ISS3, or ISS4 based on the current drive speed setting DS1, DS2, DS3 of the motor 188. In FIGS. 27B-27C, the current drive speed setting of the motor 188 is set to the first drive speed DS1. As such, the controller 212 operates the speed light module 348 in the second illumination state ISS2, as shown when the first bar 332A of the speed indicator 332 is illuminated. In FIG. 27D, the speed light module 348 is shown in the third illumination state ISS3.

In some embodiments, the controller 212 may be configured to initially select the first drive speed DS1 of the plurality of drive speeds DS1, DS2, DS3 in response to user engagement of the direction input controls 216 following the change in operation from the inactive state SI to the active state SA. However, it is contemplated that the controller 212 may be configured alternatively, such as to initially select the second drive speed DS2 or the third drive speed DS3 of the plurality of drive speeds DS1, DS2, DS3.

The controller 212 may be configured to selectively permit operation of the motor 188 in response to receiving a fourth user input UI4 generated by engagement of one of the activation input controls 214 (e.g., the first activation input control 222 or the second activation input control 224). For example, the controller 212 may be configured to permit operation of the motor 188 in response to user engagement of at least one of the activation input controls 214 following user engagement of the direction input control 216 to drive the belt 156 in a selected drive direction. In another example, the controller 212 may be configured to permit operation of the motor 188 in response to user engagement of the activation input controls 214 within a predetermined period following engagement of the direction input control 216. After the predetermined period following user engagement of the direction input control 216 has elapsed, the controller 212 may prevent operation of the motor 188 even when one of the activation input controls 214 is engaged. The controller 212 may also be configured to limit operation of the motor 188 in response to receiving the fourth user input UI4 before receiving the second user input UI2 generated by user selection of one of the direction input controls 216.

The activation input controls 214 may be arranged between the first and second hand grip regions 144, 146 in order to facilitate user engagement of the activation input controls 214 from either of the first and second hand grip regions 144, 146. As previously discussed, the activation input controls 214 include the first activation input control 222 and the second activation input control 224. The first activation input control 222 may be disposed adjacent the first hand grip region 144 so as to facilitate user engagement of the first activation input control 222 from the first hand grip region 144. The second activation input control 224 may be disposed adjacent to the second hand grip region 146 so as to facilitate user engagement of the second activation input control 224 from the second hand grip region 146. Here, it will be appreciated that the user can engage either of the first and second hang grip regions 144, 146 with one of their hands to support the patient transport apparatus 100 while, at the same, using that same hand to activate one of the first and second activation input controls 222, 224 (e.g., reaching with their thumb).

The first activation input control 222 and the second activation input control 224 may be spaced apart by a predetermined distance (e.g., several inches) and are wired in parallel in some embodiments (not shown in detail). Here, as noted above, the one or more light modules 210 may include one or more activation light modules 342 arranged adjacent to or underneath the activation input controls 214. The controller 212 may be configured to operate the activation light module 342 in a first illumination state ISA1, a second illumination state ISA2, and a third illumination state ISA3 in order to provide visual cues to the user as to the current operating state of the patient transport apparatus 100, in particular, the current operating state of the motor 188.

The first illumination state ISA1 can be defined by an absence of light emission. The second illumination state ISA2 can be defined by light emission in a first color. The third illumination state ISA3 can be defined by light emission in a second color that is different from the first color. It will be appreciated that the first, second, and third illumination states ISA1, ISA2, ISA3 of the activation light module 342 could be defined in other ways sufficient to differentiate from each other. By way of non-limiting example, the first, second, and third illumination states ISA1, ISA2, ISA3 could be defined by emission of light at different brightness levels (e.g., dimmed or changing between dimmed and brightened), in different colors, blinking patterns and the like. Other configurations are contemplated.

With reference back to FIGS. 26A-27A, the activation light module 342 is shown in the first illumination state ISA1. The controller 212 may operate the activation light module 342 in the first illumination state ISA1 in order to communicate to the user that the motor 188 is not ready to operate. The controller 212 may operate the activation light module 342 in the first illumination state ISA1 when the controller 212 is in active state SA and in response to determining that the direction input control 216 has not yet been engaged by the user.

With reference to FIG. 27B, the activation light module 342 is shown operating in the second illumination state ISA2. In some embodiments, the controller 212 may operate the activation light module 342 in the second illumination state ISA2 in order to communicate to the user that the motor 188 is ready to be operated in the selected drive direction. For example, the controller 212 may switch the activation light module 342 from the first illumination state ISA2 to the second illumination state ISA2 in response to determining that the direction input control 216 has been engaged to select the drive direction of the motor 188. The controller may be configured to continue to operate the activation light module 342 in the second illumination state ISA2 when the activation input controls 214 are engaged.

With reference to FIG. 4, the activation light module 342 is shown operating in the third illumination state ISA3. In some embodiments, the controller 212 may be configured to operate the activation light module 342 in the third illumination state ISA3 in order to communicate to the user that one or more fault conditions associated with the patient transport apparatus 100 have been determined. For example, the controller 212 may be configured to switch from the first illumination state ISA1, to the second illumination state ISA2, and then to the third illumination state ISA3 in response to determining that one or more fault conditions associated with the patient transport apparatus 100 are present. The one or more fault conditions may be associated with any of the components of the patient transport apparatus 100, such as the motor 188, the battery 206, and the like.

As an example, the controller 212 may be configured to operate the activation light module 342 in the third illumination state ISA3 to communicate that the charge of the battery 206 is below a threshold value, as shown in FIG. 26B. As another example, the controller 212 may be configured to operate the activation light module 342 in the third illumination state ISA3 to communicate that the battery 206 is not connected to the drive system 182, as shown in FIG. 26C.

As noted above, the patient transport apparatus 100 may include one or more sensors 208 that generate one or more signals representative of a current state of the one or more components. The one or more sensors 208 may include a temperature sensor 350 configured to generate a temperature signal that is representative of the temperature of the motor 188. The controller 212 may be configured to compare the temperature signal to a predetermined threshold in order to determine whether a temperature fault condition exists (e.g., the motor 188 has overheated). In response to the temperature signal exceeding the predetermined threshold, the controller may operate the activation light module 342 in the third illumination state ISA3 to alert the user to the presence of a battery temperature fault condition.

In some embodiments, the controller 212 may be configured to perform a lockout function LF during user engagement of the activation input controls 214. The lockout function LF may prevent changing the drive direction of the motor 188 in response to user engagement of the direction input control 216 until the activation input controls 214 are disengaged. For example, during user engagement of the activation input controls 214, the controller 212 may be configured to perform the lockout function LF that prevents changing the drive direction of the motor 188 while the activation input controls 214 are engaged. In some embodiments, the controller 212 may be configured to determine a speed of the motor 188, such as via a rotational speed sensor 352 (see FIG. 4, depicted schematically) and perform the lockout function LF until the activation input controls 214 are no longer engaged and the speed of the motor 188 is equal to or less than a predetermined threshold (e.g., not rotating).

With reference to FIG. 27E, the user is shown engaging the first activation input control 222 and the first speed input control 326. Here, the controller 212 may be configured to permit the user to increase or decrease the drive speed via engagement with the one or more speed input controls 218 during engagement of at least one of the activation input controls 214 (e.g., while the patient transport apparatus 100 is ascending or descending stairs ST). The controller 212 may also be configured to permit operation of the area light input control 334 during engagement of the activation input controls 214.

As noted above, the one or more light modules 210 may include one or more hold mode indicators 356 arranged adjacent to the hold mode interface 354 and disposed in communication with the controller 212. The hold mode interface 354 may be configured for engagement by a user such that the controller 212 operates in the hold mode MH of the active state SA. The user interface 204 may include a hold mode interface sensor 358 configured to sense whether the hold mode interface 354 is engaged. If the hold mode interface 354 is engaged, the controller 212 controls the motor 188 to limit movement of the belt 156 to facilitate a controlled descent of the patient transport apparatus 100 along stairs ST. In some embodiments, the controller 212 may be configured to operate the hold mode interface 354 in a first illumination state ISH1 and a second illumination state ISH2. The first illumination state ISH1 may be defined by the absence of light emission and the second illumination state ISH2 may be defined by steady light emission or oscillating light emission. It will be appreciated that the first and second illumination states ISH1, ISH2 of the direction light module 340 could be defined in other ways sufficient to differentiate from each other. By way of non-limiting example, the first and second illumination states ISL1, ISL2 could be defined by emission of light at different brightness levels (e.g., dimmed or changing between dimmed and brightened), in different colors, blinking patterns and the like. Other configurations are contemplated.

With reference back to FIGS. 26A-27D, the hold mode indicator 356 is shown in the first illumination state ISH1 (e.g., there is no light being emitted by the direction light module 340). The controller 212 may operate the hold mode indicator 356 in the first illumination state ISL1 in order to communicate to the user the controller 212 is not operating in the hold mode MH of the active state SA.

In response to the hold mode interface sensor 358 sensing user engagement of the hold mode interface 354, in addition to switching to the hold mode MH of the active state SA, the controller 212 may be configured to switch the hold mode indicator 356 from the first illumination state ISH1 to the second illumination state ISH2. For example, an embodiment of the hold mode MH of the active state SA is shown in FIG. 27E. As shown, the controller 212 has switched the hold mode indicator 356 to the second illumination state ISH2. The controller 212 may operate the hold mode indicator 356 in the second illumination state ISH2 in order to indicate to the user that the controller 212 is operating in the hold mode MH and is controlling the motor 188 to limit movement of the belt 156 to facilitate a controlled descent of the patient transport apparatus 100 along stairs ST. Additionally, the controller 212 changes operation of the activation light module 342 to the third illumination state ISA3.

In some embodiments, in response to the hold mode interface sensor 358 sensing that the user is no longer engaging the hold mode interface 354, the controller 212 exits the hold mode MH. In addition, the controller 212 may be configured to switch the hold mode indicator 356 from the second illumination state ISH2 to the first illumination state ISH1. It should be noted that, in the described embodiment, the controller 212 operates in the hold mode MH if the hold mode interface 354 is engaged and the controller 212 exits the hold mode MH if the hold mode interface 354 is no longer engaged.

Figure 28:
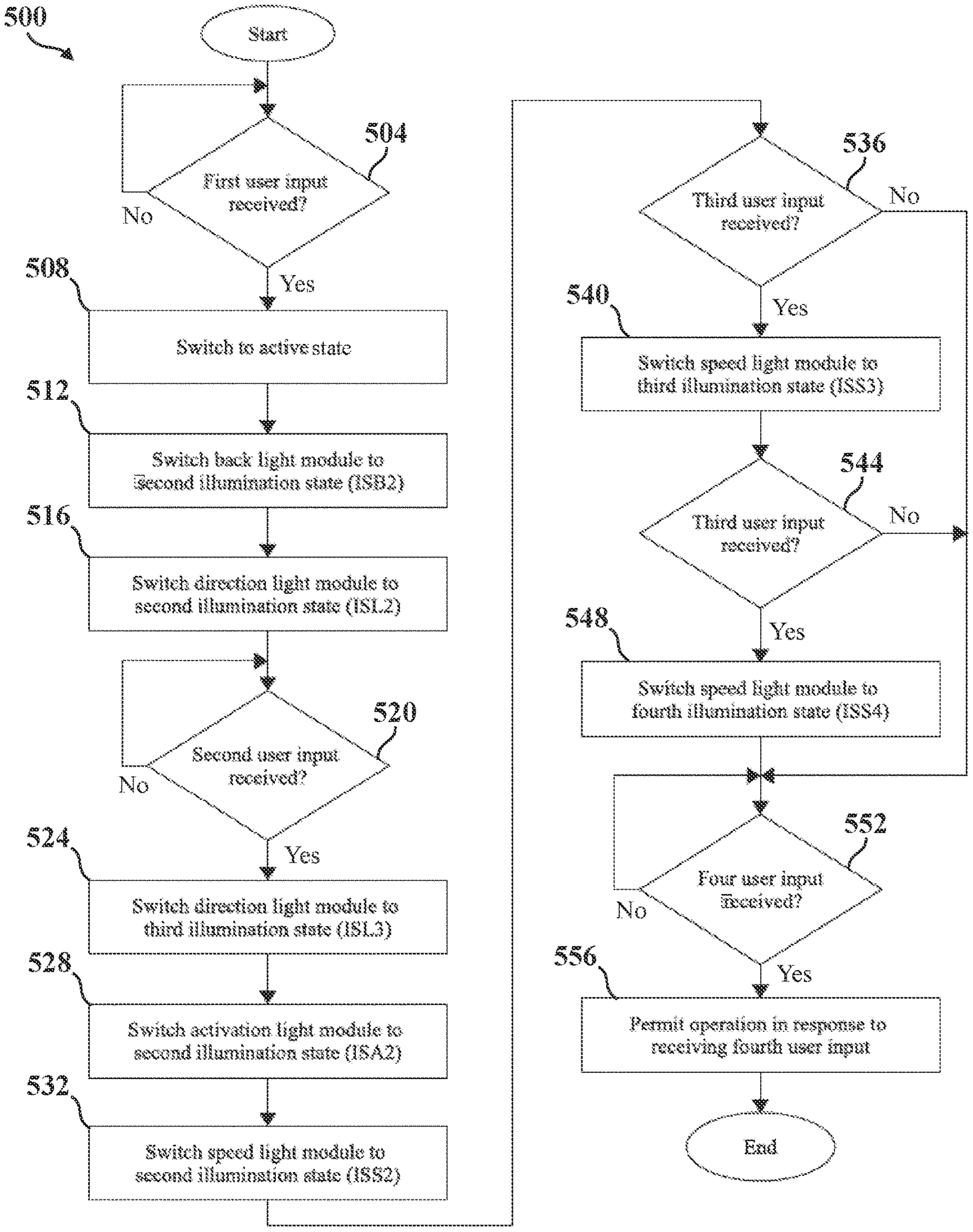
FIG. 28 is a method sequence depicting light modules operated by the controller in response to user engagement with the user interface.

With reference to FIG. 28, an exemplary method sequence 500 which may be performed by the controller 212 under certain use conditions of the patient transport apparatus 100 is depicted. As will be appreciated from the subsequent description below, this method sequence 500 merely represents an exemplary and non-limiting sequence of blocks to describe operation of certain light modules 210 in response to user engagement with the user interface 204 during the sleep mode MS of the inactive state SI and the drive mode MD of the active state SA. The method sequence 500 is in no way intended to serve as a complete functional block diagram of the control system 202. It should be noted that, in the exemplary method sequence 500, user engagement with the user interface 204 is defined as not including engagement of the hold mode interface 354.

The exemplary method sequence 500 begins with the controller 212 operating in the sleep mode MS of the inactive state SI. At block 504, the controller 212 determines whether the first user input UI1 corresponding to user engagement with a portion of the user interface 204 has been received. If so, the controller 212 continues to block 508; otherwise, the controller 212 waits at block 504 for the first user input UI1 to be received. At block 508, the controller 212 switches from the sleep mode MS of the inactive state SI to the drive mode MD of the active state SA. At block 512, in response to switching to the active state SA, the controller 212 changes operation of the backlight module 338 from the first illumination state IS B 1 to the second illumination state ISB2. At block 516, the controller 212 changes operation of the direction light module 340 from the first illumination state ISL1 to the second illumination state ISL2.

At block 520, the controller 212 determines whether the second user input UI2 corresponding to user engagement with one of the direction input controls 216 has been received. If so, the controller 212 continues to block 524; otherwise, the controller 212 waits at block 520 for the second user input UI2 to be received. At block 524, the controller 212 changes operation of the direction light module 340 from the second illumination state ISL2 to the third illumination state ISL3. At block 528, the controller 212 changes operation of the activation light module 342 from the first illumination state ISA1 to the second illumination state ISA2. At block 532, the controller 212 changes operation of the speed light module 348 from the first illumination state ISS1 to the second illumination state ISS2.

At block 536, the controller 212 determines whether the third user input UI3 corresponding to user engagement with the first speed input control 326 has been received. If so, the controller 212 continues to block 540; otherwise, the controller 212 continues to block 552. At block 540, the controller 212 changes operation of the speed light module 348 from the second illumination state ISS2 to the third illumination state ISS3. At block 544, the controller 212 determines whether the third user input UI3 has been received for a second time corresponding to user engagement of the first direction input control 322 for a second time. If so, the controller 212 continues to block 548; otherwise, the controller 212 continues to block 552.

At block 548, the controller 212 changes operation of the speed light module 348 to the fourth illumination state ISS4. At block 552, the controller 212 determines whether the fourth user input UI4 corresponding to user engagement with the activation input controls 214 has been received. If so, the controller 212 continues to block 556; otherwise, the controller 212 waits at block 552 for the fourth user input UI4 to be received. At block 556, the controller 212 permits operation of the motor 188 in response to user engagement with the activation input controls 214. While the exemplary method sequence 500 is shown as "starting" and "ending" in FIG. 28 for illustrative purposes, it will be appreciated that the controller 212 may instead return to block 504. Furthermore, as noted above, the exemplary method sequence 500 described above and depicted in FIG. 28 is in no way intended to serve as a complete functional block diagram of the control system 202, and other configurations are contemplated.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus operable by a user for transporting a patient along stairs, the patient transport apparatus comprising:

a support structure;

a seat section coupled to the support structure for supporting the patient;

a track assembly having a movable belt, the track assembly being operatively attached to the support structure and arranged for selective operation between a retracted position disposed adjacent to the support structure and a deployed position extending to engage stairs;

a drive system comprising a motor disposed in rotational communication with the belt of the track assembly to control movement of the patient transport apparatus along stairs when the track assembly operates in the deployed position;

a user interface arranged for engagement by the user to selectively adjust operation of the drive system between an active state for controlling movement of the belt with the motor, and an inactive state; and a braking controller disposed in communication with the motor and configured to sense movement of the belt when the drive system operates in the inactive state, and to control the motor to limit movement of the belt when the drive system operates in the inactive state to effect corresponding limited movement of the patient transport apparatus along stairs;

wherein the drive system is further configured to operate in a drive mode of the active state for controlling a direction of movement of the belt and wherein the drive system is further configured to operate in a hold mode of the active state to limit movement of the belt.

2. The patient transport apparatus of claim 1, wherein the user interface is further arranged for engagement by the user to adjust the direction of movement of the belt in the drive mode of the active state.

3. The patient transport apparatus of claim 2, wherein the drive system is configured to operate in the drive mode of the active state in response the user engaging the user interface to adjust the direction of movement of the belt.

4. The patient transport apparatus of claim 1, wherein the motor of the drive system comprises one or more windings, and wherein the braking controller is configured to control the motor to limit movement of the belt by short circuiting one or more windings together.

5. The patient transport apparatus of claim 1, wherein the drive system is configured to control the motor in the hold mode of the active state by controlling the motor to limit movement of the belt to maintain the patient transport apparatus in a substantially fixed position along stairs.

6. The patient transport apparatus of claim 1, wherein the drive system is configured to control the motor in the hold mode of the active state by controlling the motor to limit movement of the belt to facilitate a controlled descent of the patient transport apparatus along stairs.

7. The patient transport apparatus of claim 1, wherein the user interface comprises a hold mode interface for engagement by the user and a hold mode interface sensor configured to sense whether the hold mode interface is being engaged such that the drive system is configured to operate in the hold mode of the active state in response to the hold mode interface sensor sensing that the hold mode interface is being engaged.

8. The patient transport apparatus of claim 7, wherein the drive system is configured to exit the hold mode of the active state in response to the hold mode interface sensor sensing that the hold mode interface is not being engaged.

9. The patient transport apparatus of claim 1, wherein the drive system is configured to change operation to a sleep mode of the inactive state from the active state in response to an absence of engagement with the user interface occurring over a predetermined period.

10. The patient transport apparatus of claim 9, wherein the drive system is configured to change operation to the active state from the sleep mode of the inactive state in response to the user engagement of the user interface.

11. The patient transport apparatus of claim 1, further comprising a battery coupled to the drive system, the battery configured to provide power to the drive system in the active state.

12. The patient transport apparatus of claim 11, wherein the drive system is configured to change operation to a low charge mode of the inactive state in response to a charge of the battery being less than a threshold charge value.

13. The patient transport apparatus of claim 11, wherein the drive system is configured to change operation to a battery disconnect mode of the inactive state in response to the battery not being connected to the drive system.

14. The patient transport apparatus of claim 11, wherein the braking controller is isolated from the battery, and wherein the braking controller receives power from rotation of the motor.

15. The patient transport apparatus of claim 14, wherein the drive system is configured to generate electricity via rotation of the motor effected by movement of the belt such that the braking controller receives power from rotation of the motor by receiving the power from the electricity generated by the drive system.

16. The patient transport apparatus of claim 1, wherein the braking controller is configured to sense movement of the belt by sensing a voltage of the motor of the drive system.

17. The patient transport apparatus of claim 16, wherein the braking controller is configured to limit movement of the belt in response to the sensed voltage of the motor being greater than a threshold voltage value.

* * * * *